US011884507B2

(12) United States Patent
Iwata et al.

(10) Patent No.: US 11,884,507 B2
(45) Date of Patent: Jan. 30, 2024

(54) SHEET CONVEYING APPARATUS

(71) Applicants: Toshiyuki Iwata, Tokyo (JP); Takato Mizuno, Yamanashi-ken (JP); Tsukasa Kondo, Yamanashi-ken (JP); Tetsuya Kawasaki, Yamanashi-ken (JP); Yuuki Kubota, Yamanashi-ken (JP)

(72) Inventors: Toshiyuki Iwata, Tokyo (JP); Takato Mizuno, Yamanashi-ken (JP); Tsukasa Kondo, Yamanashi-ken (JP); Tetsuya Kawasaki, Yamanashi-ken (JP); Yuuki Kubota, Yamanashi-ken (JP)

(73) Assignee: CANON FINETECH NISCA INC., Misato (JP)

( * ) Notice: Subject to any disclaimer, the term of this patent is extended or adjusted under 35 U.S.C. 154(b) by 239 days.

(21) Appl. No.: 17/411,412

(22) Filed: Aug. 25, 2021

(65) Prior Publication Data

US 2022/0063945 A1 Mar. 3, 2022

(30) Foreign Application Priority Data

Aug. 28, 2020 (JP) ................................ 2020-144616

(51) Int. Cl.
*B65H 5/02* (2006.01)
*B65H 9/10* (2006.01)
(Continued)

(52) U.S. Cl.
CPC ............. *B65H 9/163* (2013.01); *B65H 5/025* (2013.01); *B65H 5/062* (2013.01); *B65H 9/101* (2013.01);
(Continued)

(58) Field of Classification Search
CPC .......... B65H 5/025; B65H 5/02; B65H 5/021; B65H 5/062; B65H 9/101; B65H 9/163;
(Continued)

(56) References Cited

U.S. PATENT DOCUMENTS 4,669,719 A * 6/1987 Fratangelo ............. B65H 9/166 271/251
5,540,370 A * 7/1996 Ring ...................... B65H 29/60 271/253
(Continued)

FOREIGN PATENT DOCUMENTS

JP 2000335777 A * 12/2000
JP 2007-217096 A 8/2007
JP 2017075049 A * 4/2017

*Primary Examiner* — Luis A Gonzalez
(74) *Attorney, Agent, or Firm* — Manabu Kanesaka

(57) ABSTRACT

The present invention is to provide a configuration facilitating removal of a sheet stopped on a conveying belt. Regulating guides are disposed on both sides of a conveying belt in a sheet width direction Y and can guide both end edges in the sheet width direction of a sheet S conveyed while being nipped by the conveying belt and the balls. A take-out port is provided on the side closer to the regulating guide in the sheet width direction Y, through which a sheet stopped on the conveying belt is taken out. A guide moving part moves the regulating guides. When a sheet is stopped on the conveying belt, the guide moving part moves the first and second regulating guides such that the regulating guide is retracted to a position at which a support surface does not support a first sheet end edge.

5 Claims, 29 Drawing Sheets

(51) Int. Cl.
*B65H 9/16* (2006.01)
*B65H 5/06* (2006.01)
*G03G 15/23* (2006.01)
*G03G 15/00* (2006.01)

(52) U.S. Cl.
CPC ........... *B65H 9/166* (2013.01); *G03G 15/231* (2013.01); *G03G 15/6529* (2013.01)

(58) Field of Classification Search
CPC . B65H 9/166; B65H 9/16; B65H 9/10; B65H 2511/11; B65H 2511/528; B65H 2601/11; B65H 2601/255; B65H 2511/12; B65H 5/36; G03G 15/6529
See application file for complete search history.

(56) References Cited

U.S. PATENT DOCUMENTS

| | | | | |
|---|---|---|---|---|
| 6,650,865 B2 * | 11/2003 | Quesnel | ................. | B65H 9/006 399/388 |
| 2003/0033915 A1 * | 2/2003 | Glemser | ................ | B65H 35/08 83/26 |
| 2015/0284203 A1 * | 10/2015 | Terrero | .................. | B65H 31/38 271/228 |

* cited by examiner

SHEET CONVEYING APPARATUS

TECHNICAL FIELD

The present invention relates to a sheet conveying apparatus that conveys sheets.

BACKGROUND ART

In a sheet conveying apparatus for conveying a sheet, a sheet may be displaced due to various factors during the conveyance of the sheet. When the displaced sheet is conveyed without being corrected to an image forming apparatus for forming an image on a sheet, the formed image may be displaced with respect to the sheet. To cope with this, a sheet conveying apparatus that corrects displacement of a sheet being conveyed is proposed (for example, JP 2007-217096A).

JP 2007-217096A discloses a configuration including a fixed reference guide provided on one side in the width direction crossing the sheet conveying direction, a conveying belt provided inclined to the reference guide, and balls. In the sheet conveying apparatus described in JP 2007-217096A, a sheet is conveyed while being nipped between the conveying belt and the balls with the end edge thereof in the width direction abutting against the reference guide. With this configuration, side registration (displacement of the sheet end edge in the width direction) and side skew (inclination of the sheet end edge in the width direction relative to the sheet conveying direction) of the sheet are corrected at the same time.

DISCLOSURE OF INVENTION

Problems to Be Solved By the Invention

When a sheet stops on a conveying belt due to sheet jam, the jammed sheet on the conveying belt needs to be removed.

It is an object of the present invention to provide a configuration facilitating removal of a sheet stopped on the conveying belt.

Means for Solving the Problem

A sheet conveying apparatus according to the present invention includes: a receiving part for receiving a sheet conveyed in a predetermined conveying direction: an endless conveying belt having a conveying surface extending in the predetermined conveying direction, and configured to convey, in the predetermined conveying direction, the sheet that the receiving part receives; a plurality of balls arranged in the predetermined conveying direction and configured to be rotatable in any direction while nipping the sheet with the conveying surface; a first regulating guide disposed on a first side relative to the conveying belt in a sheet width direction crossing the conveying direction, having a first support surface for supporting a first sheet end edge on the first side of the sheet conveyed while being nipped by the conveying belt and the balls, and configured to move in the sheet width direction with the first sheet end edge supported by the first support surface to regulate the first sheet end edge; a second regulating guide disposed on a second side relative to the conveying belt in the sheet width direction, having a second support surface for supporting a second sheet end edge on the second side of the sheet conveyed while being nipped by the conveying belt and the balls, and configured to move in the sheet width direction with the second sheet end edge supported by the second support surface to regulate the second sheet end edge; a guide moving unit configured to move the first and second regulating guides in the sheet width direction; and a take-out port provided on the first side relative to the conveying belt in the sheet width direction, through which a sheet stopped on the conveying belt can be taken out in a state where the first sheet end edge is located at a predetermined position. When a sheet is stopped on the conveying belt, the guide moving unit moves the first and second regulating guides such that the first support surface is located at a position at which it does not support the first sheet end edge in a state where the first sheet end edge is located at the predetermined position.

Advantageous Effect of the Invention

According to the present invention, it is possible to facilitate removal of a sheet stopped on the conveying belt.

BRIEF DESCRIPTION OF DRAWINGS

FIGS. 7A to 7D are views illustrating a regulating guide according to the embodiment, in which FIG. 7A is a perspective view, FIG. 7B is a view seen from the left in FIG. 7A, FIG. 7C is a cross-sectional view taken along a sheet conveying direction, and FIG. 7D is a cross-sectional view taken along a direction perpendicular to the sheet conveying direction;

FIGS. 9A and 9B are side views of the contact/separation mechanism of the conveying roller pair according to the embodiment, in which FIG. 9A illustrates a nip state of the conveying roller pair, and FIG. 9B illustrates a nip release state of the conveying roller pair;

FIGS. 10A to 10D are views for explaining the operation of a regulating guide according to the embodiment, in which FIG. 10A illustrates a sheet receiving state, FIG. 10B illustrates a state where the rear end of the sheet has passed a conveying roller pair, FIG. 10C illustrates a state where displacement of the sheet is corrected, and FIG. 10D illustrates a receiving state of a second sheet;

FIGS. 12A to 12C are views for explaining the operation of the regulating guide for a cardboard, in which FIG. 12A illustrates a state where the sheet is conveyed onto a conveying belt, FIG. 12B illustrates an abutment state against one end edge of the sheet, and FIG. 12C illustrates an abutment state against the other end edge of the sheet;

FIGS. 13A and 13B are views for explaining a nip release timing of a conveying roller pair for a long sheet, in which FIG. 13A illustrates a state where the sheet is conveyed onto the conveying belt, and FIG. 13B illustrates a state where the nip of a conveying roller pair on the downstream side is released;

FIGS. 17A to 17C are views for explaining the operations of the regulating guides according to the embodiment, in which FIG. 17A illustrates a state where a sheet having a sheet width of 257 mm or less is stopped on the conveying belt, FIG. 17B illustrates a state where a first sheet end edge of the sheet is located at a predetermined position at which the sheet can be taken out through a take-out port, and FIG. 17C illustrates a state where the front side regulating guide is retracted;

FIGS. 18A and 18B are views for explaining the operations of the regulating guides according to the embodiment, in which FIG. 18A illustrates a state where a sheet having a sheet width of 257.1 mm to 320 mm is stopped on the conveying belt, and FIG. 18B illustrates a state where the front side regulating guide is retracted;

FIGS. 19A to 19C are views for explaining the operations of the regulating guides according to the embodiment, in which FIG. 19A illustrates a state where a sheet having a sheet width of 320.1 mm or more is stopped on the conveying belt, FIG. 19B illustrates a state where the first sheet end edge of the sheet is located at the predetermined position at which the sheet can be taken out through the take-out port, and FIG. 19C illustrates a state where the front side regulating guide is retracted;

FIGS. 20A to 20C are views for explaining the operations of the regulating guides according to the embodiment, in which FIG. 20A illustrates a state where a sheet having a sheet width of 257.1 mm to 320 mm is stopped on the conveying belt, FIG. 20B illustrates a state where the first sheet end edge of the sheet is located at the predetermined position at which the sheet can be taken out through the take-out port while the sheet is once moved to the rear side, and FIG. 20C illustrates a state where the front side regulating guide is retracted;

MODE FOR CARRYING OUT THE INVENTION

An embodiment of the present invention will be described with reference to FIGS. 1 to 29. First, an image forming system according to the present embodiment will be described with reference to FIG. 1.

[Image Forming System]

Figure 1:
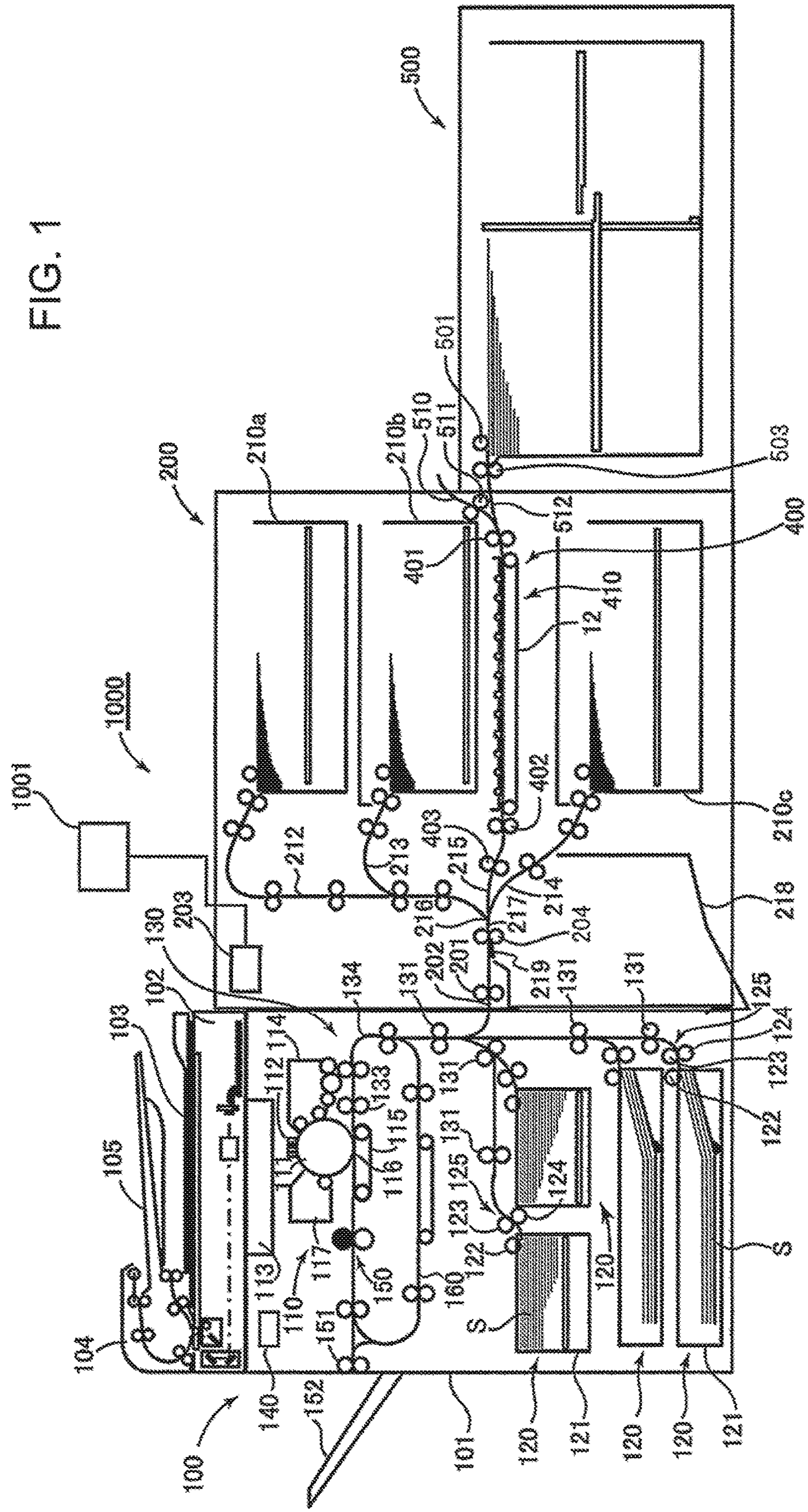
FIG. 1 is a cross-sectional view schematically illustrating the configuration of an image forming system according to an embodiment of the present invention.

FIG. 1 is a cross-sectional view schematically illustrating an example of an image forming system according to the present embodiment which is provided with a multi-stage feeder and an image forming apparatus. Hereinafter, an electrophotographic laser printer system (hereinafter, referred to merely as "printer") is taken as an example of an image forming apparatus having an image forming part. The image forming apparatus constituting the image forming system is not limited to a printer, but may be a copier, a fax machine, or a multifunction machine. Further, the image forming apparatus is not limited to of an electrophotographic type, but may be of other types such as an inkjet system.

An image forming system 1000 according to the present embodiment has an image forming apparatus 100, a multi-stage feeder 200 as a sheet feeding apparatus connected to the image forming apparatus 100, and a feeding deck 500. Although the details will be described later, the multi-stage feeder 200 has a plurality of storage cases each capable of storing a plurality of sheets, and the sheets can be fed from each of the storage cases to the image forming apparatus 100. The feeding deck 500, which also has a storage case capable of storing a plurality of sheets, is disposed upstream relative to the multi-stage feeder 200 in the sheet conveying direction. The sheet fed from the feeding deck 500 is conveyed to the image forming apparatus 100 through a relay conveying apparatus 400 provided in the multi-stage feeder 200. Examples of the sheet include a paper sheet such as plain paper, thin paper, or a cardboard, and a plastic sheet.

The image forming apparatus 100 forms a toner image on a sheet according to an image signal from a document reading apparatus 102 connected to an image forming apparatus body 101 or a host device such as a personal computer communicably connected to the image forming apparatus body 101. In the present embodiment, the document reading apparatus 102 is disposed above the image forming apparatus body 101.

The document reading apparatus 102 irradiates light onto a document placed on a platen glass 103 using a scanning optical system light source and inputs the reflected light from the document to a CCD to thereby read a document image. The document reading apparatus 102 has an automatic document feeder (ADF) 104 and can automatically convey the document placed on a tray 105 to a reading part of the document reading apparatus 102 using the ADF 104 for document image reading. The read document image is transmitted in the form of an electrical signal to a laser scanner 113 of an image forming part 110 to be described later. The laser scanner 113 may receive image data transmitted from a personal computer or other device, as described above.

The image forming apparatus 100 has an image forming part 110, a plurality of sheet feeding units 120, a sheet conveying unit 130, and other components. The components of the image forming apparatus 100 are each controlled by a control part 140. The control part 140 has a CPU (Central Processing Unit), a ROM (Read Only Memory), and a RAM (Random Access Memory). The CPU controls the components while reading a program corresponding to a control procedure stored in the ROM. The RAM stores therein work data or input data, and the CPU performs control according to the above-mentioned program while referring to the above data stored in the RAM.

The plurality of sheet feeding units 120 each have a cassette 121 for storing sheets S, a pickup roller 122, and a separating and conveying roller pair 125 constituted of a feeding roller 123 and a retard roller 124. The sheets S stored in the cassette 121 are fed one by one by the pickup roller 122 rotating while moving up and down at a predetermined timing and separating and conveying roller pair 125.

The sheet conveying unit 130 has a conveying roller pair 131 and a registration roller pair 133. The sheet S fed from the sheet feeding unit 120 is made to pass through a sheet conveyance path 134 by the conveying roller pair 131 and is then guided to the registration roller pair 133. Then, the sheet S is fed to the image forming part 110 at a predetermined timing by the registration roller pair 133.

A sheet conveyed from the multi-stage feeder 200 or feeding deck 500, which are to be described later, through a conveying roller pair 201 is then conveyed to the image forming apparatus 100 through a connection path 202 connecting to the image forming apparatus 100. Like the sheet conveyed from the sheet feeding unit 120 in the image forming apparatus 100, the sheet conveyed from the multi-stage feeder 200 or feeding deck 500 to the image forming apparatus 100 is fed to the image forming part 110 at a predetermined timing by the registration roller pair 133.

The image forming part 110 has a photosensitive drum 111, a charger 112, a laser scanner 113, a developing unit 114, a transfer unit 115, a cleaner 117, and other components. At the time of image formation, the photosensitive drum 111 is driven into rotation in a direction of the arrow shown in FIG. 1, and the surface of the photosensitive drum 111 is uniformly charged by the charger 112. Then, a laser light that the laser scanner 113 emits according to an image signal is irradiated onto the charged photosensitive drum 111, whereby an electrostatic latent image is formed on the photosensitive drum 111. The electrostatic latent image thus formed on the photosensitive drum 111 is then visualized as a toner image by the developing unit 114.

Thereafter, the toner image on the photosensitive drum 111 is transferred onto the sheet S by the transfer unit 115 at a transfer part 116. The sheet S onto which the toner image has been transferred is conveyed to a fixing device 150, where the toner image is fixed. After that, the resultant sheet S is discharged to a discharge tray 152 outside the apparatus by a discharge roller 151.

To form a toner image on the back surface of the sheet S, the sheet S discharged from the fixing device 150 is conveyed to a reverse conveyance path 160, where the front and back sides of the sheet S is reversed. Then the resultant sheet S is conveyed once again to the transfer part 116 of the image forming part 110. The sheet S carrying a toner image on the back surface thereof is conveyed to the fixing device 150, where the toner image is fixed, and the resultant sheet S is discharged to the discharge tray 152 by the discharge roller 151. Toner remaining on the photosensitive drum 111 after transfer is removed by the cleaner 117.

[Multi-Stage Feeder]

The following describes the outline of the multi-stage feeder 200 with reference to FIG. 1. The multi-stage feeder 200 has a plurality of storage cases 210*a* to 210*c*, the relay conveying apparatus 400, and other components. In the present embodiment, the storage cases (210*a* to 210*c*) are arranged vertically in three stages, and the relay conveying apparatus 400 is disposed between the lowermost storage case 210*c* and the second topmost storage case 210*b*.

A sheet fed from the topmost storage case 210*a* is conveyed to a conveyance path 212, a sheet fed from the second topmost storage case 210*b* is conveyed to a conveyance path 213, and a sheet fed from the lowermost storage case 210*c* is conveyed to a conveyance path 214. A sheet fed from the relay conveying apparatus 400 is conveyed to a conveyance path 215. The conveyance path 213 merges with the conveyance path 212 along the way, and the conveyance paths 212, 214, and 215 merge at a merge point 216. Thus, a sheet conveyed along the conveyance paths 212, 213, 214, or 215 is conveyed to a conveying roller pair 201 through a conveyance path 217 and then to the image forming apparatus 100 through the connection path 202.

A multi-feed detection sensor for detecting multi-feed of the sheet is disposed in the conveyance path 212 after merging with the conveyance path 213, the relay conveying apparatus 400, and the conveyance path 214. Sheets, the multi-feed of which is detected by the multi-feed detection sensor, are conveyed to the conveyance path 217. A multi-fed sheet storage part (escape tray) 218 for storing the sheets, the multi-feed of which is detected, is provided below the conveyance path 217. Upon detection of the multi-feed, the sheets are conveyed to the conveyance path 217, where the conveyance path is switched by a switching member 219 provided in the conveyance path 217, with the result that the sheets are conveyed to the multi-fed sheet storage part 218.

Components of the multi-stage feeder 200 are each controlled by a control part 203. The control part 203 has a CPU (Central Processing Unit), a ROM (Read Only Memory), and a RAM (Random Access Memory). The control part 203 can communicate with the control part 140 of the image forming apparatus 100. By communicating with the control part 140, the control part 203 controls, for example, a sheet feeding timing.

A sheet fed from the feeding deck 500 positioned upstream relative to the multi-stage feeder 200 is conveyed to the relay conveying apparatus 400 through a conveyance path 512. Further, the multi-stage feeder 200 allows manual sheet feeding. A sheet manually fed is conveyed to the conveyance path 510 that merges with the conveyance path 512 and then conveyed by a conveying roller pair 511 to the relay conveying apparatus 400 through the conveyance path 512.

Although details will be described later, the relay conveying apparatus 400 has a displacement correction part 410 provided with a conveying belt 12. A conveying roller pair

401 and a conveying roller pair 402, which are conveying members, are disposed upstream and downstream relative to the displacement correction part 410 in the sheet conveying direction, respectively. A sheet on the conveyance path 512 is conveyed to the displacement correction part 410 by the conveying roller pair 401. The sheet is subjected to side registration (displacement of the sheet end edge in the width direction) correction and side skew (inclination of the sheet end edge in the width direction relative to the sheet conveying direction) correction in the displacement correction part 410 and passed to the conveying roller pair 402 positioned on the upstream side. After that, the sheet is conveyed to the conveyance path 215 by the conveying roller pair 402 and a conveying roller pair 403 positioned upstream relative to the conveying roller pair 402. As described above, the relay conveying apparatus 400 corrects displacement of the sheet conveyed from the feeding deck 500 positioned on the upstream side and passes the resultant sheet to the image forming apparatus 100 positioned on the downstream side.

[Relay Conveying Apparatus]

Figure 2:
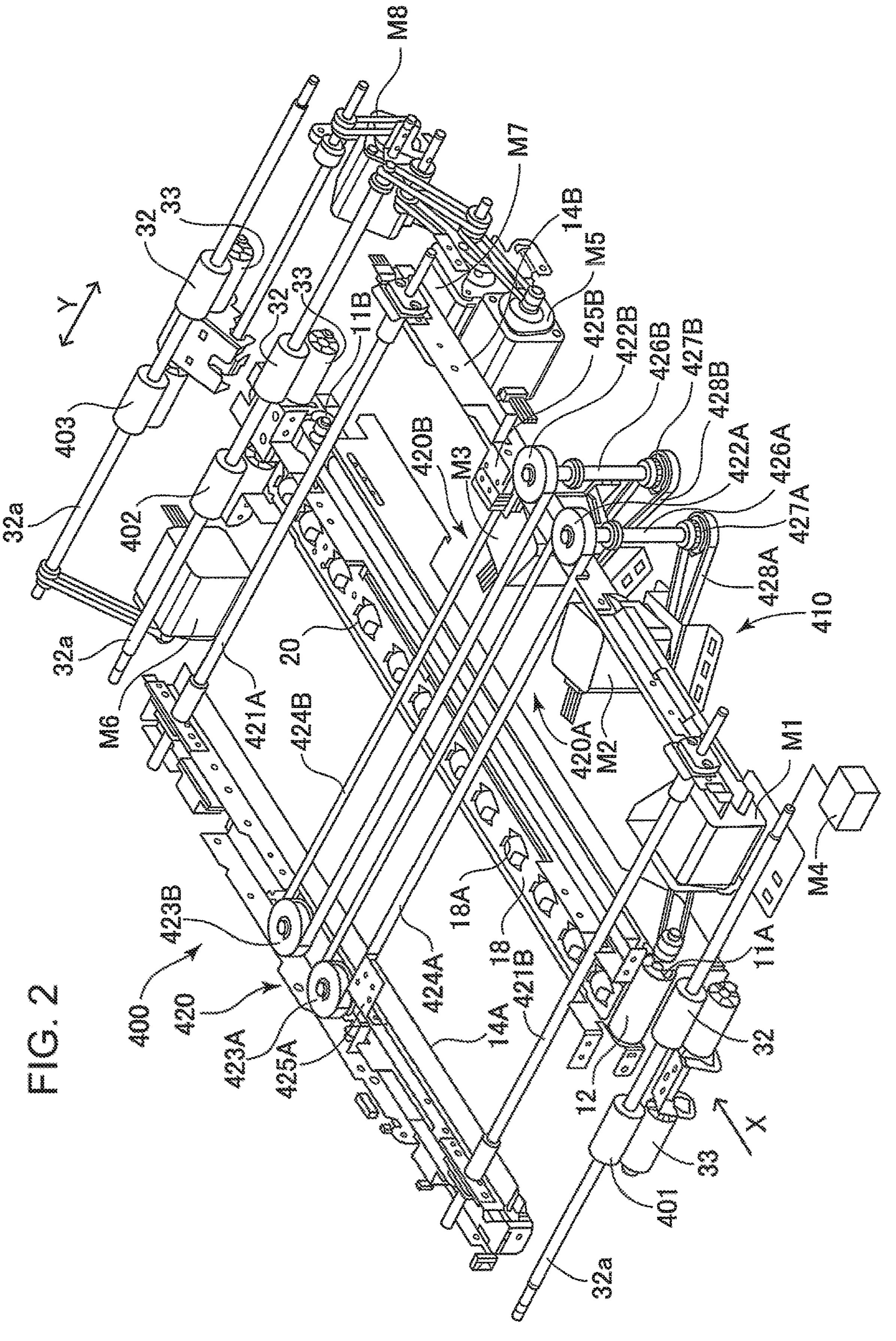
FIG. 2 is a perspective view of a relay conveying apparatus according to the embodiment.
Figure 3:
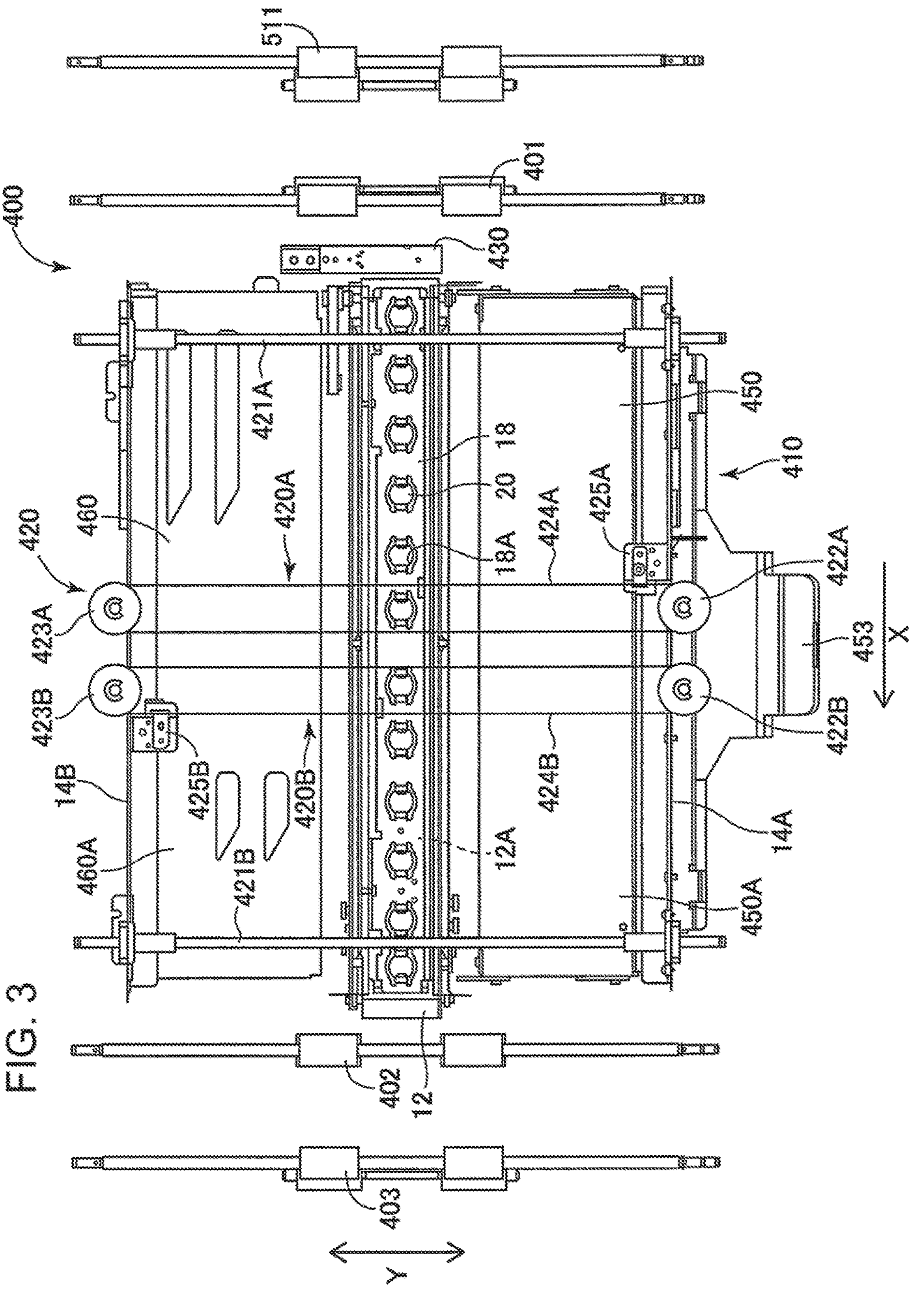
FIG. 3 is a plan view of the relay conveying apparatus according to the embodiment.

The following describes the relay conveying apparatus 400 as a sheet conveying apparatus. First, the schematic configuration of the relay conveying apparatus 400 will be described with reference to FIGS. 2 to 6. The relay conveying apparatus 400 receives and conveys a sheet conveyed by the conveying roller pair 401 as a conveying unit (convey member) for conveying a sheet in a conveying direction (predetermined conveying direction) X. Specifically, a sheet is passed from the conveying roller pair 401 on the upstream side to the above-mentioned displacement correction part 410 to be subjected to displacement correction and is then passed from the displacement correction part 410 to the conveying roller pair 402 on the downstream side. As illustrated in FIG. 3, the conveying roller pairs 401 and 402 each including two roller parts each composed of a drive roller and a driven roller and separated from each other in the rotary axis direction. In particular, the width (length in the width direction Y, i.e., the distance between the upper end of the upper side (as viewed in FIG. 3) roller part and the lower end of the lower side (as viewed in FIG. 3) roller part in the two roller parts of the conveying roller pair 402 arranged in the rotary axis direction) of the conveying roller pair 402 is larger than the width (length in the width direction) of the conveying belt 12. The displacement correction part 410 has the conveying belt 12, a plurality of balls 20, a pair of regulating guides 14A, 14B, a guide moving part 420, and other members.

The conveying belt 12 is disposed downstream side in the conveying direction X (downstream side in the conveying direction) relative to the conveying roller pair 401 as a conveying unit (convey member) for conveying a sheet in the conveying direction X. The conveying belt 12 is an endless belt wound over pulleys 11A and 11B and has a conveying surface 12A extending in the conveying direction X. The pulley 11A is connected with a motor M1 as a drive source, and the conveying belt 12 rotates by receiving drive from the motor M1. The thus configured conveying belt 12 receives a sheet from the conveying roller pair 401 on the upstream side in the conveying direction X at the conveying surface 12A and conveys the sheet in the conveying direction X.

The plurality of balls 20 are arranged in the conveying direction X so as to face the conveying surface 12A of the conveying belt 12. The center position of the balls 20 serves as the center reference position of the sheet. That is, the position where the centers of the balls 20 are aligned is the center reference position of the sheet. The center reference position is a position coinciding with both the width-direction centers of first and second sheets having different widths (that is, the center reference position coincides with the sheet width-direction center regardless of the sheet size). In other words, the balls 20 are arranged at the center position between the pair of regulating guides 14A and 14B. One of the regulating guides 14A and 14B may be fixedly provided.

The arrangement direction of the balls 20 coincides with a sheet guide direction of a guide surface 15A (FIG. 6) of the regulating guides 14A and 14B to be described later. The guide direction of the regulating guides 14A and 14B and the conveying direction X of the conveying belt 12 substantially coincide with each other.

In the present embodiment, the balls 20 are disposed above the conveying belt 12. The balls 20 can rotate in any direction while nipping a sheet with the conveying surface 12A. To this end, the balls 20 are held by a holding plate 18 provided above the conveying belt 12 so as to be freely rotatable in any direction. That is, as illustrated in FIGS. 2 and 3, the holding plate 18 is an elongated plate disposed in the conveying direction X at a position separated from the conveying surface 12A by a predetermined distance and has a plurality of holding holes 18A which are arranged at intervals from one another in the conveying direction X. The balls 20 are thus freely rotatably held in the respective holding holes 18A.

Figure 4:
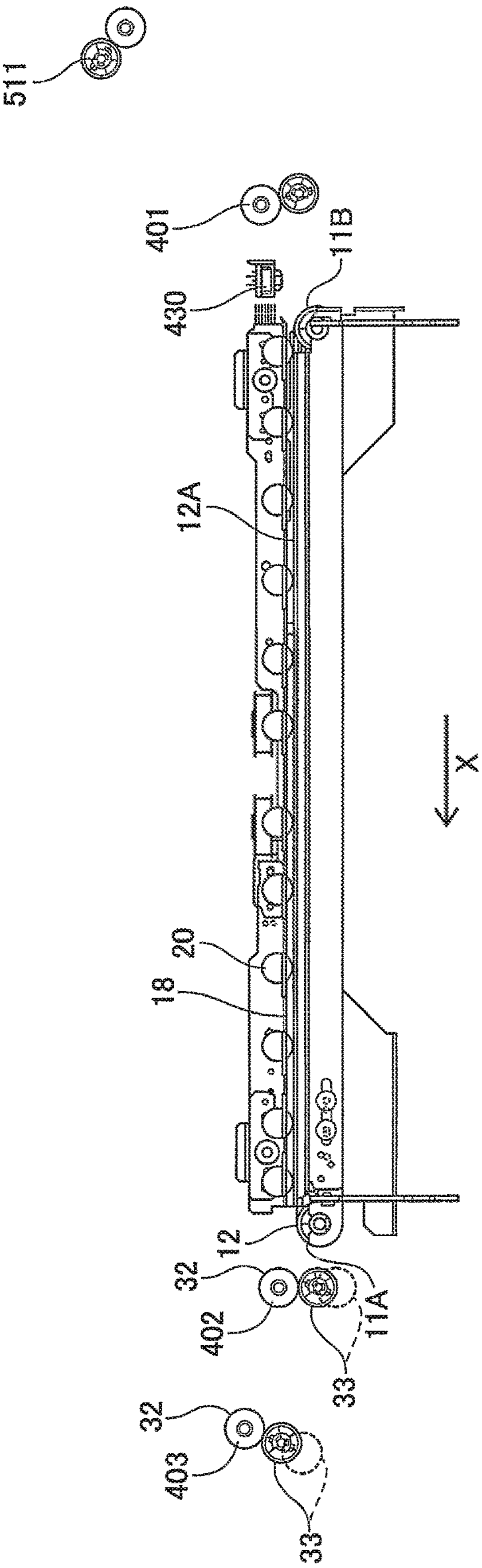
FIG. 4 is a side view of the relay conveying apparatus according to the embodiment.

As illustrated in FIG. 4, the balls 20 are placed on the conveying surface 12A in a state of being exposed from the holding holes 18A and are made freely rotatable in any direction. Each ball 20 is in contact with the conveying surface 12A by its own weight. The number of balls 20 may be determined in accordance with a required pressing force against a sheet conveyed on the conveying belt 12. The ball 20 is preferably made of a material having a comparatively low friction coefficient, such as glass or plastic, so as to allow a sheet to be conveyed while slipping on the conveying belt 12 as described later. Although the balls 20 are arranged in one row in the conveying direction X in the present embodiment, they may be arranged in a plurality of (e.g., two) rows in the conveying direction X.

Figure 5:
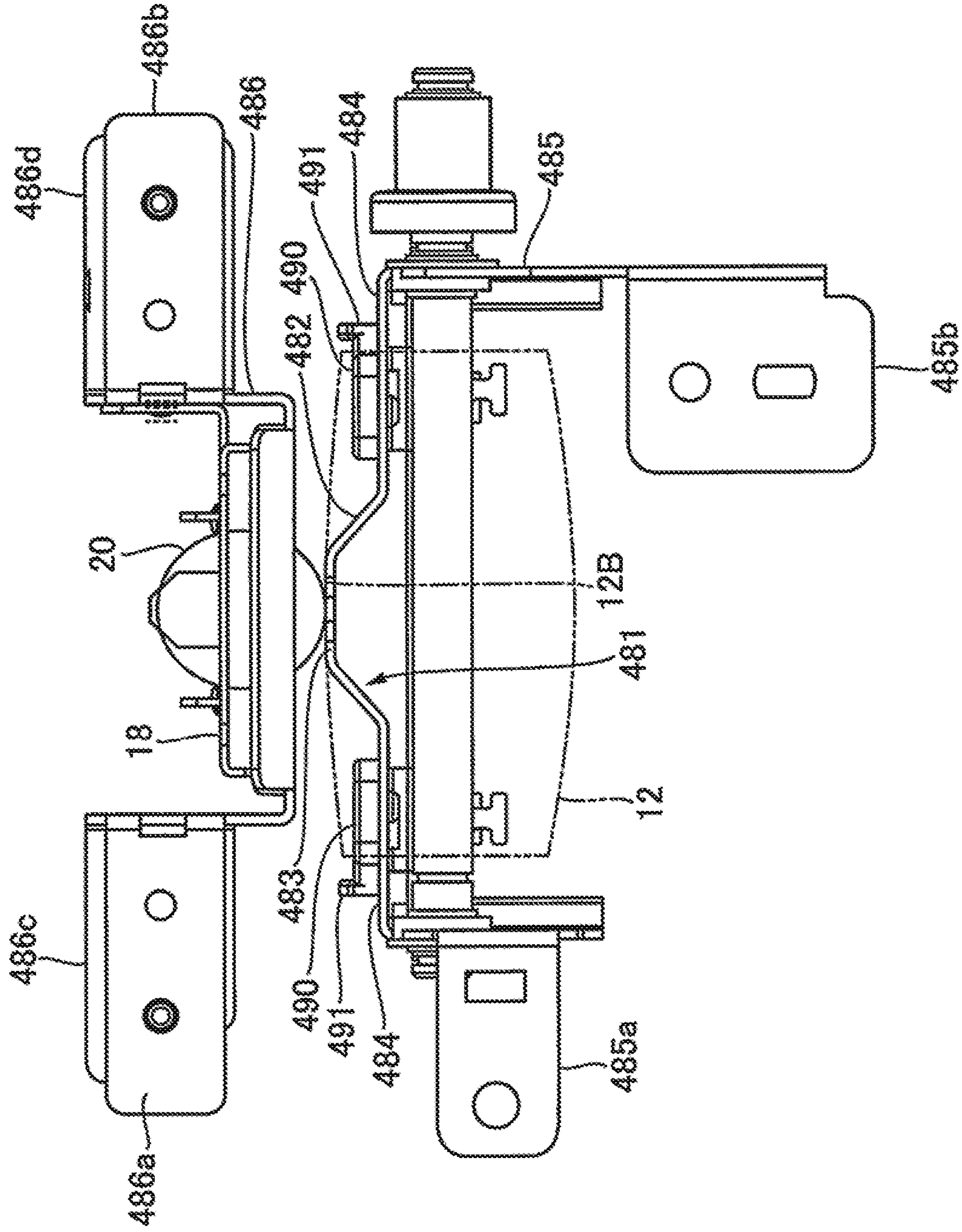
FIG. 5 is a cross-sectional view of the relay conveying apparatus according to the embodiment, focusing a portion around a configuration for supporting a conveying belt.

More detailed description will be made with reference to FIG. 5. The relay conveying apparatus 400 has the holding plate 18 that freely rotatably holds the balls 20 and a conveying belt support member 481 disposed below the holding plate 18. Like the holding plate 18, the conveying belt support member 481 is an elongated plate member extending in the conveying direction X. As illustrated in FIG. 5, the conveying belt support member 481 has a flat and relatively narrow conveying belt support surface 483. The conveying belt support surface 483 extends substantially over the entire length of the conveying belt support member 481 in the conveying direction X and has a sheet width direction center part 482 protruding upward. The conveying belt support member 481 is disposed so as to vertically face the holding plate 18 such that the balls 20 are located at the center position of the conveying belt support surface 483 in the sheet width direction.

The balls 20 are preferably disposed at the center position between the pair of regulating guides 14A and 14B and at the center position of the conveying belt support surface 483 in the sheet width direction; however, a slight displacement is negligible as long as they fall within a position facing the conveying belt support surface 483.

In the conveying belt support member 481, a side part 484 on both sides of the center part 482 in the sheet width direction protrudes slightly outside the both ends of the conveying belt 12 in the sheet width direction, and the outer end of the side part 484 is bent downward and fixed to a lower frame 485 of the relay conveying apparatus 400. The lower frame 485 has, on both sides in the conveying direction X, mounting end wall pieces 485*a* and 485*b* which extend outside in the sheet width direction and is fixed, at the mounting end wall pieces 485*a* and 485*b*, to the relay conveying apparatus 400 side (e.g., an enclosure 470 to be described later (FIG. 14)) by appropriate stop members such as set screws. When the conveying belt 12 is supported by the thus configured conveying belt support member 481, a center part 12B of the conveying belt 12 is pushed upward by the center part 482 of the conveying belt support member 481, with the result that the distance between the vertically facing center portions of the endless conveying belt 12 is larger than the distance between the vertically facing end portions of the conveying belt 12.

As illustrated in FIG. 5, the holding plate 18 is fixed on an upper frame 486 of the relay conveying apparatus 400. The upper frame 486 has, on both ends in the conveying direction X, mounting end wall pieces 486*a*, 486*b*, 486*c*, and 486*d* which extend outside in the sheet width direction and is fixed, at the mounting end wall pieces 486*a* to 486*d*, to the relay conveying apparatus 400 side (e.g., an enclosure 470) by appropriate stop members such as set screws. As a result, the positional relationship between the holding plate 18 and the conveying belt support member 481 is held such that the balls 20 are freely rotatably held on the conveying surface 12A of the conveying belt 12 at the center position of the conveying belt support surface 483 in the sheet width direction.

The conveying belt support member 481 has, on each of the side parts 484 on the sheet width direction both sides, a plurality of blocking members 490 which are arranged in the conveying direction X. Each blocking member 490 has a shape in which the outer end thereof in the sheet width direction protrudes outside from each of the both end portions of the conveying belt 12 in the sheet width direction by a predetermined width. An outwardly facing blocking surface 491 is provided at the outer end of the blocking member 490 in the sheet width direction. For example, in jam clearance for an envelope, the flap of the envelope is engaged with the blocking surface 491, thereby preventing the flap from getting jammed in the conveying belt 12.

The pair of regulating guides 14A and 14B are disposed on both sides relative to the conveying belt 12 in a sheet width direction Y crossing (perpendicular to, in the present embodiment) the conveying direction X. The pair of regulating guides 14A and 14B can guide the both end edges (sheet width direction both end edges) in the sheet width direction Y of the sheet conveyed while being nipped by the conveying belt 12 and balls 20. The regulating guide 14B disposed on one side (first side) in the sheet width direction Y can guide sheet width direction one end edge of the sheet conveyed while being nipped by the conveying belt 12 and balls 20, and the regulating guide 14A disposed on the other side (second side) in the sheet width direction Y can guide sheet width direction the other end edge of the sheet conveyed while being nipped by the conveying belt 12 and balls 20.

Figure 6:
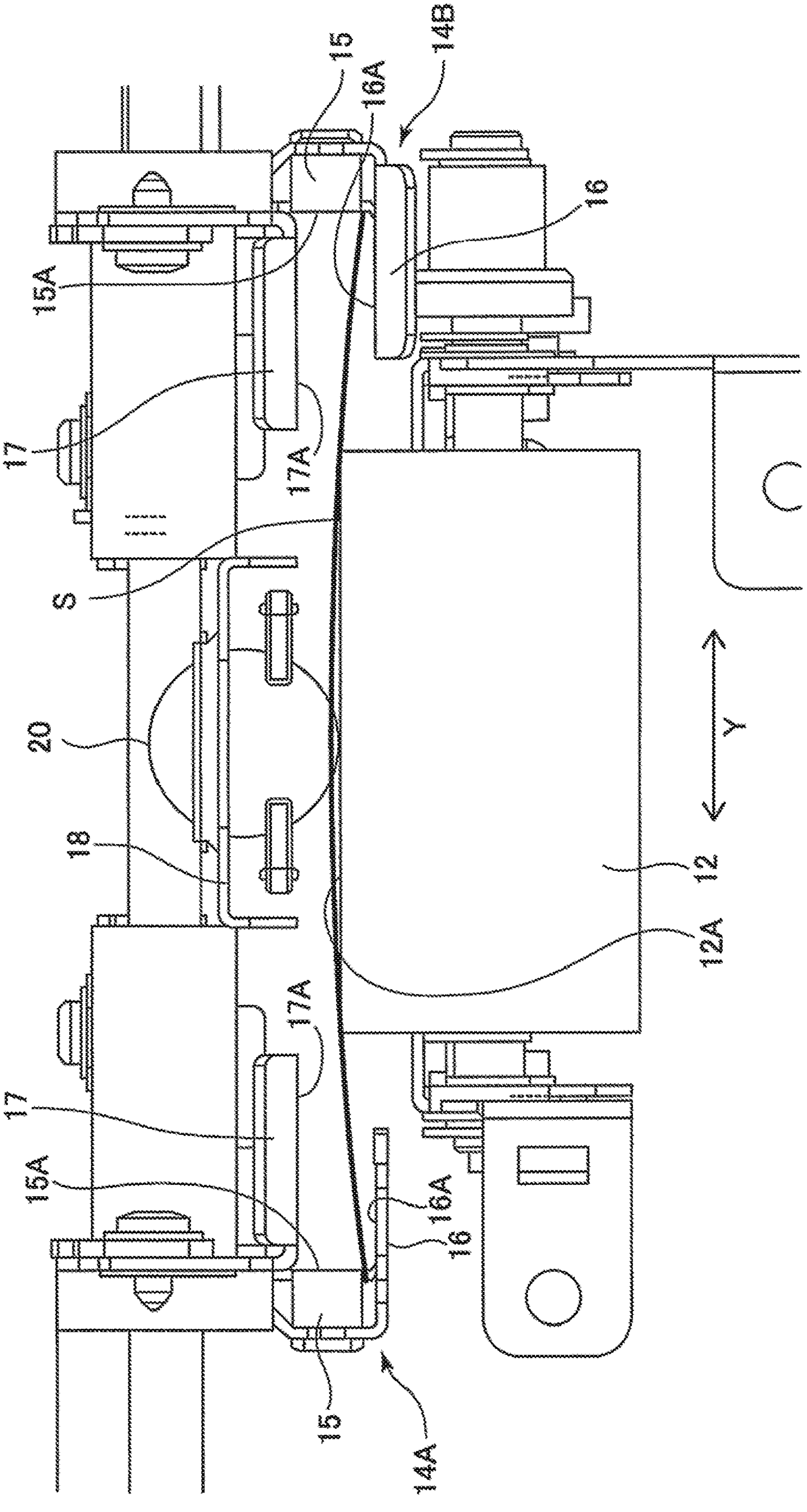
FIG. 6 is a cross-sectional view of the relay conveying apparatus according to the embodiment.

As illustrated in FIG. 6, the pair of regulating guides 14A and 14B each have a side plate part 15, a lower plate part 16, and an upper plate part 17, and the end portion of the sheet S conveyed by the conveying belt 12 can enter a space surrounded by the above plate parts 15, 16, and 17. The pair of regulating guides 14A and 14B are supported by support shafts 421A and 421B (see FIG. 3) so as to be movable between a guide position and a retracting position by a guide moving part 420 to be described later. The support shafts 421A and 421B are disposed substantially parallel to the sheet width direction Y and support the end portion sides of the pair of regulating guides 14A and 14B in the conveying direction X. The pair of regulating guides 14A and 14B are movable in the sheet width direction Y along the support shafts 421A and 421B.

The side plate part 15 has a guide surface 15A facing, at the guide position, the end edge (sheet width direction end edge) in the sheet width direction Y of the sheet S conveyed while being nipped by the conveying belt 12 and balls 20. The guide surface 15A is disposed parallel to the conveying direction X. Further, the guide surface 15A is a surface perpendicular to both the conveying direction X and the sheet width direction Y (in the present embodiment, the guide surface 15A is a surface extending substantially vertically).

The lower plate part 16 is disposed so as to be perpendicular to the side plate part 15 and a support surface 16A that supports, at the guide position, the end edge in the sheet width direction Y of the sheet S conveyed while being nipped by the conveying belt 12 and balls 20. The support surface 16A extends substantially horizontally from the lower end portion of the guide surface 15A in the vertical direction. Further, the support surface 16A is positioned vertically below the conveying surface 12A of the conveying belt 12.

Assume here that the support surface 16A and the conveying surface 12A are positioned at the same height, or that the support surface 16A is positioned vertically above the conveying surface 12A. In this case, when a sheet S having high rigidity, such as a cardboard, is conveyed to between the conveying belt 12 and the balls 20 in a downwardly curled state (a state where both end edges of the sheet S in the width direction Y are positioned lower than the center portion) as illustrated in FIG. 6, the both end edges of the sheet S in the width direction Y are supported on the support surface 16A. At this time, the center portion of the sheet S in the width direction Y is lifted (swelling upward) to push upward the balls 20. As a result, the conveying belt 12 and the balls 20 are separated to prevent the conveying force of the conveying belt 12 from being transmitted to the sheet S, which may result in a conveyance failure. To avoid this, in the present embodiment, the support surface 16A is disposed vertically below the conveying surface 12A of the conveying belt 12.

The upper plate part 17 has a facing surface 17A that faces the support surface 16A. The facing surface 17A is positioned, at the guide position, above the end edge in the sheet width direction Y of the sheet S conveyed while being nipped by the conveying belt 12 and the balls 20. The facing surface 17A is formed substantially parallel to the support surface 16A.

As illustrated in FIGS. 2 and 3, the guide moving part 420 has a first moving part 420A for moving the regulating guide 14A and a second moving part 420B for moving the regulating guide 14B. The guide moving part 420 further has a motor M2 that generates a drive force for moving the regulating guide 14A and a motor M3 that generates a drive force for moving the regulating guide 14B.

The first moving part 420A has a pair of pulleys 422A, 423A, an endless belt 424A wound over the pulleys 422A and 423A, and a connection part 425A connecting the belt 424A and the regulating guide 14A. Similarly, the second moving part 420B has a pair of pulleys 422B, 423B, an endless belt 424B wound over the pulleys 422B and 423B, and a connection part 425B connecting the belt 424B and the regulating guide 14B.

Further, as illustrated in FIG. 2, the first moving part 420A is driven by the motor M2 as a drive source, and the second moving part 420B is driven by the motor M3 as a drive source. That is, in the present embodiment, the motors as drive sources for driving the pair of regulating guides 14A and 14B are separately provided to allow the pair of regulating guides 14A and 14B to move independently. Thus, the pulley 422A of the first moving part 420A is coupled to a pulley 427A through a coupling shaft 426A, and a belt 428A is wound over the pulley 427A and a pulley driven into rotation by the motor M2. As a result, the rotation drive of the motor M2 is transmitted to the belt 424A through the belt 428A, pulley 427A, coupling shaft 426A, and pulley 422A. As described above, the belt 424A is connected with the regulating guide 14A through the connection part 425A, so that when the motor M2 is driven, the regulating guide 14A moves in the sheet width direction Y along the support shafts 421A and 421B.

Similarly, the pulley 422B of the second moving part 420B is coupled to a pulley 427B through a coupling shaft 426B, and a belt 428B is wound over the pulley 427B and a pulley driven into rotation by the motor M3. As a result, the rotation drive of the motor M3 is transmitted to the belt 424B through the belt 428B, pulley 427B, coupling shaft 426B, and pulley 422B. As described above, the belt 424B is connected with the regulating guide 14B through the connection part 425B, so that when the motor M3 is driven, the regulating guide 14B moves in the sheet width direction Y along the support shafts 421A and 421B.

The motors M2 and M3 are thus driven to thereby move the regulating guides 14A and 14B to the guide position or retracting position. In the present embodiment, the motors M2 and M3 are each a pulse motor (stepping motor), and the positions of the regulating guides 14A and 14B are controlled by the number of pulses given to the motors. The regulating guides 14A and 14B have their respective home positions, where sensors for detecting the regulating guides 14A and 14B are provided. Thus, the regulating guides 14A and 14B are detected at the home positions and then each moved to the guide position or retracting position according to the number of pulses given to the motors.

In the present embodiment, the home position of each of the regulating guides 14A and 14B and a maximum width-sized sheet receiving position thereof coincide with each other. That is, the regulating guides 14A and 14B can each basically move to the home position, a standby position (sheet receiving position), and a guide position. The guide position is, although differing depending on the sheet size, a position 0.5 mm from the end portion of the sheet in the sheet width direction Y, for example. Normally, the distance between the regulating guides 14A and 14B is reduced in the order of home position, standby position, and guide position. However, in the present embodiment, for a sheet having a maximum width (e.g., 330.2 mm=length in the sheet width direction Y), the home position and standby position coincide with each other. This reduces the apparatus size.

That is, when receiving the maximum width-sized sheet, the regulating guides 14A and 14B are controlled as follows. First, based on a detection result of the sensor for detecting the home position, the regulating guides 14A and 14B are each located at the home position, where the sheet is received (that is, the home position is set as the standby position). Then, the regulating guides 14A and 14B are each located at the guide position to regulate the sheet. Further, for receiving the next sheet, the regulating guides 14A and 14B are each located at the standby position (=home position). At this time, the output of the home position sensor is ignored. That is, after the first sheet has passed through the home position sensor, the position of each of the regulating guides 14A and 14B is managed based on the pulse count. When a sheet having a different width is conveyed after completion of one job, the regulating guides 14A and 14B are each located at an appropriate standby position by referring once again to the output of the home position sensor.

In the present embodiment, the motor M1 for driving the conveying belt 12, motors M2 and M3 for moving the regulating guides 14A and 14B, and motors M5, M7, and M8 to be described later are disposed on the side of the regulating guide 14B. In particular, a motor within the sheet conveying range of the displacement correction part 410 in the conveying direction X is preferably disposed on the far side (rear side, i.e., regulating guide 14B side) than the conveying belt 12. This is, as described later, for facilitating the removal of a jammed sheet from the near side (front side, i.e., regulating guide 14A side).

Further, in the present embodiment, as illustrated in FIGS. 3 and 4, a multi-feed detection sensor 430 for detecting multi-feed of the sheet is disposed between the conveying roller pair 401 positioned on the upstream side and the conveying belt 12. The multi-feed detection sensor 430 is a sensor for detecting a state where two or more sheets are conveyed in an overlapping manner by means of ultrasound. When the multi-feed detection sensor 430 detects the multi-feed, the control part 203 (FIG. 1) of the multi-stage feeder 200 conveys the multi-fed sheets to the multi-fed sheet storage part 218 through the relay conveying apparatus 400 and conveyance paths 215 and 217.

Figure 14:
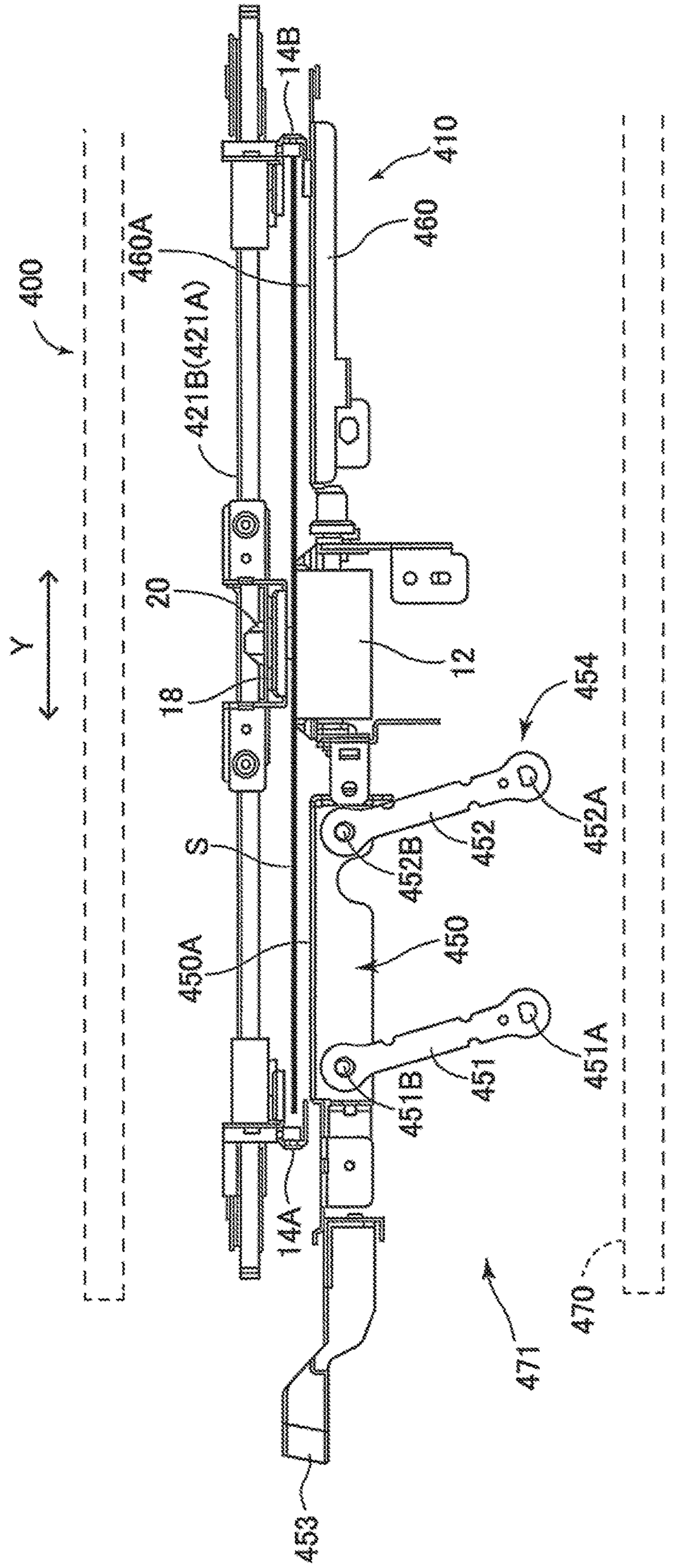
FIG. 14 is a cross-sectional view of the relay conveying apparatus according to the embodiment in a state where a facing member is located at a facing position.

Further, in the present embodiment, as illustrated in FIG. 3 and FIG. 14 to be described later, facing members 450 and 460 that face the lower surface of a sheet conveyed by the conveying belt 12 are disposed between the conveying belt 12 and the pair of regulating guides 14A and 14B in the sheet width direction Y. The facing members 450 and 460 each support the end portion of a sheet which has been conveyed without being supported by one of the regulating guides 14A and 14B. The details of the facing members 450 and 460 will be described later.

The thus configured relay conveying apparatus 400 nips a sheet passed from the conveying roller pair 401 on the upstream side in the conveying direction X to the conveying belt 12 by the conveying belt 12 and balls 20 and then conveys the sheet by rotation of the conveying belt 12. At this time, although the details will be described later, both ends in the sheet width direction Y of the sheet conveyed by the conveying belt 12 are made to abut against guide surfaces 15A of the pair of regulating guides 14A and 14B. After abutting against the guide surfaces 15A, the sheet is conveyed in a direction parallel to the guide surfaces 15A while slipping on the conveying belt 12 with the both ends thereof following the guide surfaces 15A. The balls 20, which nip the sheet with the conveying belt 12 in this state, are rotatable in any direction, thus allowing the sheet to move in any direction while slipping on the conveying belt 12. With this configuration, the side registration and side skew of the sheet are corrected.

[Regulating Guide]

The following describes the detailed configuration of the pair of regulating guides 14A and 14B with reference to FIGS. 7A to 7D. Since the regulating guides 14A and 14B have the same configuration, FIGS. 7A to 7D only illustrate the regulating guide 14A. As illustrated in FIG. 6, the regulating guide 14A has the side plate part 15 having the guide surface 15A, the lower plate part 16 having the support surface 16A, and the upper plate part 17 having the facing surface 17A.

Figure 7A:
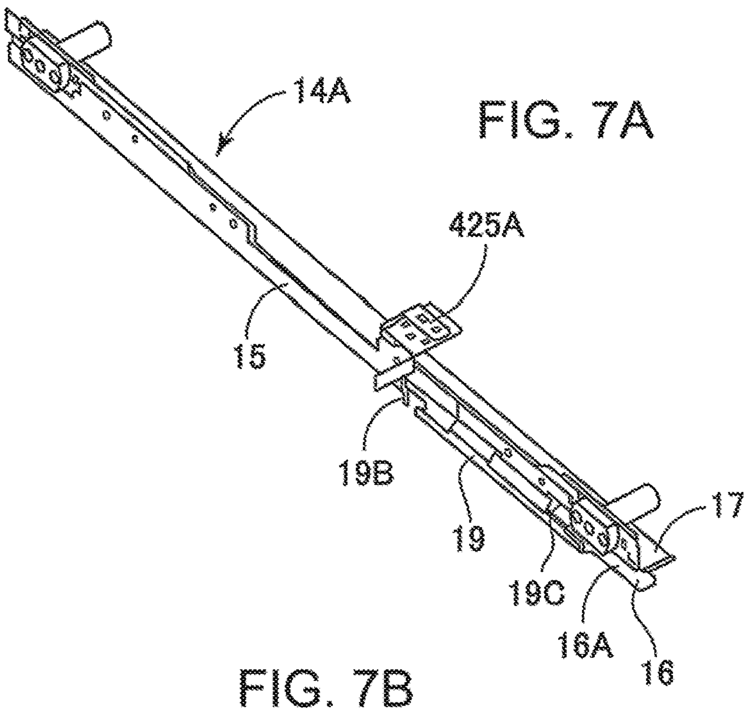
Figure 7B:
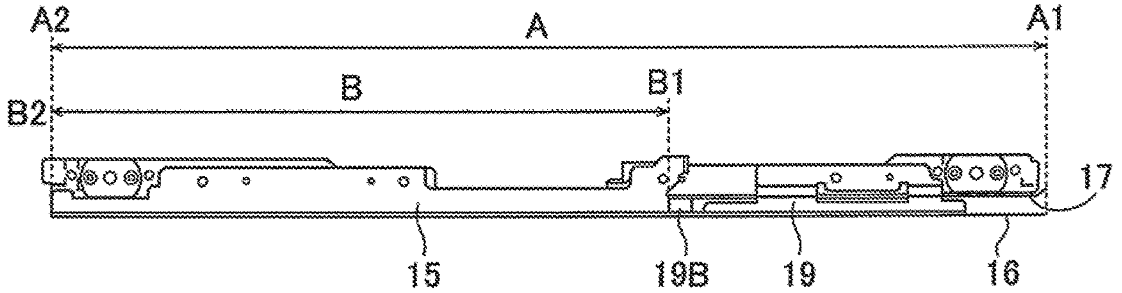

As illustrated in FIGS. 7A and 7B, the lower plate part 16 and upper plate part 17 are continuously formed substantially over the entire area of the regulating guide 14A in the longitudinal direction thereof. The regulating guide 14A is disposed substantially parallel to the conveying direction X as illustrated in FIG. 2 and other figures, and a range where the lower plate part 16 and upper plate part 17 are continued in the conveying direction X is defined as a predetermined area A. Thus, in the present embodiment, the support surface 16A of the lower plate part 16 and the facing surface 17A of the upper plate part 17 are continuously formed over the entire predetermined area A in the conveying direction X. The predetermined area A corresponds to substantially the entire area to which a sheet is conveyed by the displacement correction part 410.

Figure 7C:
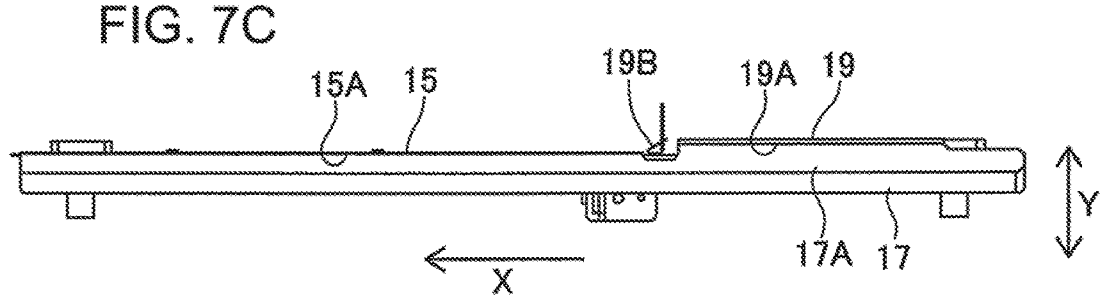
Figure 7D:
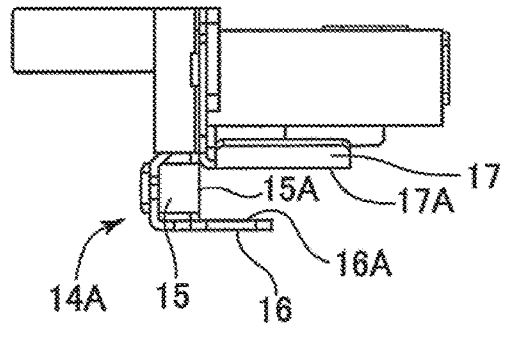

On the other hand, the side plate part 15 is formed over the entire guide area B which is shorter in length than the predetermined area A as illustrated in FIGS. 7A to 7C. In the present embodiment, the upstream end (conveying direction upstream end) B1 of the side plate part 15 in the conveying direction X is positioned downstream relative to an upstream end A1 of the predetermined area A in the conveying direction X. That is, the upstream end B1 of the guide surface 15A of the side plate part 15 in the conveying direction X is positioned downstream relative to the upstream end A1 of the predetermined area A. The guide surface 15A is continuously formed up to a downstream end A2 of the predetermined area A in the conveying direction X. Thus, the position of a downstream end B2 of the side plate part 15 in the conveying direction X and the position of the downstream end A2 of the predetermined area A in the conveying direction X are substantially the same in the conveying direction X.

In the present embodiment, a cutout part 19C is formed upstream from the upstream end B1 of the side plate part 15. An outer plate part 19 positioned outside the side plate part 15 in the sheet width direction Y is disposed at a part of the cutout part 19C. The outside in the sheet width direction Y refers to a side separated from the conveying belt 12 in the sheet width direction Y. Thus, as illustrated in FIG. 7C, an inner surface 19A of the outer plate part 19 is positioned outside the guide surface 15A which is the inner surface of the side plate part 15 in the sheet width direction Y. Further, an inclined plate part 19B inclined so as to be closer to the side plate part 15 as it goes further downstream is formed between the outer plate part 19 and the side plate part 15 in the conveying direction X.

In the thus configured pair of regulating guides 14A and 14B, the distance in the width direction Y between the inner surfaces 19A of the outer plate parts 19 on the upstream side in the conveying direction X is larger than the distance in the width direction Y between the guide surfaces 15A of the side plate part 15. Thus, although the details will be described later, in the course of conveyance, the both end edges in the width direction Y of a sheet passed from the conveying roller pair 401 on the upstream side to the conveying belt 12 are positioned between the inner surfaces 19A on the upstream side in the conveying direction X and then positioned between the guide surfaces 15A on the downstream side.

The outer plate part 19 and/or inclined plate part 19B may be omitted. However, if the end portion in the sheet width direction Y of the sheet passed from the conveying roller pair 401 positioned on the upstream side to the conveying belt 12 is positioned in the cutout part 19C, it may be caught at the upstream end B1 of the side plate part 15 in the subsequent course of conveyance. Thus, in the present embodiment, the outer plate part 19 and the inclined plate part 19B are provided, so that even when a sheet is displaced in the width direction Y from a proper position during conveyance, the position of the displaced sheet can be regulated by the outer plate part 19, and the end portion of the sheet can be guided to the guide surface 15A of the side plate part 15 by the inclined plate part 19B.

[Contact/Separation Mechanism of Conveying Roller Pair]

Figure 8:
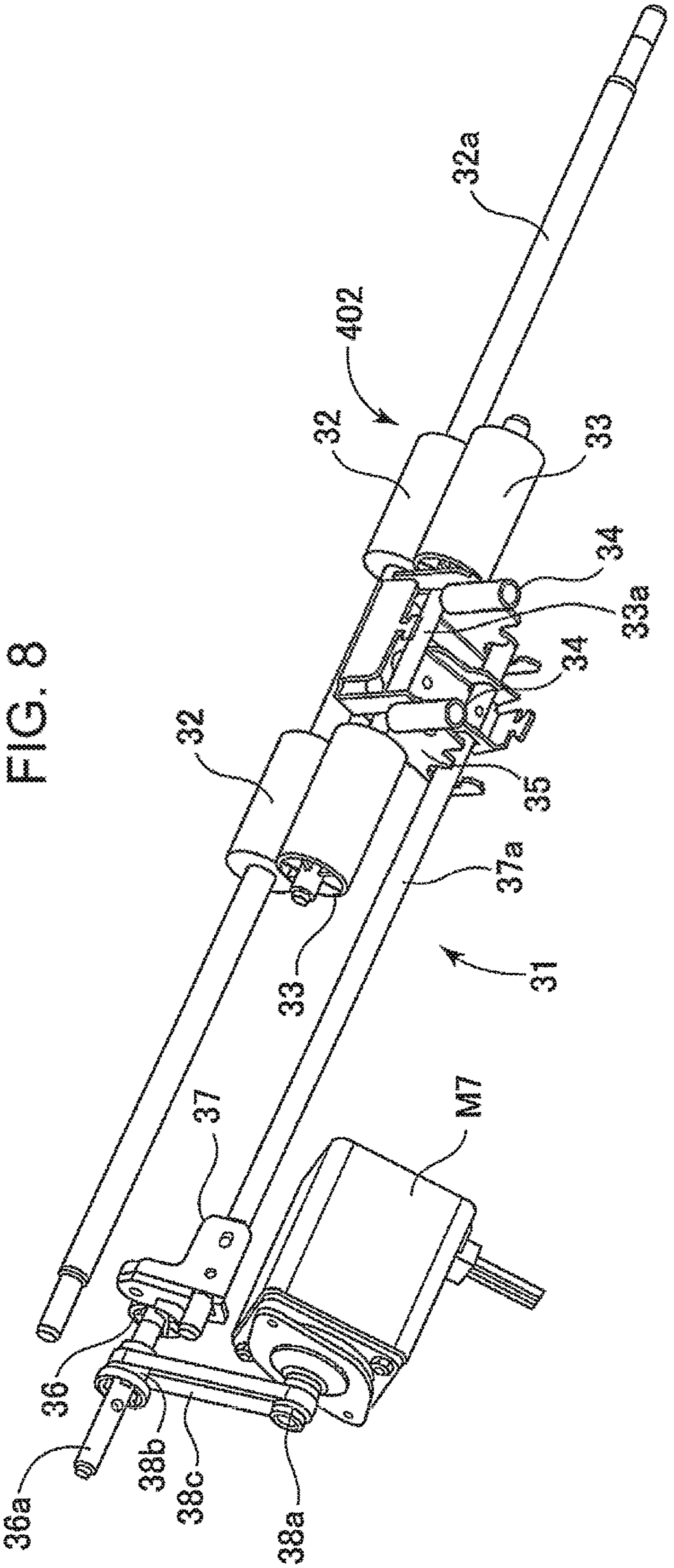
FIG. 8 is a perspective view illustrating a contact/separation mechanism of a conveying roller pair according to the embodiment.
Figure 9A:
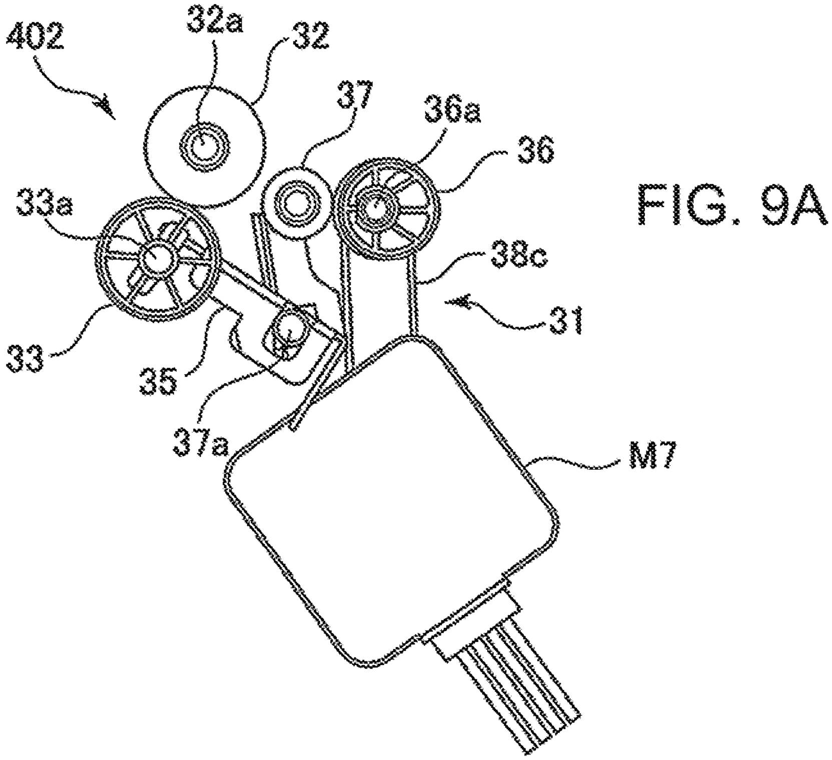
Figure 9B:
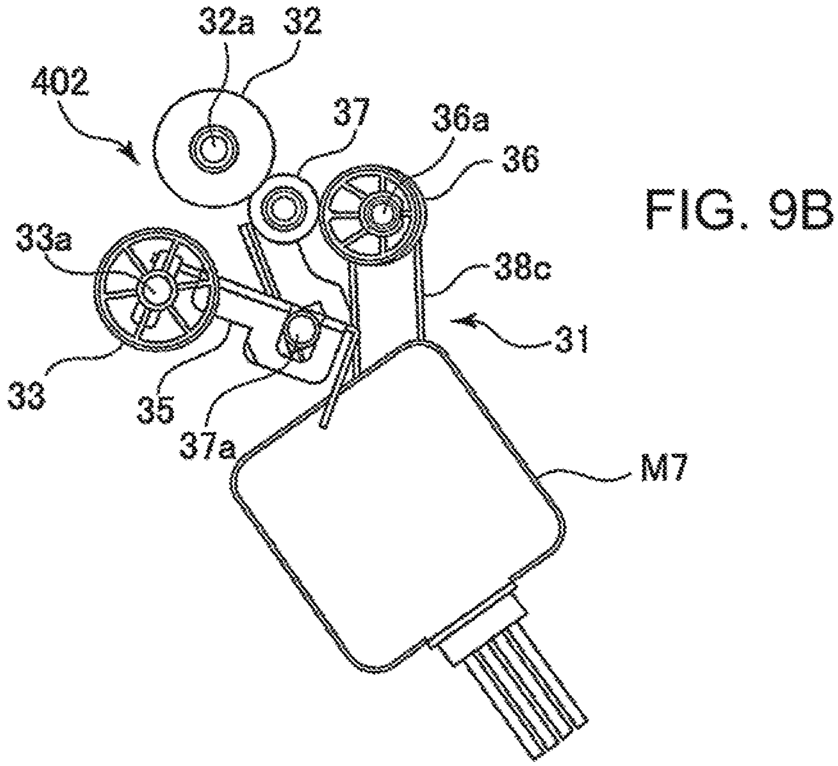

The following describes a contact/separation mechanism of the conveying roller pairs 401 to 403 with reference to FIGS. 8, 9A and 9B. As described above, the conveying roller pairs 401 to 403 are disposed upstream (401) and downstream (402, 403) relative to the conveying belt 12 in the conveying direction X. The conveying roller pairs 401 to 403 each have a pair of conveying rollers including a drive roller 32 and a driven roller 33. The drive roller 32 is an elastic roller obtained by providing an elastic body such as rubber around a rotary shaft 32*a*. The driven roller 33 contacts the drive roller 32 to form a nip portion for nipping and conveying a sheet with the drive roller 32. The drive roller 32 of the conveying roller pair 401, thee drive roller 32 of the conveying roller pair 402, and the drive roller 32 of the conveying roller pair 403 can be driven into rotation independently by the motor M4, the motor M5, and the motor M6, respectively.

In the present embodiment, the conveying roller pairs 402 and 403 disposed downstream (conveying direction downstream side) from the conveying belt 12 in the conveying direction X have a configuration allowing the drive roller 32 and the driven roller 33 to contact and separate from each other. The drive roller 32 and driven roller 33 of the conveying roller pair 402 and those of the conveying roller pair 403 can independently be made to contact and separate from each other by the motor M7 and the motor M8, respectively. Since the conveying roller pairs 402 and 403 have the same configuration, the following description will be made taking the conveying roller pair 402 as a representative example.

A contact/separation mechanism 31 for contact and separation of the drive roller 32 and driven roller 33 has a compression spring 34 as a biasing means, a support member 35, the motor M7, a separation cam 36, and a link member 37. The contact/separation mechanism 31 corresponds to a roller moving means that can move at least one of the pair of conveying rollers, i.e., the driven roller 33, to a nip position where the pair of conveying rollers can be brought into a nip state for sheet conveyance and a nip release position where the pair of conveying rollers are separated from the nip position.

The compression spring 34 is a spring for biasing the driven roller 33 toward the drive roller 32. The support member 35 supports a rotary shaft 33*a* of the driven roller 33 and is swingably supported about a swing shaft 37*a*. Further, the support member 35 is biased by the compression spring 34 in a direction pressing the driven roller 33 against the drive roller 32 about the swing shaft 37*a*. The support member 35 is fixed to the swing shaft 37*a* and rotates together therewith to move the driven roller 33 in directions toward and away from the drive roller 32.

The motor M7 drives the separation cam 36 into rotation through pulleys 38*a*, 38*b* and a belt 38*c*. The pulley 38*a* is fixed to the drive shaft of the motor M7, and the pulley 38*b* is fixed to a rotary shaft 36*a* of the separation cam 36. The belt 38*c* is an endless belt wound over the pulleys 38*a* and 38*b*. The separation cam 36 is an eccentric cam whose center of the outer peripheral surface is eccentric to the center of the rotary shaft 36*a* and rotates together with the rotary shaft 36*a* by receiving drive from the motor M7.

The link member 37 is fixed to the swing shaft 37*a* and swingable together therewith. Thus, the link member 37 rotates in sync with the support member 35 through the swing shaft 37*a*. The link member 37 is disposed so as to contact the separation cam 36 by the support member 35 biased by the compression spring 34.

When the separation cam 36 is in a phase illustrated in FIG. 9A, the driven roller 33 is brought into pressure contact with the drive roller 32 by the biasing force of the compression spring 34. This is the nip position illustrated in FIG. 9A. When the separation cam 36 is rotated by, e.g., 180° by the motor M7 in this state, the link member 37 is pushed by the separation cam 36 to swing in the counterclockwise direction in FIG. 9B about the swing shaft 37*a*, as illustrated in FIG. 9B. Then, the support member 35 coupled to the link member 37 through the swing shaft 37*a* swings in the same direction about the swing shaft 37*a*. The driven roller 33 is supported by the support member 35 through the rotary shaft 33*a* and is thus separated from the drive roller 32 by the swing of the support member 35. That is, the driven roller 33 is moved to the nip release position.

To move the driven roller 33 from the nip release position to the nip position, the separation cam 36 is further rotated by 180° by the motor M7 in the state of FIG. 9B. The contact/separation mechanism for contact and separation of the drive roller 32 and driven roller 33 may be configured to move both the drive roller 32 and driven roller 33. Further, although the separation/contact mechanism is driven by means of the motor in the above example, another drive source such as a solenoid may be used for contact and separation of the pair of conveying rollers.

Further, although both the conveying roller pairs 402 and 403 positioned downstream relative to the conveying belt 12 in the conveying direction X are configured to be able to contact and separate from each other in the above example, only the conveying roller pair 402 may be so configured. Further alternatively, the conveying roller pair 401 positioned upstream relative to the conveying belt 12 in the conveying direction X may be so configured. In this case, the conveying roller pair 401 alone may be so configured or the conveying roller pair 402 and/or 403 positioned on the downstream side may be so configured as well.

[Sheet Conveying Operation]

The following describes a sheet conveying operation in the relay conveying apparatus 400 according to the embodiment with reference to FIGS. 10A to 10D and FIG. 11, as well as FIGS. 2 and 3. In the present embodiment, the control part 203 (FIG. 1) controls the motors M2 and M3 (FIG. 2) according to a sheet conveying state to control the positions of the pair of regulating guides 14A and 14B in the sheet width direction Y to be changed. As described above, the control part 203 controls the motors M2 and M3 to drive the guide moving part 420 (FIG. 2) to thereby move each of the regulating guides 14A and 14B to the guide position and retracting position.

The guide position is a position where the end edge in the sheet width direction Y of a sheet being conveyed nipped by the conveying belt 12 and balls 20 can be guided by the guide surfaces 15A of the pair of regulating guides 14A and 14B. In the present embodiment, when the pair of regulating guides 14A and 14B are at the guide position, the distance between the guide surfaces 15A of the pair of regulating guides 14A and 14B is larger than the length in the sheet width direction Y of the sheet conveyed while being nipped by the conveying belt 12 and the balls 20.

More specifically, the guide position is a position where when a sheet is conveyed such that the center position of the sheet in the sheet width direction Y and the center position between the guide surfaces 15A on both sides coincide with each other and that the end edge of the sheet in the sheet width direction Y is parallel (center reference) to the guide surface 15A, the end edge of the sheet in the sheet width direction Y and the guide surface 15A are separated by a predetermined distance. The predetermined distance can be set appropriately for each apparatus, and a misalignment between the sheet and an image formed thereon due to displacement of the sheet in the predetermined distance is within an allowable range. The predetermined distance is, e.g., 0.5 mm. That is, the guide surfaces 15A of the pair of regulating guides 14A and 14B set at the guide position are separated by 0.5 mm from the end edges of the sheet in the sheet width direction Y. The control part 203 can appropriately set the guide position in accordance with sheet size.

As described above, the pair of regulating guides 14A and 14B set at the guide position are located such that the distance between the guide surfaces 15A thereof is larger than the length of the sheet in the sheet width direction Y, so that a conveying load of the sheet conveyed by the conveying belt 12 can be reduced. For example, in a case where the distance between the guide surfaces is set equal to the length of the sheet in the sheet width direction Y, the sheet is conveyed while the end portion thereof is rubbed against the guide surface, which may increase a conveying resistance. In particular, in the present embodiment, the sheet is conveyed while being nipped by the conveying belt 12 and balls 20, i.e., with a low nip pressure. Thus, when the conveying resistance of the sheet is large, a conveyance failure such as a delay or stoppage of sheet conveyance may be more likely to occur. Thus, in the present embodiment, the pair of regulating guides 14A and 14B are positioned as above so as to reduce the sheet conveying resistance.

It is preferable to correct side registration and side skew of the sheet (to perform sheet alignment operation) as will be described later by conveying the sheet on a center reference basis as described above. This is because, in the present embodiment, the side skew of the sheet is corrected with the sheet rotated while slipping between the conveying belt 12 and the balls 20. That is, by starting the alignment operation at a position (center reference) where the center of gravity of the sheet S and the center between the pair of regulating guides 14A and 14B substantially coincide with each other, damage to the sheet during the alignment operation can be reduced.

The retracting position is a position where the guide surfaces 15A of the pair of regulating guides 14A and 14B retract from the end edges of the sheet in the sheet width direction Y by a distance larger than the guide position. In other words, the distance in the sheet width direction Y between the guide surfaces 15A of the pair of regulating guides 14A and 14B at the retracting position is larger than the distance in the sheet width direction Y between the guide surfaces 15A of the pair of regulating guides 14A and 14B at the guide position. In the present embodiment, a position separated from the end edge in the sheet width direction Y of the sheet conveyed on a center reference basis by 5 mm is set as the retracting position. The sheet S is passed to the conveying belt 12 in a state where the regulating guides 14A and 14B are each at the retracting position and, in this state, vertical movement of the sheet S is regulated by the support surface 16A and the facing surface 17A. Thus, even when the sheet S is curled, the both end edges of the sheet S can be made to fall within an area surrounded by the guide surface 15A, support surface 16A, and facing surface 17A during movement of the regulating guides 14A and 14B from the retracting position to the guide position.

Figure 10A:
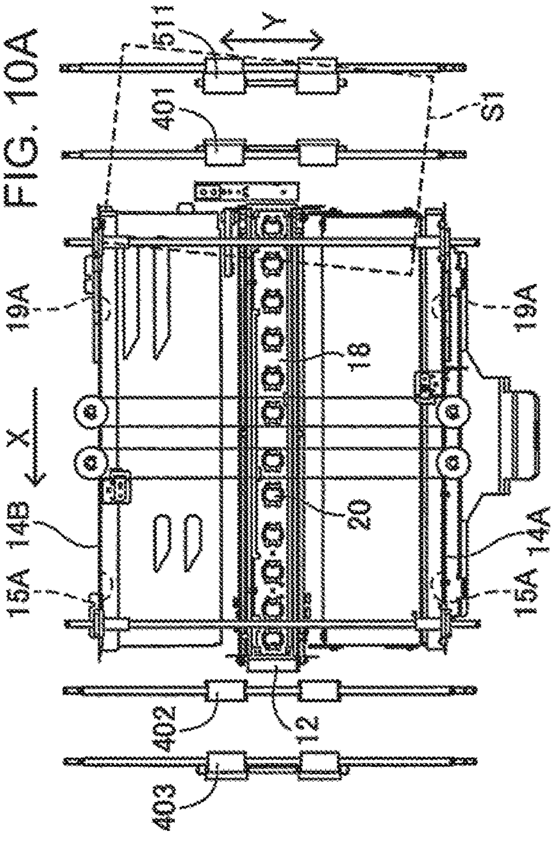

The following describes the operation of the pair of regulating guides 14A and 14B when two sheets S1 and S2 are continuously conveyed to the relay conveying apparatus 400 with reference to FIGS. 10A to 10D and 11. First, as illustrated in FIG. 10A, the first sheet S1 is conveyed from the conveying roller pair 401 on the upstream side to the conveying belt 12. At this time, the control part 203 moves each of the pair of regulating guides 14A and 14B to the retracting position. That is, if the pair of regulating guides 14A and 14B are positioned at the guide position when the sheet S1 is passed to the conveying belt 12, the end portion of the sheet S1 may interfere with one of the regulating guides 14A and 14B due to skew of the sheet S1 or displacement of the sheet S1 in the sheet width direction Y (if there is any) to cause a conveyance failure of the sheet S1.

Figure 10B:
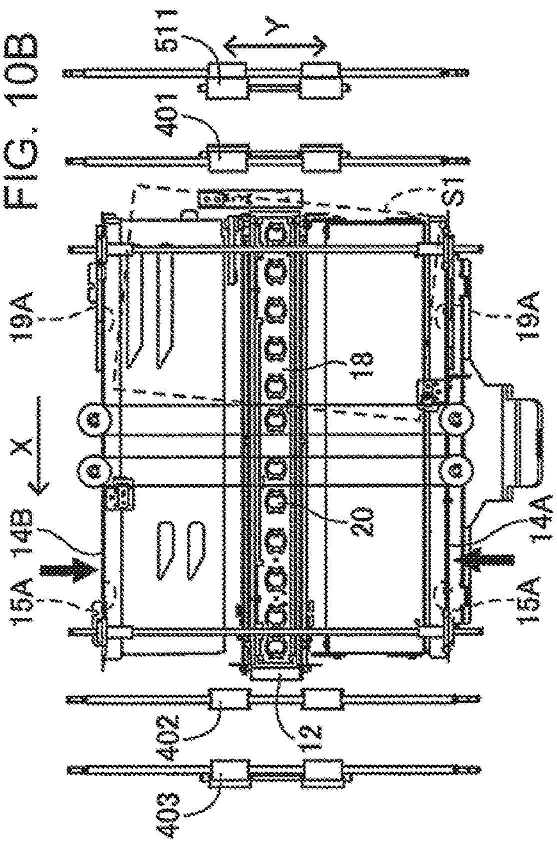

Then, as illustrated in FIG. 10B, the control part 203 causes the pair of regulating guides 14A and 14B to move from the retracting position to the guide position after the rear end (upstream end) of the first sheet S1 passed from the conveying roller pair 401 to the conveying belt 12 is passed through the conveying roller pair 401. In the present embodiment, the pair of regulating guides 14A and 14B are moved from the retracting position to the guide position in a state where the sheet S1 passed to the conveying belt 12 is located within the predetermined area A (FIG. 7B, within a predetermined area). With this operation, side registration and side skew of the sheet S1 are corrected (aligning operation).

More specifically, when the sheet S1 occurs on the upstream side in the conveying direction X, the regulating guides 14A and 14B are each located at the retracting position, where the both end edges of the sheet S1 are separated from the guide surfaces 15A. After that, the sheet S1 is conveyed downstream, and the rear end of the sheet S1 passes the conveying roller pair 401. At this time, the regulating guides 14A and 14B move to their guide positions to make the guide surfaces 15A abut against the both end edges of the sheet S1 in the sheet width direction Y. When receiving abutment of the guide surfaces 15A, the sheet S1 is conveyed in a direction parallel to the guide surfaces 15A while slipping on the conveying belt 12 with the end edges thereof following the guide surfaces 15A. Thus, side registration and side skew of the sheet S1 are corrected.

In the present embodiment, the control part 203 makes each of the pair of regulating guides 14A and 14B reach the guide position from the retracting position during the time when the sheet is conveyed while being nipped by the conveying belt 12 and balls 20. This allows side registration and side skew of the sheet to be corrected without stopping the conveyance of the sheet, thus increasing productivity. However, the alignment operation of moving each of the pair of regulating guides 14A and 14B from the retracting position to the guide position may be performed after the conveyance of the sheet is once stopped. In this case, the correction of displacement can be made more reliably, although productivity falls.

Figure 10C:
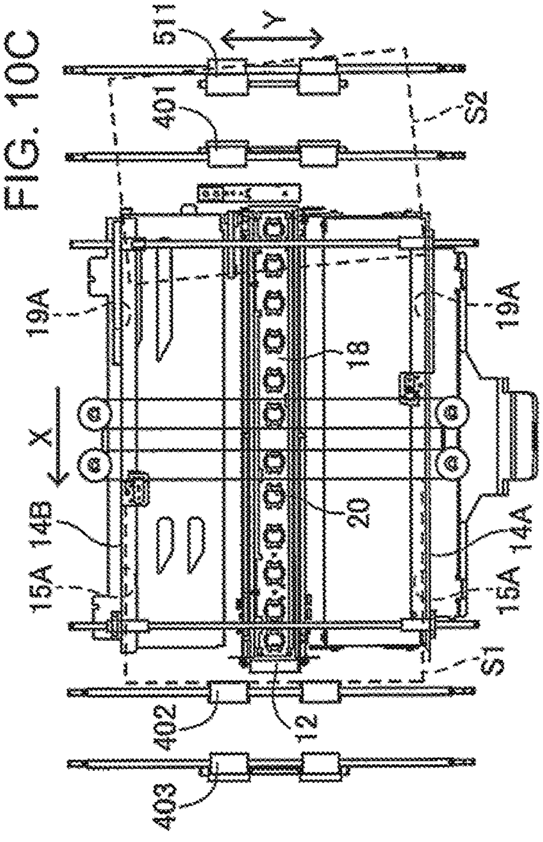

Then, as illustrated in FIG. 10C, each of the pair of regulating guides 14A and 14B is kept at the guide position in a state where the front end of the second sheet S2 passed from the conveying roller pair 401 to the conveying belt 12 enters the predetermined area A. At this time, the first sheet S1 is guided by the guide surfaces 15A in the guide area B (FIG. 7B). That is, in the present embodiment, the second sheet S2 starts entering the predetermined area A during the time when the first sheet S1 is guided by the pair of regulating guides 14A and 14B.

Figure 11:
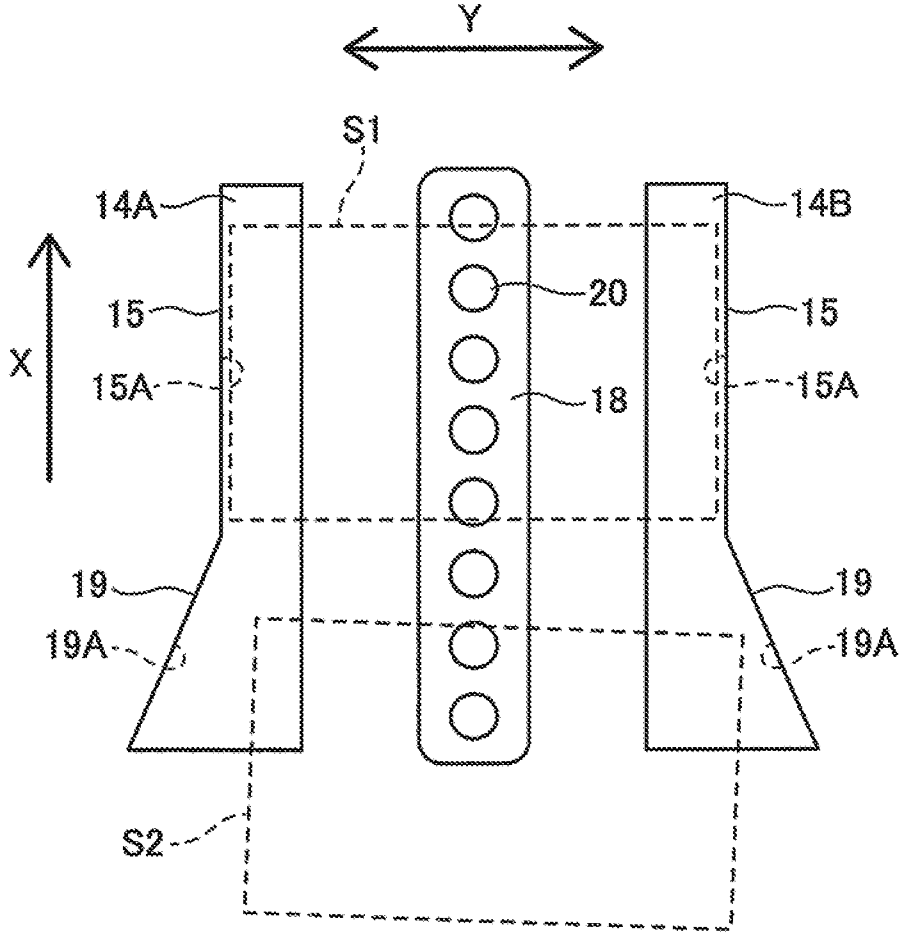
FIG. 11 is a view for explaining that a succeeding sheet does not hit the regulating guide during displacement correction for a preceding sheet.

As illustrated in FIG. 11, the inner surfaces 19A of the outer plate parts 19 the distance between which is larger than that between the guide surfaces 15A exist upstream from the upstream end B1 (FIG. 7B) of the guide surface 15A in the conveying direction X. In the example of FIG. 11, the inner surface 19A is inclined so as to be closer to the guide surface 15A as it goes further downstream; however, the inner surface 19A may be made parallel to the conveying direction X. In either case, the inner surface 19A is positioned outside the guide surface 15A in the sheet width direction Y, so that even when the pair of regulating guides 14A and 14B are at the guide position, the distance between the inner surfaces 19A is larger than that between the guide surfaces 15A. Thus, even when the second sheet S2 enters the predetermined area A while skewing or being displaced in the sheet width direction Y in this state, the end portion of the sheet S2 is less liable to interfere with the pair of regulating guides 14A and 14B. Thus, in the present embodiment, even when the second sheet S2 is conveyed at the timing described above, a sheet conveyance failure is less likely to occur, and productively can be increased.

Figure 10D:
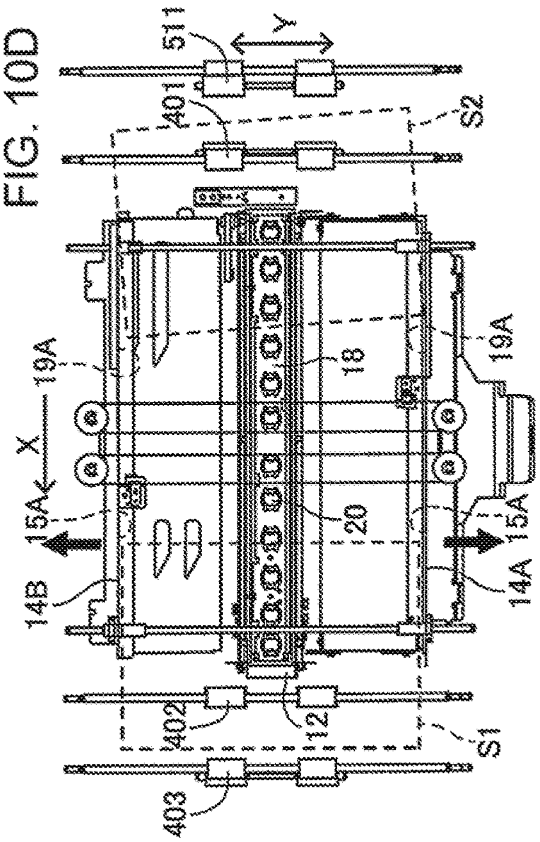

Then, as illustrated in FIG. 10D, the control part 203 moves each of the pair of regulating guides 14A and 14B from the guide position to the retracting position before the front end of the second sheet S2 reaches the upstream end B1 of the guide surface 15A in the conveying direction X. In this state, alignment operation for the first sheet S1 has been completed, and the sheet S1 has been passed to the conveying roller pair 402 positioned on the downstream side. Thus, the movement of each of the pair of regulating guides 14A and 14B to the retracting position does not affect the position of the sheet S1. Further, each of the pair of regulating guides 14A and 14B is moved to the retracting position before the second sheet S2 reaches the guide surface 15A, so that the end portion of the second sheet S2 can be prevented from interfering with the upstream end B1 of the guide surface 15A when it passes the inner surface 19A of the outer plate part 19, thus preventing the occurrence of a sheet conveyance failure.

Thereafter, as described with reference to FIG. 10B and subsequent figures, the control part 203 makes each of the pair of regulating guides 14A and 14B reach the guide position from the retracting position after the rear end of the second sheet S2 passes the conveying roller pair 401. In the present embodiment, each of the pair of regulating guides 14A and 14B is made to reach the guide position from the retracting position after the front end of the second sheet S2 passes the upstream end B1 of the guide surface 15A in the conveying direction X, and then alignment operation for the second sheet S2 is performed. For the third and subsequent sheets, if any, the operations illustrated in FIGS. 10C, 10D, and 10B are performed in this order. When the third sheet is the final sheet, it is passed to the conveying roller pair 402 to complete the sheet alignment operation.

The control part 203 can grasp the position of the sheet in the conveying direction X based on sheet size, sheet detection timing of a sensor for detecting a sheet existing in any of the conveying paths, and sheet conveying speed.

Thus, in the present embodiment, each of the pair of regulating guides 14A and 14B is made to reach the guide position from the retracting position after the rear end of the sheet passed to the conveying belt 12 passes the conveying roller pair 401 positioned on the upstream side. This makes it possible for the pair of regulating guides 14A and 14B to hardly interfere with the sheet at the time when the sheet is passed to the conveying belt 12. Further, each of the pair of regulating guides 14A and 14B is not at the guide position while the sheet is being conveyed by the conveying roller pair 401 on the upstream side, so that it is possible to prevent the sheet being conveyed by the conveying roller pair 401 from being bent due to abutment against the regulating guide.

Further, each of the pair of regulating guides 14A and 14B is moved to the guide position after the rear end of the sheet passes the conveying roller pair 401, so that, in order to correct sheet displacement, it is unnecessary to obliquely convey a sheet so as to achieve abutment between the sheet and the regulating guide. This makes it possible to perform the correction of sheet displacement even if a length for sheet conveyance is not increased, which in turn can prevent an increase in apparatus size. That is, it is possible to correct displacement of the sheet in the sheet width direction Y while preventing an increase in apparatus size.

[Conveying Operation for Cardboard]

Figure 12A:
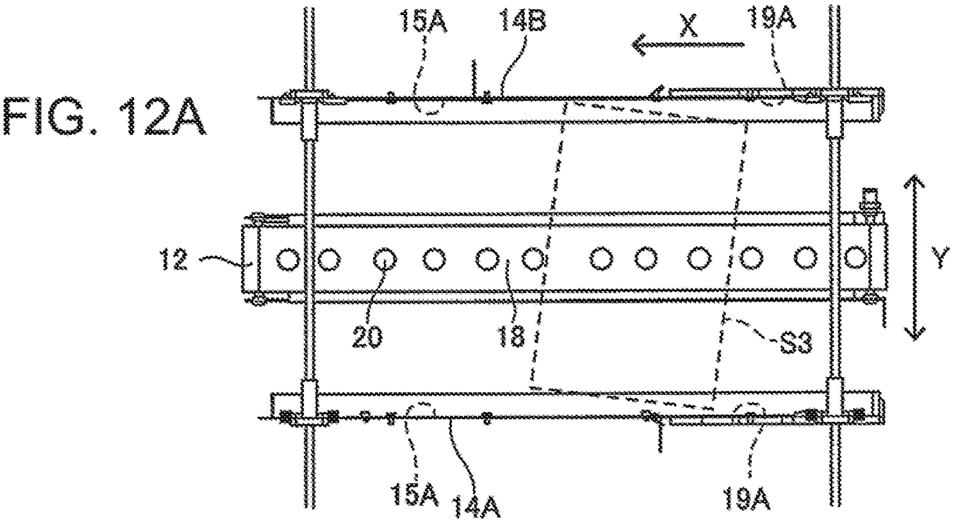
Figure 12B:
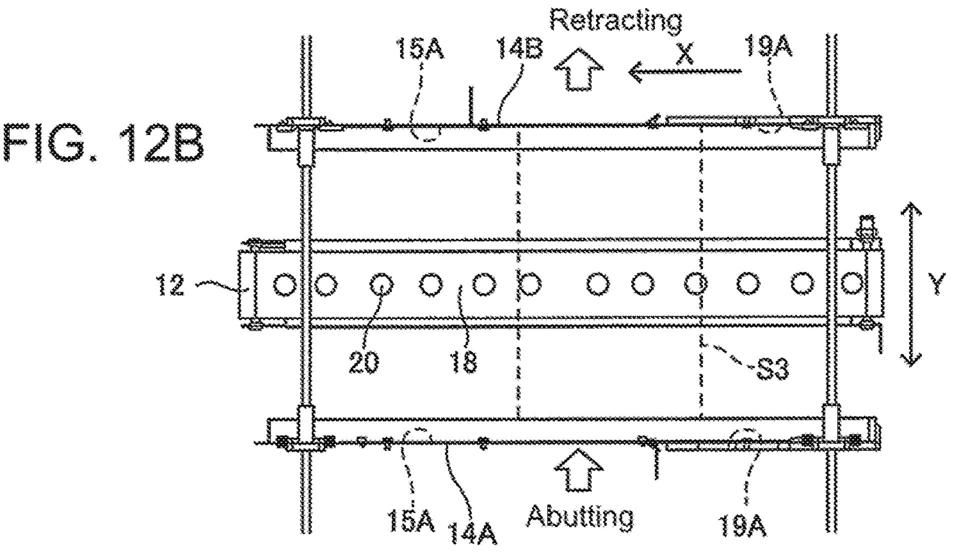
Figure 12C:
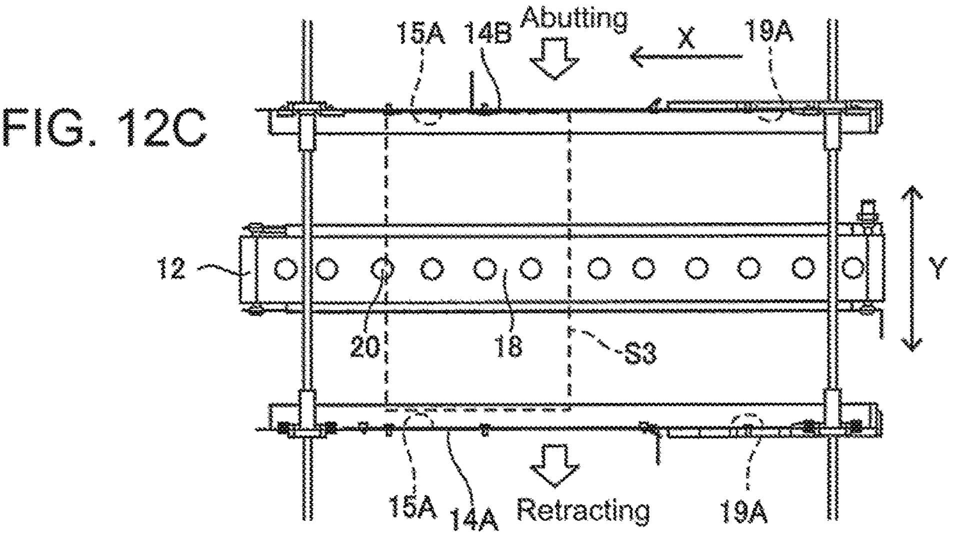

The following describes a conveying operation for a sheet S3 having a basis weight equal to or more than a predetermined value with reference to FIGS. 12A to 12C. The predetermined value is, e.g., 100 g/m$^2$. When the basis weight is equal to or more than a predetermined value, i.e., when the rigidity of a sheet is high, a conveying resistance may increase when the both end edges of the sheet is held by the pair of regulating guides 14A and 14B or when correction of side registration or the like is performed with the end edge of the sheet and the guide surface 15A separated by a minute gap. An increase in the conveying resistance may cause a delay of sheet conveyance. Thus, in the present embodiment, for a sheet like a cardboard, the regulating guides 14A and 14B are individually made to abut against the end edge of a sheet for side registration or side skew correction. The details will be described below.

In the present embodiment, the guide moving part 420 (FIG. 2) can independently move the regulating guides 14A and 14B, as described above. Specifically, the first moving part 420A (FIG. 2) of the guide moving part 420 can move one of the pair of regulating guides 14A and 14B, i.e., the regulating guide 14A to a first guide position where one end edge of a sheet in the sheet width direction Y is guided and a first retracting position retracting from the one end edge of the sheet by a distance larger than the first guide position. Similarly, the second moving part 420B (FIG. 2) of the guide moving part 420 can move the other one of the pair of regulating guides 14A and 14B, i.e., the regulating guide 14B to a second guide position where the other end edge of a sheet in the sheet width direction Y is guided and a second retracting position retracting from the other end edge of the sheet by a distance larger than the second guide position.

As illustrated in FIG. 12A, when the sheet S3 such as a cardboard is passed to the conveying belt 12, the pair of regulating guides 14A and 14B are located at their respective retracting positions. That is, the regulating guide 14A is located at the first retracting position, and the regulating guide 14B is located at the second retracting position.

Then, as illustrated in FIG. 12B, the control part 203 causes the regulating guide 14A to move to the first guide position after the rear end of the sheet S3 is passed through the conveying roller pair 401 (FIG. 3, etc.) and, at the same time, locates the regulating guide 14B at the second retracting position. That is, the guide surface 15A of the regulating guide 14A is made to abut against one end edge of the sheet S3, while the regulating guide 14B is held at the second retracting position to make the guide surface 15A of the regulating guide 14B retract from the other end edge of the sheet S3.

Thereafter, as illustrated in FIG. 12C, the control part 203 causes the regulating guide 14B to move to the second guide position and, at the same time, the regulating guide 14A to the first retracting position. That is, the guide surface 15A of the regulating guide 14B is made to abut against the other end edge of the sheet S3, while the regulating guide 14A is moved to the first retracting position to make the guide surface 15A of the regulating guide 14A retract from the one end edge of the sheet S3.

In the present embodiment, the regulating guides 14A and 14B are individually made to abut the end edge of the sheet S3 and, during abutment of one regulating guide, the other regulating guide is made to retract from the end edge of the sheet S3. This can prevent the conveying resistance of the sheet S3 from increasing. The order of which the first and second regulating guides 14A and 14B are made to abut is not limited to the above, and the regulating guide 14B may be made to abut first and the regulating guide 15 next.

When the basis weight of the sheet passed from the conveying roller pair 401 to the conveying belt 12 is less than a predetermined value (for example, in the case of a plain paper), the regulating guides 14A and 14B are both made to reach the guide position from the retracting position after the rear end of the sheet passes the conveying roller pair 401, as described using FIGS. 10A to 10D.

[Conveying Operation for Long Sheet]

Figure 13A:
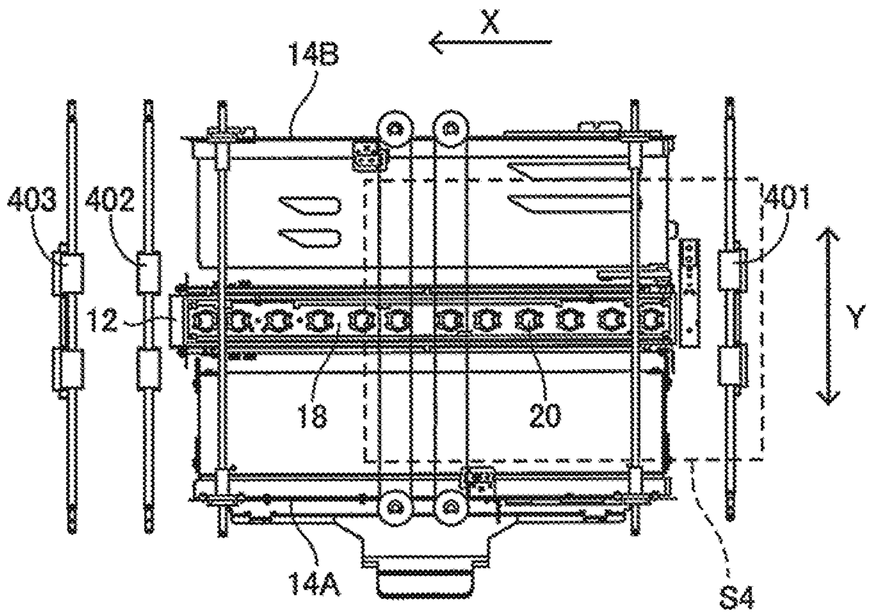
Figure 13B:
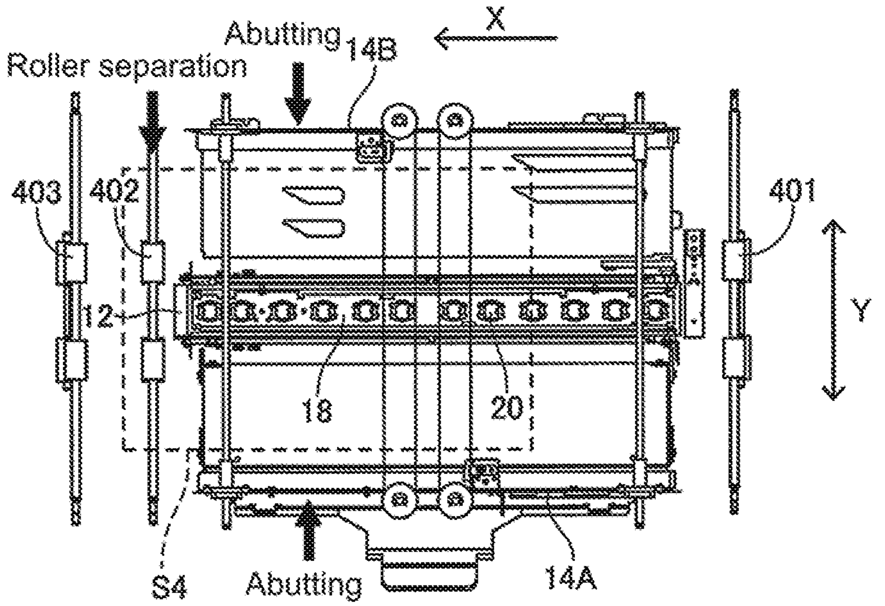

The following describes a conveying operation for a sheet S4 (long sheet, etc.) having a size equal to or more than a predetermined size with reference to FIGS. 13A and 13B, as well as FIGS. 4, 7A to 7D, and 8. In the case of the sheet S4 like a long sheet, i.e., when the length in the conveying direction X is equal to or more than a predetermined length, the downstream or upstream portion of the sheet in the conveying direction X may be nipped by the conveying roller pair while side registration or side skew is corrected by the pair of regulating guides 14A and 14B. In a state where the sheet is nipped by the conveying roller pair, correction (alignment operation) such as side registration correction may not be satisfactory performed even with the abutment of the pair of regulating guides 14A and 14B against the end edge of the sheet, or the sheet may be bent. The "predetermined length" of the sheet is a length in the sheet conveying direction larger than the distance between the nip point of the conveying roller pair 401 on the upstream side and the nip point of the conveying roller pair 402 on the downstream side.

On the other hand, for the purpose of performing the alignment operation while preventing the long sheet from being nipped by the conveying roller pair, it is conceivable to increase a length in the conveying direction X for the pair of regulating guides 14A and 14B to guide the sheet; however, in this case, the apparatus size increases. Thus, in the present embodiment, the nip of the conveying roller pair 402 on the downstream side is released when the alignment operation for the sheet S4 having a size equal to or larger than a predetermined size is carried out.

As described above, the conveying roller pairs 402 and 403 positioned on the downstream side are each configured such that the drive roller 32 and the driven roller 33 can contact and separate from each other (e.g., FIG. 4). Further, the contact/separation mechanism 31 for contact and separation of the drive roller 32 and driven roller 33 has the motors M7 and M8 controlled by the control part 203. That is, the control part 203 can make the drive roller 32 and the driven roller 33 to contact and separate from each other by controlling the contact/separation mechanism 31.

In the present embodiment, the control part 203 can perform a nip release operation to set the conveying roller pairs 402 and 403 to a nip release position when the guide moving part 420 moves each of the pair of regulating guides 14A and 14B from the retracting position to the guide position. This will be described more specifically below with reference to FIGS. 13A and 13B.

As illustrated in FIG. 13A, when the sheet S4 is passed from the conveying roller pair 401 positioned on the upstream side to the conveying belt 12, each of the pair of regulating guides 14A and 14B is located at the retracting position. Then, as illustrated in FIG. 13B, after the sheet S4 is further conveyed downstream to make the rear end of the sheet S4 pass the conveying roller pair 401 on the upstream side, the control part 203 sets the conveying roller pairs 402 and 403 positioned on the downstream side to the nip release position. At the same time, the control part 203 makes each of the pair of regulating guides 14A and 14B reach the guide position from the retracting position. That is, after the rear end of the sheet S4 passes the conveying roller pair 401 on the downstream side, each of the pair of regulating guides 14A and 14B is made to reach the guide position. As described above, in the present embodiment, the nip release operation is performed at the same time when each of the pair of regulating guides 14A and 14B is moved from the retracting position to the guide position by the guide moving part 420.

The alignment operation of making each of the pair of regulating guides 14A and 14B reach the guide position from the retracting position and the nip release operation may not necessarily be performed at the same time. For example, when the front end (downstream end) of the sheet does not reach the conveying roller pair 402 on the downstream side in a state where the rear end of the sheet has passed the conveying roller pair 401 on the upstream side, the alignment operation may be performed first, and then the nip release operation may be performed before the front end of the sheet reaches the conveying roller pair 402 on the downstream side. Further, for such a long sheet that the front end of the sheet reaches the conveying roller pair 402 before the rear end of the sheet passes the conveying roller pair 401, the nip release operation of the conveying roller pair 402 is performed before the front end of the sheet reaches the conveying roller pair 402.

After completion of the alignment operation for the sheet S4, the conveying roller pairs 402 and 403 on the downstream side are set back from the nip release position to nip position, and the sheet S4 is conveyed further downstream by the conveying roller pairs 402 and 403. The timing at which the conveying roller pairs 402 and 403 are set back to the nip position is not later than before the rear end of the sheet S4 passes the downstream end of the conveying belt 12.

Further, the control part 203 uses the contact/separation mechanism 31 to set the conveying roller pairs 402 and 403 from the nip release position to the nip position and then moves each of the pair of regulating guides 14A and 14B from the guide position to the retracting position. Here, if the sheet is nipped by the conveying roller pair 402 after completion of the movement of each of the pair of regulating guides 14A and 14B to the retracting position, the sheet may be displaced due to the sheet nip operation. On the other hand, in the present embodiment, each of the pair of regulating guides 14A and 14B is moved to the retracting position after the sheet is nipped by the conveying roller pairs 402 and the like, so that the sheet has already been guided by the pair of regulating guides 14A and 14B at the time of nipping the sheet, thus preventing the sheet from being unintentionally displaced.

Further, by moving each of the pair of regulating guides 14A and 14B to the retracting position after the sheet is nipped by the conveying roller pair 402, it is possible to prevent a subsequent sheet from interfering with the pair of regulating guides 14A and 14B, thus increasing productivity. The movement of each of the pair of regulating guides 14A and 14B to the retracting position may be started at the same time as the start of the movement of the conveying roller pairs 402 and 403 from the nip release position to the nip position. By moving each of the pair of regulating guides 14A and 14B to the retracting position at an earlier timing, a subsequent sheet can be passed to the conveying belt 12 as early as possible, thereby increasing productivity.

In the present embodiment, by thus performing the nip release operation, it is possible for the pair of regulating guides 14A and 14B to perform the alignment operation even when the downstream end of the sheet S4 has reached the conveying roller pair 402 (and the conveying roller pair 403). Thus, it is possible to perform the alignment operation for a sheet having a length equal to or larger than the predetermined length without involving an increase in the apparatus size.

When the length of the sheet is less than the predetermined length, the nip release operation of the conveying roller pair is not performed during the alignment operation, so that the number of times of the contact/separation operation of the conveying roller pair can be reduced. The contact/separation operation may cause the components constituting the contact/separation mechanism 31 to wear or to generate noise. Thus, by reducing the number of times of the contact/separation operation as much as possible, it is possible to prevent the components from wearing or generating noise.

However, the nip release operation of the conveying roller pair may be performed during the alignment operation as described above in the cases other than the case where the length of the sheet is equal to or more than the predetermined length. This can further reduce the length in the conveying direction X of the displacement correction part 410 that performs the sheet alignment operation, which in turn can reduce the apparatus size.

As described above with reference to FIGS. 12A to 12C, for a sheet having a basis weight equal to or more than a predetermined value, the pair of regulating guides 14A and 14B are individually made to abut against the sheet for sheet alignment. In the case where the sheet having a basis weight equal to or more than a predetermined value has a large length, the conveying roller pairs 402 and 403 are set to the nip release position during the alignment operation therefor. Specifically, the rear end of the sheet passes the conveying roller pair 401 positioned on the upstream side, and one of the pair of regulating guides 14A and 14B is moved to the guide position for the alignment operation, at the same time as which, the conveying roller pairs 402 and 403 are set to the nip release position. Then, after completion of the alignment operation, the conveying roller pairs 402 and 403 are set back to the nip position. Similarly to the above, the start timing of the alignment operation and that of the nip release operation may be different.

In the above description, the conveying roller pairs 402 and 403 perform the nip release operation; however, only the conveying roller pair 402 may perform the nip release operation. Further, when the drive roller 32 and driven roller 33 of only the conveying roller pair 401 on the upstream side are configured to be able to contact and separate from each other, the conveying roller pair 401 may perform the nip release operation. That is, the control part 203 may perform the nip release operation of setting the conveying roller pair 401 to the nip release position when the guide moving part 420 makes each of the pair of regulating guides 14A and 14B reach the guide position from the retracting position. For example, in the state of FIG. 13A, the conveying roller pair 401 is set to the nip release position, and the pair of regulating guides 14A and 14B are moved to the guide position.

The nip release operation of the upstream-side conveying roller pair 401 will be described in more detail. A sheet is conveyed by the conveying roller pair 511 (FIG. 4, etc.) disposed upstream relative to the conveying roller pair 401, and the nip of the conveying roller pair 401 is released after the front end of the sheet is nipped between the conveying belt 12 and the balls 20. Thereafter, the regulating guides 14A and 14B are each made to reach the guide position after the rear end of the sheet passes the conveying roller pair 511. After that, when the front end of the sheet is nipped by the conveying roller pair 402 on the downstream side, the regulating guides 14A and 14B are each moved to the retracting position. Then, when the rear end of the sheet passes the conveying roller pair 401 on the upstream side, the conveying roller pair 401 is set back from the nip release position to the nip position.

Alternatively, all the conveying roller pairs 401 to 403 on both the upstream and downstream sides may each be configured to be able to contact and separate from each other. In this case, all the conveying roller pairs 401 to 403 may perform the nip release operation at the same time as the start of the alignment operation. Alternatively, the timings of the nip release operation may be made different among the conveying roller pairs 401 to 403 depending on the sheet length or conveyance state. For example, when a sheet is conveyed straddling over a plurality of conveying roller pairs, all the relevant conveying roller pairs are set to the nip release position during the alignment operation. Alternatively, the nip release operation may be performed sequentially from the upstream side to the downstream side in accordance with a sheet conveying state such that the sheet is not nipped by any conveying roller pair during the alignment operation.

Further, the number of the conveying roller pairs that perform the nip release operation may be changed in accordance with the sheet size. For example, the conveying roller pair 402 is assumed to be a first conveying roller pair, and the conveying roller pair 403 is assumed to be a second conveying roller pair. The conveying roller pair 403 is disposed farther from the conveying belt 12 than the conveying roller pair 402. Further, the contact/separation mechanism 31 that can move the conveying roller pair 403 to the nip position and nip release position is assumed to be a second roller moving means.

In this case, the control part 203 can operate the conveying roller pairs 402 and 403 as follows by controlling the contact/separation mechanism 31 as the roller moving means and second roller means. When the length of the sheet in the conveying direction is a second predetermined length greater than the predetermined length, the conveying roller pairs 402 and 403 are set to the nip release position when each of the pair of regulating guides 14A and 14B is made to reach the guide position from the retracting position; when the length of the sheet in the conveying direction is smaller than the second predetermined length and greater than the predetermined length, only the conveying roller pair 402 is set to the nip release position with the conveying roller pair 403 kept set to the nip position when each of the pair of regulating guides 14A and 14B is made to reach the guide position from the retracting position.

The above operation of the conveying roller pairs 402 and 403 may be performed by the upstream-side and downstream-side roller pairs (i.e., conveying roller pairs 401 and 402). Further, in a case where all the conveying roller pairs 401 to 403 are each configured to be able to contact and separate from each other and where the length of the sheet is a third predetermined length greater than the second predetermined length, all the conveying roller pairs 401 to 403 may be set to the nip release position during the alignment operation.

The above-mentioned sheet basis weight and sheet size are based on information input through an input part (e.g., operation panel) 1001 (FIG. 1) provided in the image forming system 1000. For example, a user inputs, through the input part 1001, information such as basis weight or size of the sheets stored in the feeding deck 500. The control part 203 determines the basis weight or size of the sheets to be conveyed to the relay conveying apparatus 400 based on the input information. The input part 1001 may be an operation panel or other member provided in one of the image forming apparatus 100, multi-stage feeder 200, and feeding deck 500, or may be an external terminal such as a personal computer connected to the image forming system 1000.

Alternatively, a sensor for detecting the sheet basis weight or size may be provided in the conveyance path from the feeding deck 500 to the relay conveying apparatus 400 or in the feeding deck 500 to detect such information.

[Operation at Occurrence of Sheet Jam]

Figure 15:
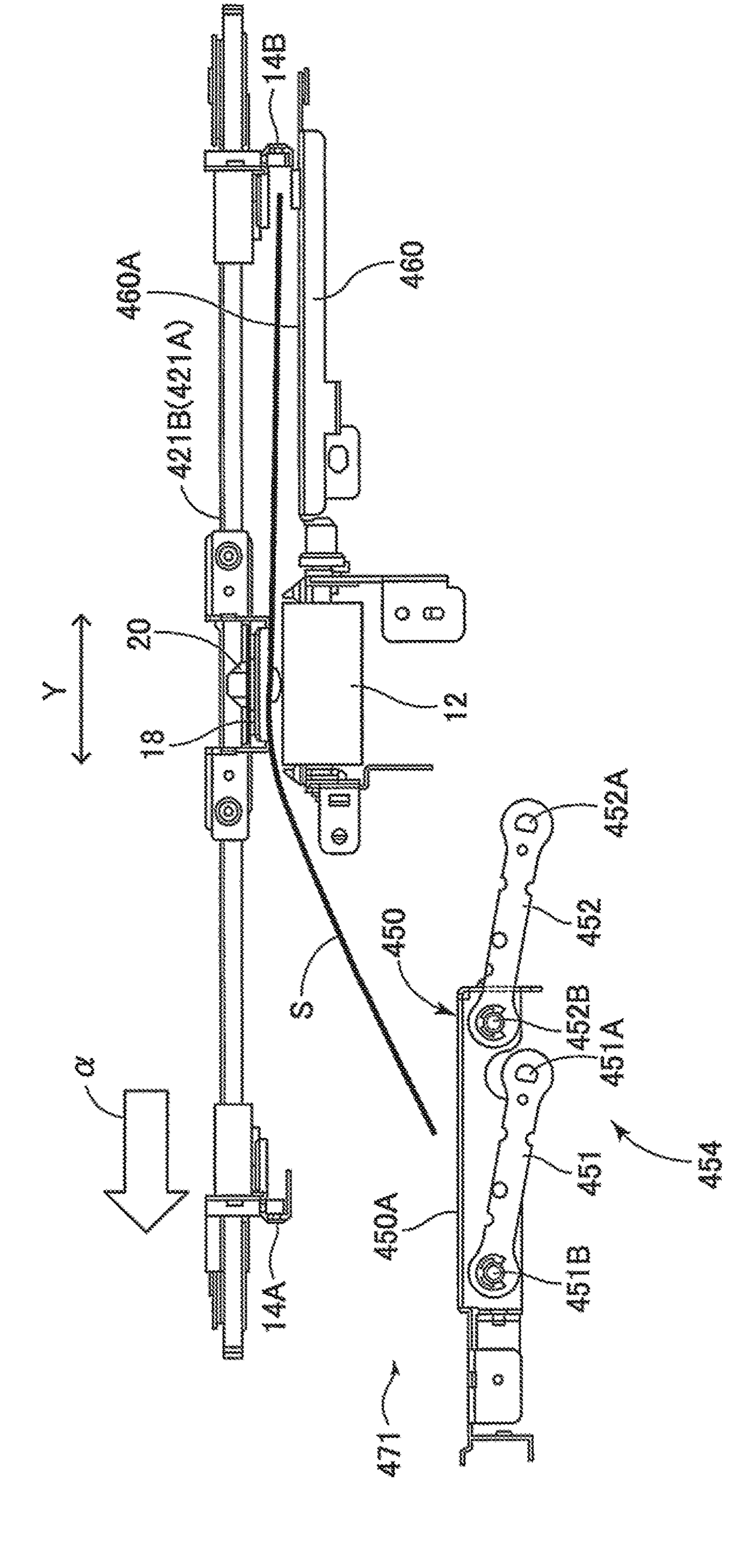
FIG. 15 is a cross-sectional view of the relay conveying apparatus according to the embodiment in a state where the facing member is located at a take-out position.
Figure 16:
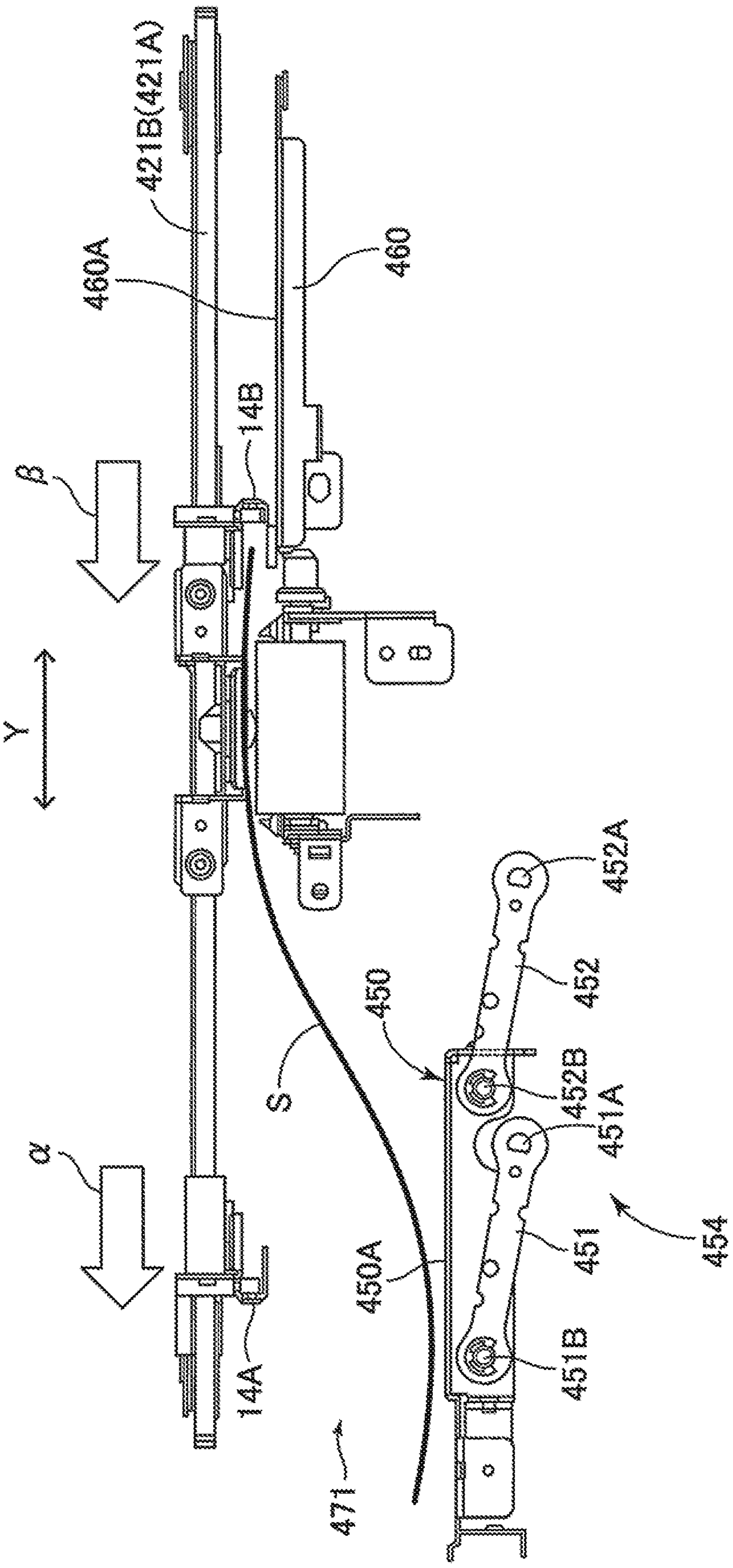
FIG. 16 is a cross-sectional view of the relay conveying apparatus according to the embodiment in a state where a rear side regulating guide is pushing the sheet, with an open/close guide opened.

The following describes the operation of relay conveying apparatus 400 at occurrence of sheet jam which causes stoppage of sheet conveyance on the conveying belt 12 with reference to FIGS. 14 to 16, as well as FIGS. 2 and 3. As illustrated in FIGS. 3 and 14, facing members 450 and 460 that face the lower surface of a sheet conveyed by the conveying belt 12 are disposed between the conveying belt 12 and the pair of regulating guides 14A and 14B in the sheet width direction Y. Of the facing members 450 and 460, the facing member 450 on the side close to the regulating guide 14A can move between a facing position and a take-out position retracting downward from the facing position as described later. The facing position is a position facing the lower surface of a sheet conveyed on the conveying belt 12. On the other hand, the facing member 460 on the side close to the regulating guide 14B is fixed at the facing position.

The facing members 450 and 460 have facing surfaces 450A and 460A, respectively, that face the lower surface of a sheet at the facing position. The facing surfaces 450A and 460A each support the end portion of a sheet which has been conveyed on the conveying belt 12 without being supported by one of the regulating guides 14A and 14B.

As illustrated in FIG. 14, the relay conveying apparatus 400 has an enclosure 470 for housing the above-mentioned displacement correction part 410. The enclosure 470 has a take-out port 471 for taking out a sheet in the enclosure 470 at the front of the apparatus. i.e., at one side in the sheet width direction Y. The take-out port 471 is provided on the side close to the regulating guide 14A (first regulating guide side) in the sheet width direction Y and serves as an opening for taking out mainly a sheet stopped on the conveying belt 12.

As illustrated in FIG. 14, the take-out port 471 is positioned below the conveying belt 12. On the other hand, as illustrated in FIG. 2, the first and second moving parts 420A and 420B constituting the guide moving part 420 are positioned above the conveying belt 12. As described above, the first and second moving parts 420A and 420B have the pulleys 422A, 423A, 422B, 423B, belts 424A, 424B, and connection parts 425A, 425B.

If the take-out port 471 is on the same side as the first and second moving parts 420A and 420B with respect to the conveying belt 12, the first and second moving parts 420A and 420B may interfere with sheet taking-out operation. To prevent this, in the present embodiment, the take-out port 471 is provided on the side opposite to the first and second moving parts 420A and 420B with respect to the conveying belt 12. That is, the first and second moving parts 420A and 420B are provided above the conveying belt 12, and the take-out port 471 is below the conveying belt 12.

There may be a case where a sheet is jammed and stopped on the conveying belt 12 while the sheet is being conveyed being held between the conveying belt 12 and the balls 20. In the present embodiment, the jammed sheet can be taken out through the take-out port 471. To this end, the facing member 450 on the take-out port 471 side is allowed to move between the facing position of FIG. 14 and the take-out position of FIG. 15. The take-out position is a position where the facing member 450 retracts downward from the facing position to allow a user to access the sheet stopped on the conveying belt 12 through the take-out port 471.

As described above, the facing member 450 is supported by the link mechanism 454 so as to be able to move between the facing position and the take-out position. The link mechanism 454 is a parallel link mechanism having two link members 451, 452 and pins 451A, 451B, 452A, 452B. The pins 451A and 451B support both end portions of the link member 451, and the pins 452A and 452B support both end portions of the link member 452. The pins 451A and 451B are supported by the enclosure 470, and the pins 452A and 452B are supported by the facing member 450. The link member 451 is provided such that the both ends thereof are freely rotatably supported by the pins 451A and 451B, and the link member 452 is provided such that the both ends thereof are freely rotatably supported by the pins 452A and 452B. Incidentally, the link members 451 and 452 have the same length. This allows the facing member 450 to move between the facing position and the take-out position with the facing surface 450A kept substantially parallel (substantially parallel to the horizontal direction in the present embodiment) to the conveying direction X.

The facing member 450 can thus move to the take-out position with the facing surface 450A kept substantially horizontal, so that a user can easily take out a sheet with the facing member 450 set at the take-out position. For example, when the facing member 450 is located at the take-out position with the facing surface 450A inclined to the horizontal direction, a space (access space) through which a user inserts his or her hand, beyond the facing member 450, into the inside from the take-out port 471 may be small. On the other hand, in the present embodiment, this access space can be made wider, facilitating sheet take-out operation.

A holding part 453 is provided at the end portion of the facing member 450 on the front side (left side in FIG. 14). A user holds the holding part 453 with his or her hand so as to move the facing member 450 between the facing position and the take-out position. When a sheet is stopped on the conveying belt 12, a user opens a door of the multi-stage feeder 200 to access the relay conveying apparatus 400, holds the holding part 453, and moves the facing member 450 from the facing position to the take-out position as illustrated in FIG. 14 (facing position) and FIG. 15 (take-out position). This allows the user to access the sheet stopped on the conveying belt 12 through the take-out port 471 and space above the facing surface 450A of the facing member 450 located at the take-out position.

When taking out the sheet, the user may accidentally touch the sheet to push it to the rear side (far side), i.e., the regulating guide 14B side (second regulating guide side). If the regulating guide 14B at the rear side is configured to be able to move further rearward, the pushed sheet may push the regulating guide 14B as well, causing the sheet to move further rearward. This makes it difficult for the user to take out the sheet.

Thus, in the present embodiment, when a sheet is stopped on the conveying belt 12, the control part 203 controlling the guide moving part 420 controls the rear-side regulating guide 14B to stay at a position where sheet conveyance is stopped. Specifically, the control part 203 applies a holding current to the motor M3 generating a drive force for moving the rear-side regulating guide 14B. In the present embodiment, the motors M2 and M3 are each a pulse motor whose stoppage state is kept by being energized.

Thus, when determining that sheet jam has occurred on the conveying belt 12, the control part 203 energizes the motor M3 to hold the regulating guide 14B at the current position. Thus, even if the user pushes the sheet at the time of access, the rear-side regulating guide 14B is held at the position where sheet jam occurs, so that the sheet can be prevented from moving toward the rear side. This makes it easy for the user to take out the sheet stopped on the conveying belt 12.

The control of holding the position of the regulating guide 14B may be started at the point of time when the control part 203 determines that the sheet is stopped on the conveying belt 12 or when a predetermined time period has elapsed from the determination. The control part 203 determines the stoppage of sheet conveyance when, for example, a sensor configured to detect the sheet on the downstream side from the conveying belt 12 does not detect the sheet for a predetermined period of time. Alternatively, a sensor for detecting sheet jam may be provided on the sheet conveyance path in the displacement correction part 410 and, in this case, the control part 203 makes the above determination based on a detection result from this sensor.

The holding of the position of the regulating guide 14B may start at the same time or after when the facing member 450 moves to the take-out position. In this case, a sensor for detecting the facing member 450 having moved to the take-out position may be provided, so that the current position of the regulating guide 14B can be held at the point of time when the sensor detects the facing member 450 having moved to the take-out position or after a predetermined period of time has elapsed from the detection.

Further, in the present embodiment, when the sheet is stopped on the conveying belt 12, the regulating guide 14A at the front side (the other regulating member) is moved in a direction away from the conveying belt 12 with respect to the position thereof immediately before the stoppage of sheet conveyance. Specifically, the regulating guide 14A on the take-out port 471 side is moved further frontward as denoted by arrow α in FIG. 15. When the regulating guide 14A is configured to be movable to a home position, which is more separated from the conveying belt 12 than the retracting position, in addition to the guide position and retracting position, the control part 203 moves the regulating guide 14A to the home position upon detection of sheet jam on the conveying belt 12.

The front-side regulating guide 14A is thus moved in a direction away from the conveying belt 12 at the time of stoppage of sheet conveyance, thereby making it easy for the user to access the sheet stopped on the conveying belt 12. For example, a space between the conveying belt 12 and the regulating guide 14A is made wider to make it easy for the user to access the sheet through this space. Further, when the end position of the stopped sheet is caught at the regulating guide 14A, the regulating guide 14A is moved in a direction separated from the conveying belt 12, thus allowing the sheet to be more easily released from the caught state, and therefore, the user can take out the sheet more easily.

When sheet conveyance is stopped, energization to the motor M2 for driving the front-side regulating guide 14A may be stopped, so that the front-side regulating guide 14A can be manually moved. Also in this case, a space for the user to take out the sheet can be made wider, facilitating sheet take-out operation.

Further, in the present embodiment, when the sheet is stopped on the conveying belt 12, the control part 203 moves the rear-side regulating guide 14B in the sheet width direction Y toward the take-out port 471 (take-out port side, front side) as illustrated in FIG. 16. That is, the control part 203 drives the motor M3 to move the regulating guide 14B frontward as denoted by arrow β in FIG. 16. Accordingly, the sheet is pushed by the regulating guide 14B to move toward the take-out port 471, making it easy for the user to take out the sheet. Although the sheet is nipped between the conveying belt 12 and the balls 20 in this state, the nip pressure therebetween is low, so that the sheet pushed by the regulating guide 14B moves toward the front side.

The timing of moving the regulating guide 14B frontward may be when the control part 203 determines that the sheet is stopped on the conveying belt 12 or when a predetermined period of time has elapsed from the determination. When the regulating guide 14B is moved based on the determination of the sheet stoppage by the conveying belt 12, the above control of holding the position of the regulating guide 14B is not performed.

Alternatively, the timing of moving the regulating guide 14B frontward may be when or after the facing member 450 reaches the take-out position. In this case, a sensor for detecting the facing member 450 having moved to the take-out position may be provided, so that the regulating guide 14B can be moved toward the front side at the point of time when the sensor detects the facing member 450 having moved to the take-out position or after a predetermined period of time has elapsed from the detection. In this case, the above control of holding the position of the regulating guide 14B at the sheet conveyance stop position may be performed or may not be performed.

Alternatively, the regulating guide 14B may be moved toward the front side by the user's manipulation on a user-operable button or the like provided in any of the apparatuses or an input operation through the input part 1001. Further alternatively, a configuration may be adopted, in which the position of the regulating guide 14B is held at the position where sheet conveyance is stopped, followed by movement of the regulating guide 14B through user operation.

The operation of the regulating guides 14A and 14B when a sheet jam has occurred is desirably changed according to the size of a sheet in the sheet width direction. In the present embodiment, upon the occurrence of a sheet jam, the operation of the regulating guides 14A and 14B is differentiated based on the sheet width direction position of the sheet end edge (first end edge) supported by the support surface 16A of the regulating guide 14A. In the present embodiment, a sheet is conveyed on a center reference basis, so that the operation of the regulating guides 14A and 14B is controlled based simply on information on the size of the sheet in the width direction.

FIGS. 17A to 20C are each a cross-sectional view illustrating the positions of a sheet and regulating guides 14A and 14B when a sheet jam has occurred, as viewed in the conveying direction. An OK area (a predetermined position at which a sheet can be taken out) and an NG area (NG areas (1) and (2)) illustrated in FIGS. 17A to 20C are defined respectively as the area where a sheet (a sheet being nipped by the conveying belt 12 in a drive-stop state and balls 20) stopped on the conveying belt 12 can be taken out through the take-out port 471 and the area where the sheet is difficult to take out. In the present embodiment, when the end edge (first sheet end edge SE1) in the sheet width direction of the sheet being stopped on the regulating guide 14A side falls within the OK area, it is easily for a user to hold the first sheet end edge SE1 and pull out the sheet through the take-out port 471 when the regulating guide 14A is retracted to the home position (a position at which the support surface 16A of the regulating guide 14A does not support the first sheet end edge SE1) in this state.

On the other hand, when the first sheet end edge SE1 of the sheet stopped on the conveying belt 12 falls within the NG area (1) (an area closer to the conveying belt 12 than the OK area), the first sheet end edge SE1 is separated from the take-out port 471, so that it is difficult for a user to hold the first sheet end edge SE1 and take out the sheet simply when the regulating guide 14A is moved to the home position. Further, when the first sheet end edge SE1 of the sheet stopped on the conveying belt 12 falls within the NG area (2) (an area on the opposite side of the conveying belt 12 with respect to the OK area), the first sheet end edge SE1 is supported by the support surface 16A even when the regulating guide 14A is moved to the home position, so that it is difficult for the user to take out the sheet.

In the present embodiment, the boundary between the OK area and the NG area (2) is set at the conveying belt 12 side end portion of the support surface 16A of the regulating guide 14A located at the home position; however, in a configuration where the take-out port 471 (opening thereof) is disposed closer to the conveying belt 12 than the conveying belt 12 side end portion of the support surface 16A located at the home position, the boundary between the OK area and the NG area (2) coincides with the position of the take-out port 471. Further, the boundary between the OK area and the NG area (1) is a position at which it is difficult for the user to insert his or her hand through the opening of the take-out port 471 and take out the sheet and can thus be changed as appropriate through alteration in the size of the take-out port 471 and arrangement of the constituent members.

In the present embodiment, it is determined in which area the first sheet end edge SE1 is located based on the size (sheet width) of a conveyed sheet. Specifically, in the present embodiment, a sheet stopped on the conveying belt 12 and having a width of 257 mm or less is determined to fall within the NG area (1), a sheet stopped on the conveying belt 12 and having a width of 257.1 mm to 320 mm is determined to fall within the OK area, and a sheet stopped on the conveying belt 12 and having a width of 320.1 mm or more is determined to fall within the NG area (2). Hereinafter, the operation of the regulating guides 14A and 14B upon the occurrence of sheet jam will be described for the above three patterns.

Figures 17A, 17B, 17C:
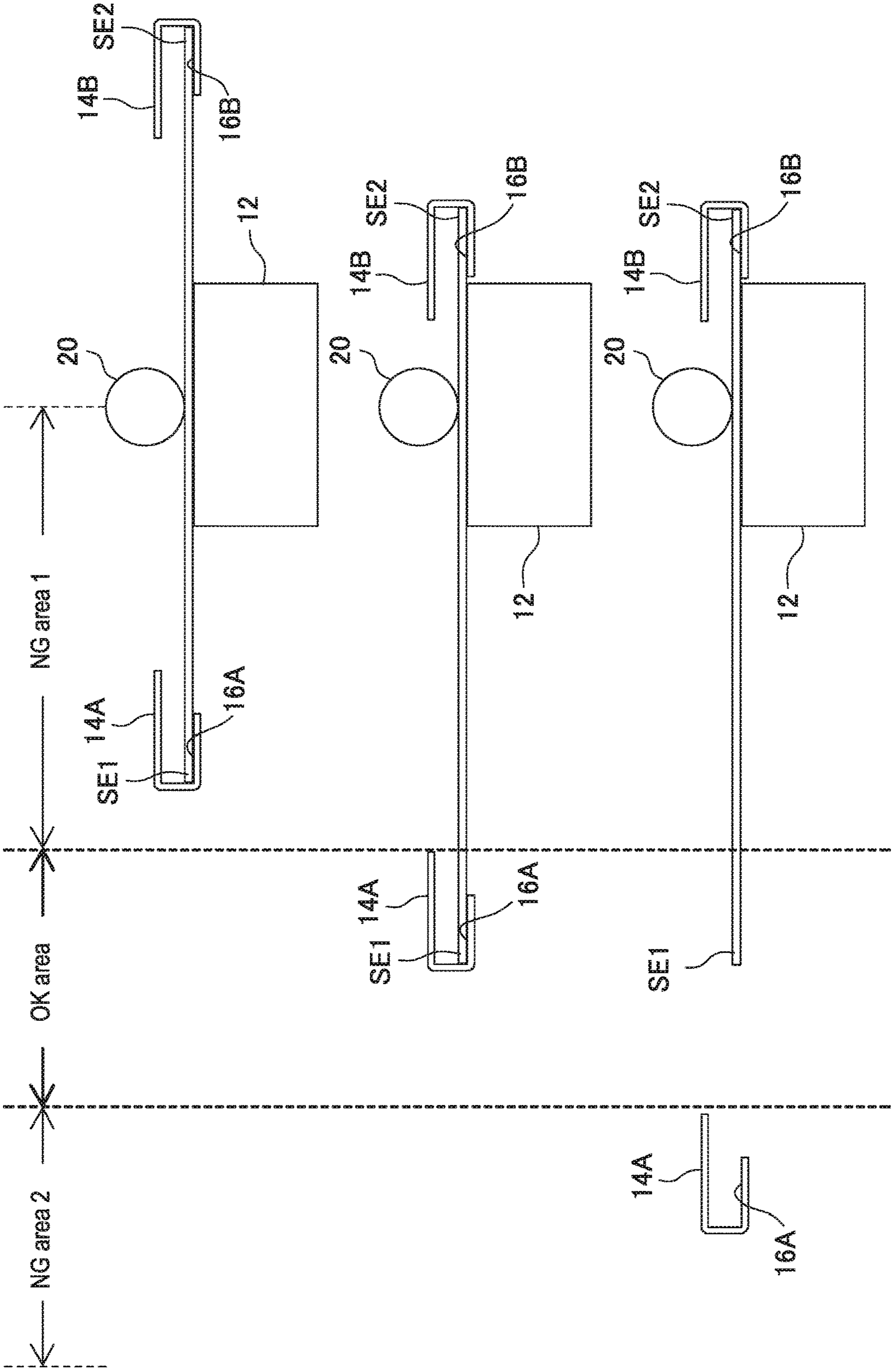

FIGS. 17A to 17C illustrate operations for a sheet having a sheet width of 257 mm or less. As illustrated in FIG. 17A, the first sheet end edge SE1 of the sheet stopped on the conveying belt 12 falls within the NG area (1). Thus, when this sheet is jammed during conveyance and stopped on the conveying belt 12, the control part 203 causes the regulating guides 14A and 14B to move to the take-out port 471 side to locate the first sheet end edge SE1 within the OK area (FIG. 17B). In this state, the regulating guide 14A is moved to the home position, and the regulating guide 14B is in a stopped state at the position of FIG. 17B (FIG. 17C). Then, the facing member 450 is moved to the take-out position, whereby the first sheet end edge SE1 hangs down toward the take-out port 471, and a second sheet end edge SE2, which is the end edge opposite the first end edge, is supported on the support surface 16B of the regulating guide 14B, thus allowing the user to easily take out the sheet through the take-out port 471.

Figures 18A, 18B:
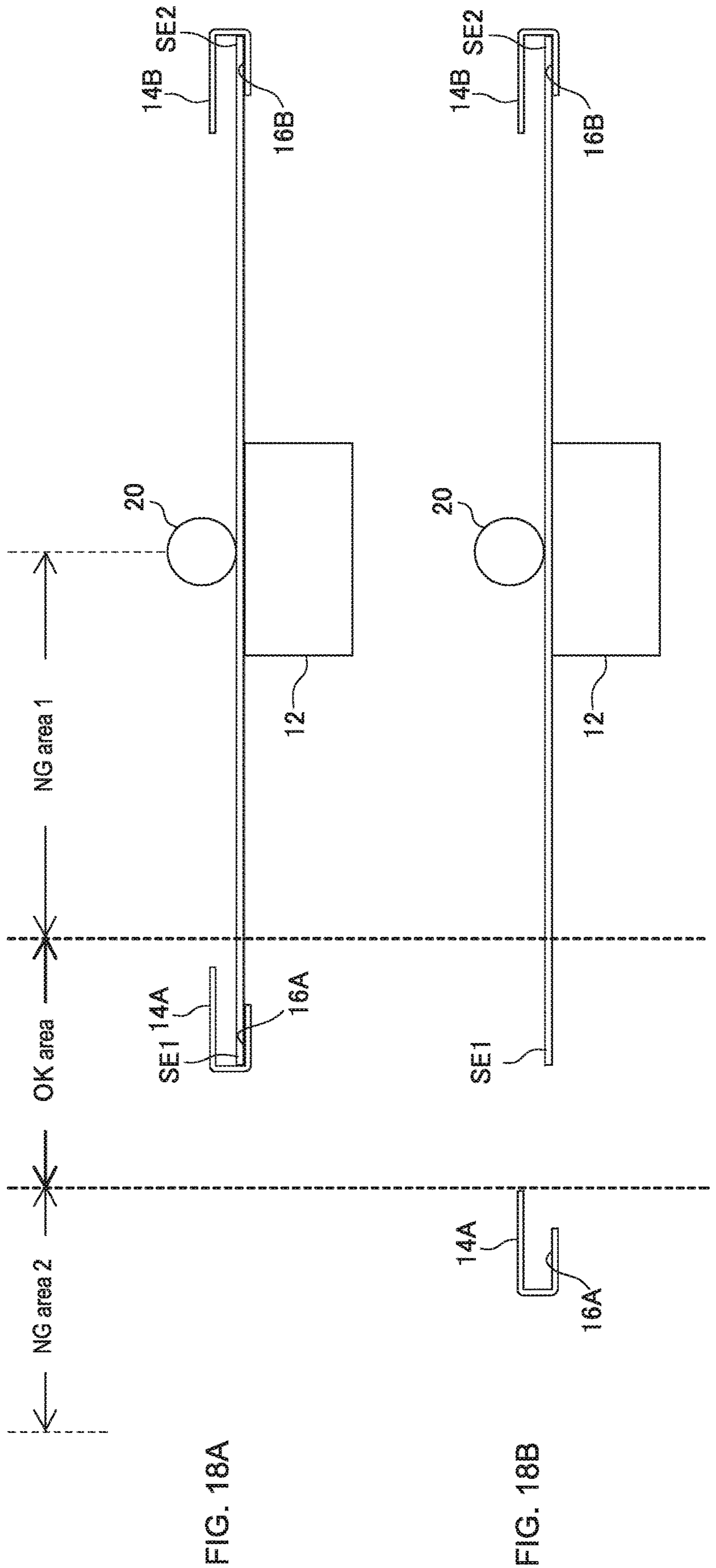

FIGS. 18A and 18B illustrate operations for a sheet having a sheet width of 257.1 mm to 320 mm. As illustrated in FIG. 18A, the first sheet end edge SE1 of the sheet stopped on the conveying belt 12 falls within the OK area. Thus, when this sheet is jammed during conveyance and stopped on the conveying belt 12, the control part 203 controls the regulating guide 14B so as to stay at the position of FIG. 18A and the regulating guide 14A so as to move to the home position (FIG. 18B). In this state, the first sheet end edge SE1 falls outside the supported range by the support surface 16A, so that when the facing member 450 is moved to the take-out position, the first sheet end edge SE1 hangs down toward the take-out port 471, and the second sheet end edge SE2 is supported on the support surface 16B of the regulating guide 14B, thus allowing the user to easily take out the sheet through the take-out port 471.

Further, in this state, the regulating guide 14B may be moved to push the sheet toward the take-out port 471. However, in this case, when the sheet width is 257.1 mm or more, the sheet is desirably pushed to such a degree that the first sheet end edge SE1 falls within the OK area. For example, when the sheet stopped on the conveying belt 12 is a cardboard, the first sheet end edge SE1 thereof may not hang downward even if the facing member 450 is moved to the take-out position. When the sheet is pushed by the regulating guide 14B toward the take-out port 471 in this state, the first sheet end edge SE1 abuts against the regulating guide 14A located at the home position. Thus, by pushing the sheet such a degree that the first sheet end edge SE1 falls within the OK area, it is possible to locate the sheet at a position allowing the user to take out the sheet with ease. For a sheet with low stiffness, the sheet may be pushed to the maximum extent when the facing member 450 has moved to the take-out position, as illustrated in FIG. 16.

Figures 19A, 19B, 19C:
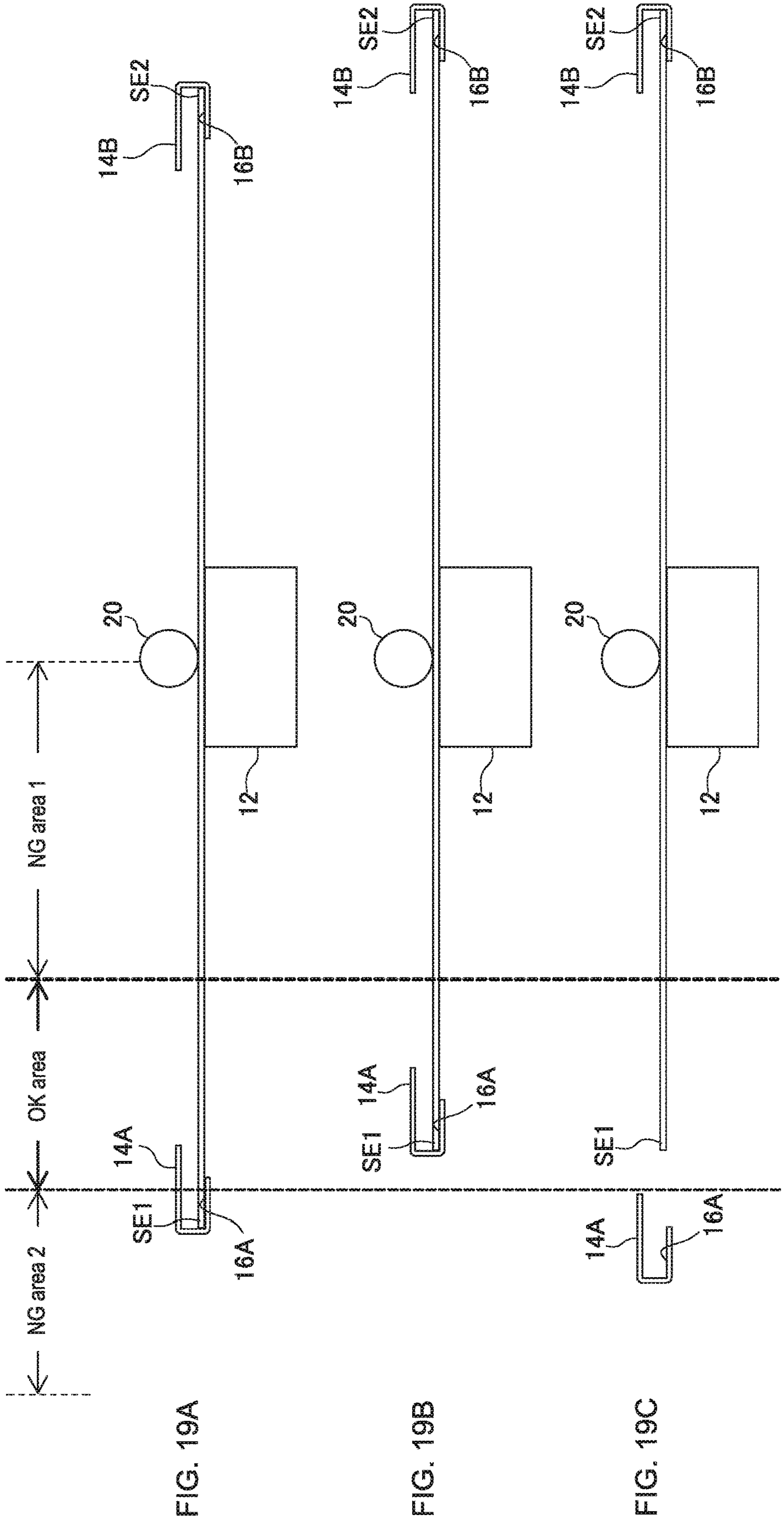

FIGS. 19A to 19C illustrate operations for a sheet having a sheet width of 320.1 mm or more. As illustrated in FIG. 19A, the first sheet end edge SE1 of the sheet stopped on the conveying belt 12 falls within the NG area (2). Even when the regulating guide 14A is moved to the home position in this state, the first sheet end edge SE1 is still supported on the support surface 16A, so that the user cannot take out the sheet. Thus, as illustrated in FIG. 19B, the control part 203 once causes the regulating guides 14A and 14B to move to the apparatus rear side (in the direction opposite the arrows α and β to locate the first sheet end edge SE1 within the OK area. Thereafter, the regulating guide 14B is held in a stopped state at the position of FIG. 19B, and the regulating guide 14A is moved to the home position (FIG. 19C). In this state, the first sheet end edge SE1 is no more supported on the support surface 16A, so that when the facing member 450 is moved to the take-out position, the first sheet end edge SE1 hangs down toward the take-out port 471, and the second sheet end edge SE2 is supported on the support surface 16B of the regulating guide 14B, thus allowing the user to easily take out the sheet through the take-out port 471.

As illustrated in FIGS. 18A and 18B, when the first sheet end edge SE1 of the sheet falls within the OK area, only the regulating guide 14A is moved to the home position with the regulating guide 14B held stopped; however, when the first sheet end edge SE1 is located in the vicinity of the boundary between the OK area and the NG area (2), the sheet may be fed following the movement of the regulating guide 14A to the home position due to friction with the regulating guide 14A.

Figures 20A, 20B, 20C:
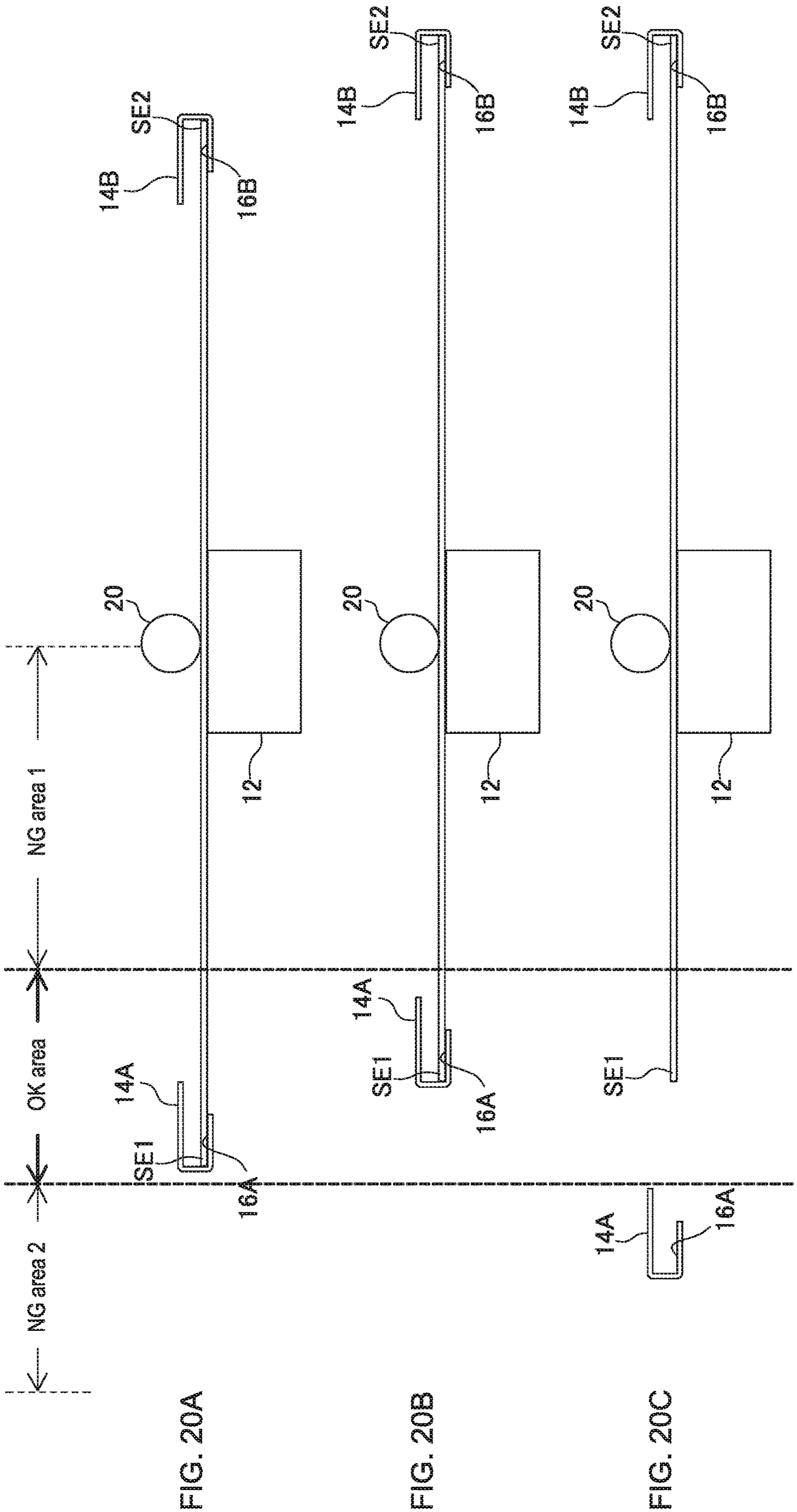

Thus, as illustrated in FIGS. 20A to 20C, the regulating guides 14A and 14B are once moved to the apparatus rear side even though the first sheet end edge SE1 falls within the OK area. Specifically, FIG. 20A illustrates a state where sheet jam occurs. In this case, normally the regulating guide 14A alone is moved to the home position; however, the sheet may also be moved to the home position of the regulating guide 14A due to friction with the support surface 16A. When, at this time, the first sheet end edge SE1 enters the NG area (2), it becomes difficult for the user to take out the sheet.

Thus, the control part 203 once controls the regulating guides 14A and 14B so as to move to the apparatus rear side (FIG. 20B) and then the regulating guide 14A to the home position (FIG. 20C). In this case, the regulating guide 14B may be moved to the regulating guide 14A side after the regulating guide 14A is moved to the home position so as to locate the first sheet end edge SE1 at the position illustrated in FIG. 20A where it is stopped.

While the operation of the regulating guides 14A and 14B upon the occurrence of sheet jam has been described, the order of individual operations is not limited to the above embodiments as long as finally the first sheet end edge SE1 falls within the OK area and falls outside the supported range by the support surface 16A of the regulating guide 14A. That is, the following embodiment may be possible: the regulating guides 14A and 14B are both moved to the apparatus rear side before the regulating guide 14A is moved to the home position, and then the regulating guide 14B is moved to the apparatus front side (regulating guide 14A side) and stopped in a state where the first sheet end edge SE1 is located within the OK area.

The operation of moving the regulating guide 14B to the apparatus front side at the time when the sheet conveyance is stopped is not performed when the stopped sheet spans both the conveying belt 12 and upstream side conveying roller pair 401 (a pair of upstream side conveying rollers) or downstream side conveying roller pair 402 (a pair of downstream side conveying rollers). That is, when the sheet is stopped in a state of spanning both the conveying belt 12 and conveying roller pair 401 or 402, the control part 203 does not cause the regulating guide 14B to move. This is because when the regulating guide 14B is moved in a state where the sheet is nipped by the conveying roller pair 401 or 402, the sheet may be damaged or torn.

While the above description is for the case where one sheet has a length (a sheet length in the conveying direction) falling within the range of the conveying belt 12, sheets of various lengths may be conveyed in the present embodiment. In addition, there may be a case where a plurality of sheets are fed onto the conveying belt 12 as illustrated in FIGS. 10C and 10D.

In the present embodiment, the jam release operation differs according to the sheet length and sheet stop position. FIGS. 21A to 21H schematically illustrate, at the topmost row, the positional relation in the conveying direction X between the regulating guide 14A (14B), take-out port 471, various conveying roller pairs, and various sheet detection sensors in a part of the area (for convenience, this area and upstream and downstream side jam release areas J1 and J2 to be described later are collectively referred to as "sheet stop area") extending over the conveying path 512, conveying belt 12, and conveying path 215 from the feed roller 501 and its adjacent sensor 502 which are provided in the feeding deck 500 to the conveying roller pair 204 and its sensor 437 which are provided in the multi-stage feeder 200. In the present embodiment, the feed roller 501, sensor 502, separation roller pair 503, and sensor 504 are components of the feeding deck 500, the conveying roller pairs 401, 402, and 403, sensors 433, 435, and 436, regulating guide 14A (14B), and take-out port 471 are components of the relay conveying apparatus 400, and the conveying roller pair 204 and sensor 437 are components of the multi-stage feeder 200; however, the above configuration may be changed as needed depending on the size of each unit and the size of the sheet to be handled, and the sheet stop area may fall within the relay conveying apparatus 400.

The jam release area J1 is located upstream relative to the sensor 502, and a sheet S3 that exists in the upstream side jam release area J1 at the point of time when a sheet jam has occurred is pulled out from the upstream side jam release area J1 by the user. The jam release area J2 is located downstream relative to the sensor 437, and a sheet S0 that exists in the downstream side jam release area J2 at the point of time when a sheet jam has occurred is pulled out from the downstream side jam release area J2 by the user. That is, the sheet S0 and sheet S3 illustrated in FIGS. 21A to 21H are not taken out through the take-out port 471.

The position at which the sheet is to be taken out differs depending on the stop position of the sheet and sheet length. FIGS. 21A to 21H illustrate from which the sheet is to be taken out on a case-by-case basis. As described above, the sheet S0 is a sheet to be taken out from the downstream side jam release area J2, and the sheet S3 is a sheet to be taken out from the upstream side jam release area J1. Sheets S1 and S2 are each a sheet that can be taken out through the take-out port 471.

Figures 21A, 21B, 21C, 21D, 21E, 21F, 21G, 21H:
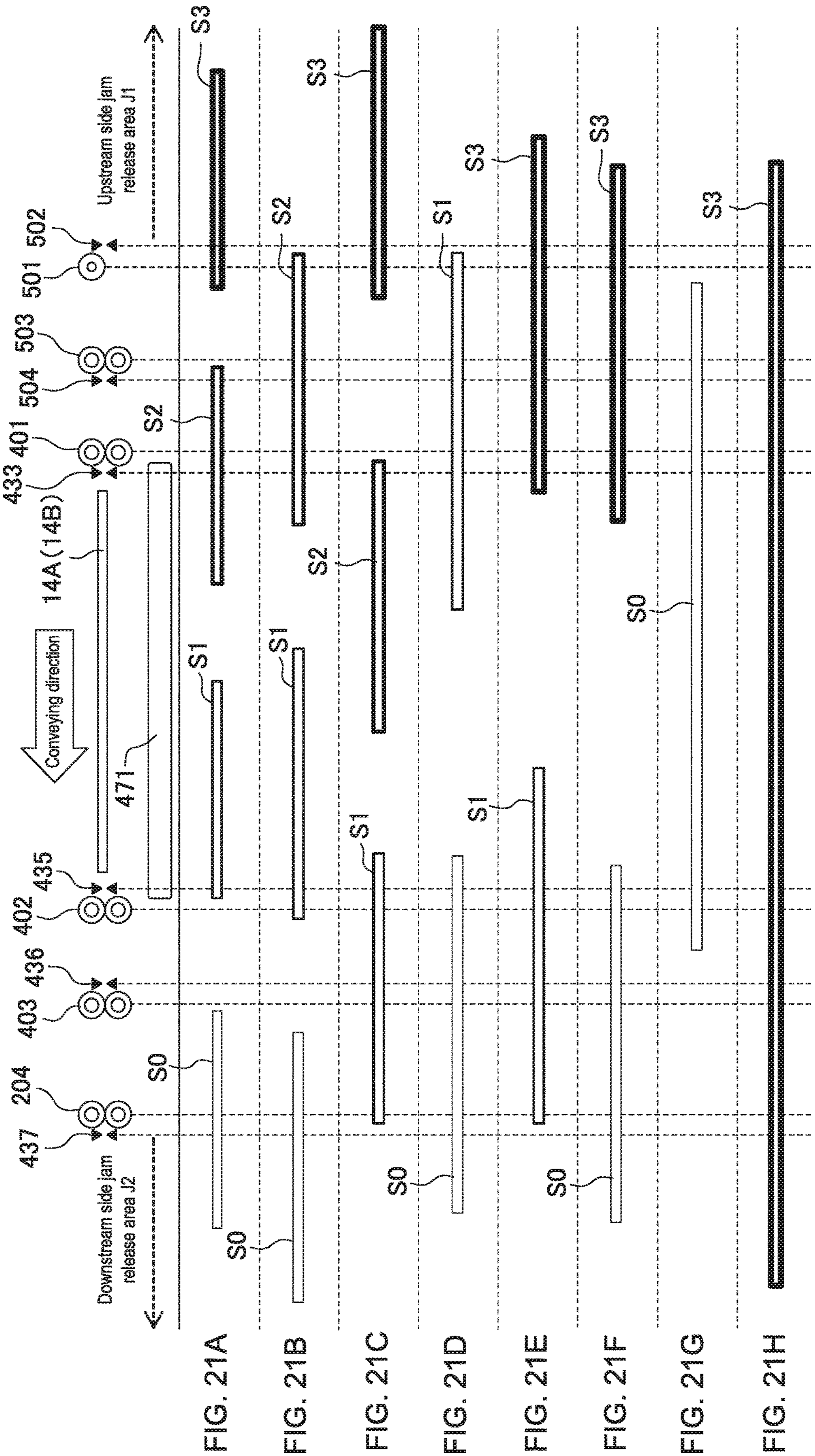
FIGS. 21A to 21H are views for explaining from where sheets of various lengths stopped in a sheet stop area are taken out.

FIG. 21A exemplarily illustrates a state where four sheets each having a length of 257 mm (B5 size) are stopped in the sheet stop area. In FIG. 21A, the most downstream side sheet in the conveying direction is located such that a part (front end side) thereof is downstream relative to the sensor 437, i.e., in the downstream side jam release area J2 and is thus the sheet S0 to be taken out through the downstream side jam release area J2. Similarly, the most upstream side sheet in the conveying direction is located such that a part (rear end side) thereof is upstream relative to the sensor 502, i.e., in the upstream side jam release area J1 and is thus the sheet S3 to be taken out through the upstream side jam release area J1. The two center sheets each have a length shorter than the length (about 517 mm) of the take-out port 471 in the conveying direction and can thus be taken out through the take-out port 471, so that the left-side preceding sheet is the sheet S1, and the right-side succeeding sheet is the sheet S2.

FIGS. 21B and 21C exemplarily illustrate a state where three sheets each having a length of 297 mm (A4 size) are stopped in the sheet stop area. In FIG. 21B, the most downstream side sheet in the conveying direction is located such that the front end thereof is downstream relative to the sensor 437 and is thus the sheet S0. The two sheets on the upstream side are located downstream relative to the sensor 502 and each have a length shorter than the length of the take-out port 471 in the conveying direction and are thus the sheets S1 and S2, respectively, that can be taken out through the take-out port 471. In FIG. 21C, the two left-side sheets are the sheets S1 and S2, respectively, that can be taken out through the take-out port 471. The most upstream side sheet in the conveying direction is located such that the rear end thereof is upstream relative to the sensor 502 and is thus the sheet S3 to be taken out from the upstream side jam release area J1.

FIGS. 21D and 21F illustrate a state where two sheets each having a length of 488 mm are stopped in the sheet stop area. In FIG. 21D, the left-side sheet is the sheet S0 to be taken out from the downstream side jam release area J2, and the right-side sheet is the sheet S1 to be taken out through the take-out port 471 (the length of the sheet S1 is shorter than the length of the take-out port 471 in the conveying direction). In FIG. 21E, the left-side sheet is the sheet S1 to be taken out through the take-out port 471, and the right-side sheet is the sheet S3 to be taken out from the upstream side jam release area J1. In FIG. 21F, the left-side sheet is the sheet S0 to be taken out from the downstream side jam release area J2, and the right-side sheet is the sheet S3 to be taken out from the upstream side jam release area J1.

FIG. 21G illustrate a state where a sheet having a length (762 mm) longer than the length of the take-out port 471 in the conveying direction falls between the sensors 502 and 437 in the sheet stop area. In this case, the sheet cannot be taken out through the take-out port 471, so that it is conveyed downstream and taken out from the downstream side jam release area J2. Thus, the sheet in this example is the sheet S0. In this case, however, when the sheet rear end is located upstream relative to the sensor 502, the sheet is taken out from the upstream side jam release area J1 and is thus the sheet S3. That is, a sheet having a length longer than the length of the take-out port 471 in the conveying direction can be the sheet S0 and sheet S3 depending on whether or not the sheet rear end is passed beyond the sensor 502.

FIG. 21H illustrate a state where a sheet having a length (1300 mm) longer than the distance between the sensors 502 and 437 is located in the sheet stop area so as to span both the upstream side jam release area J1 and downstream side jam release area J2. In the present embodiment, the sheet spanning both the upstream side jam release area J1 and downstream side jam release area J2 is preferentially taken out from the upstream side jam release area J1 and is thus the sheet S3.

As described above, the position at which the sheet is to be taken out differs depending on the stop position of the sheet when a sheet jam occurs and the sheet length. In the present embodiment, when a jammed sheet stopped in the sheet stop area is to be taken out, the user first takes out the sheet S3 from the upstream side jam release area J1 and then takes out the sheet S0 from the downstream side jam release area J2. After that, the user takes out the sheets S1 and S2, if any, through the take-out port 471.

In the present embodiment, when the sheets S1 and S2 are to be taken out through the take-out port 471, the operations of the conveying belt 12 and conveying roller pairs are controlled based on the lengths of the stopped sheets S1 and S2. In the present embodiment, it is assumed that the above constituent members are controlled such that the sheets S1 and S2 to be taken through the take-out port 471 are nipped only by the conveying belt 12 and balls 20.

Figure 22A:
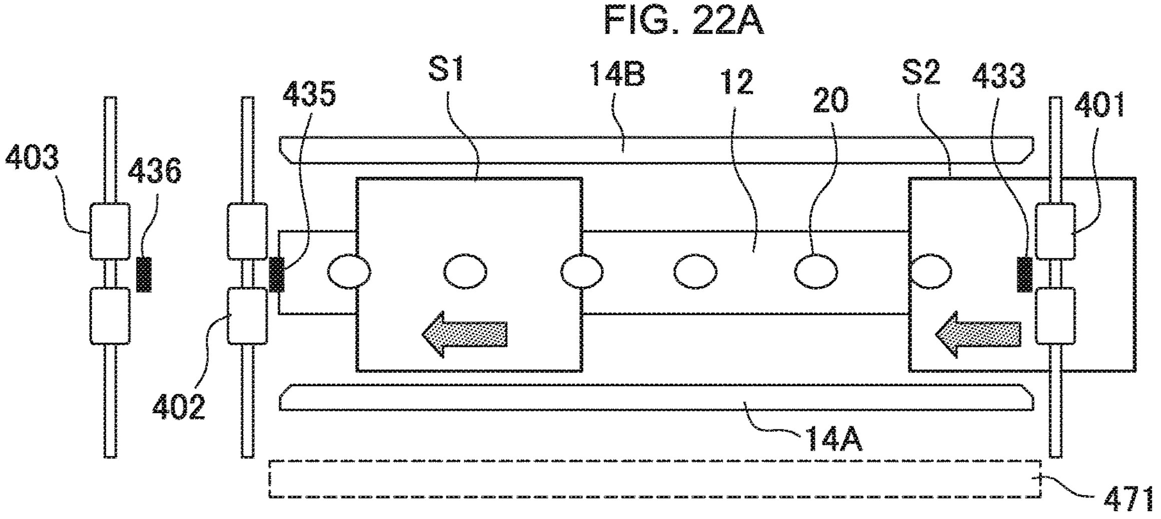
FIGS. 22A to 22C are views for explaining the operations of the conveying roller pairs and regulating guides when sheets stopped on the conveying belt are taken out through the take-out port.
Figure 22B:
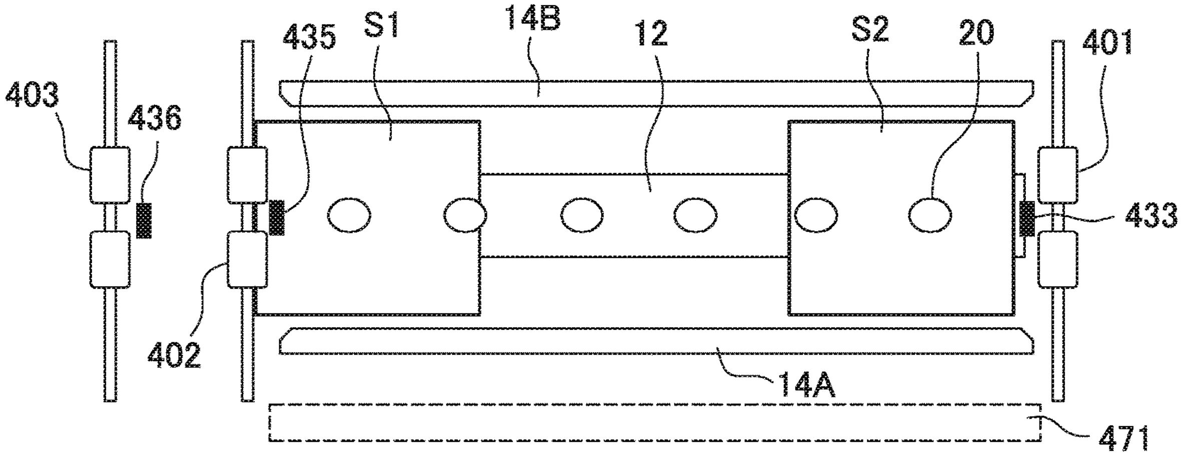
Figure 22C:
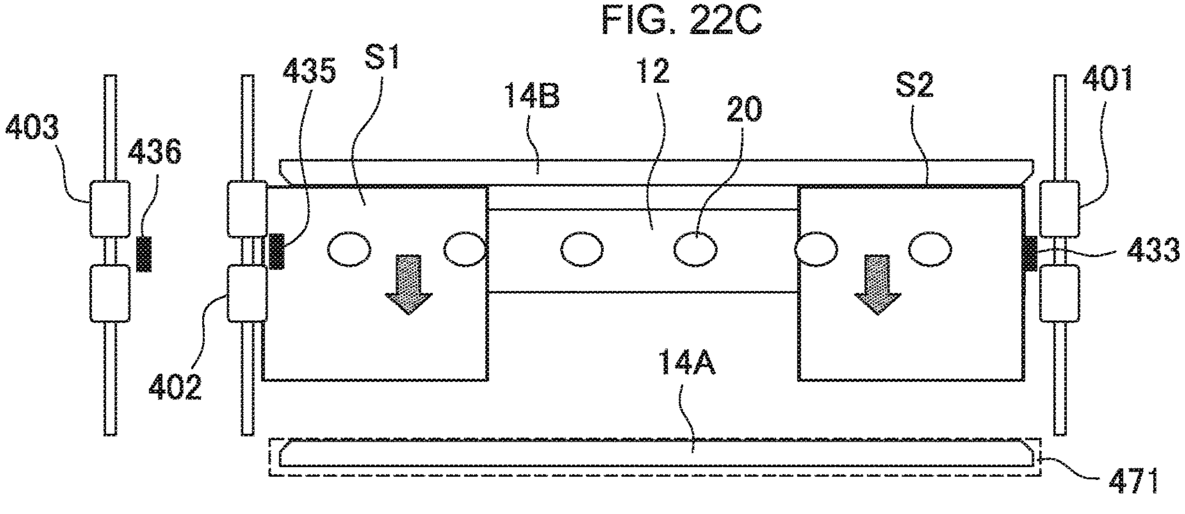

In the case of FIG. 21A, the sum of the lengths of the sheets S1 and S2 is smaller than the length of the take-out port 471 in the conveying direction and hence the sheets S1 and S2 are conveyed such that they fall between the conveying roller pairs 401 and 402. Specifically, when the control part 203 determines, based on a detection result from the sensor 435, that the front end of the sheet S1 is located upstream relative to the conveying roller pair 402 (the positions of the sheet front end and rear end are determined by the control part 203 based on the outputs of the sensors, which is the same hereinafter), it drives the conveying belt 12 and conveying roller pair 401 in a state where the rotation of the conveying roller pair 402 set at the nip position is stopped to convey the sheets S1 and S2 downstream in the conveying direction (FIGS. 22A and 22B). It follows that the sheet S1 abuts, at its front end, against the conveying roller pair 402 and stops, while the sheet S2 is conveyed by the conveying roller pair 401 until the rear end of the sheet S2 passes the sensor 433. When the rear end of the sheet S2 has passed the sensor 433, the drive of the conveying belt 12 and conveying roller pair 401 is stopped. If necessary, as illustrated in FIG. 22C, the regulating guide 14B is moved to push the sheets S1 and S2 toward the take-out port 471.

Figure 23A:
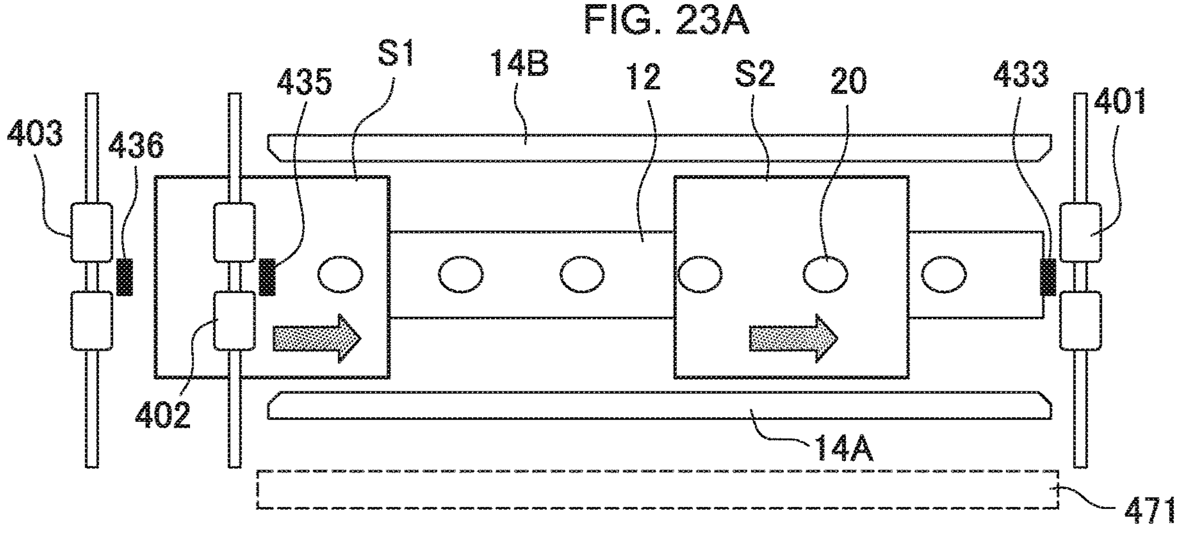
FIGS. 23A to 23C are views for explaining the operations of the conveying roller pairs and regulating guides when sheets stopped on the conveying belt are taken out through the take-out port.
Figure 23B:
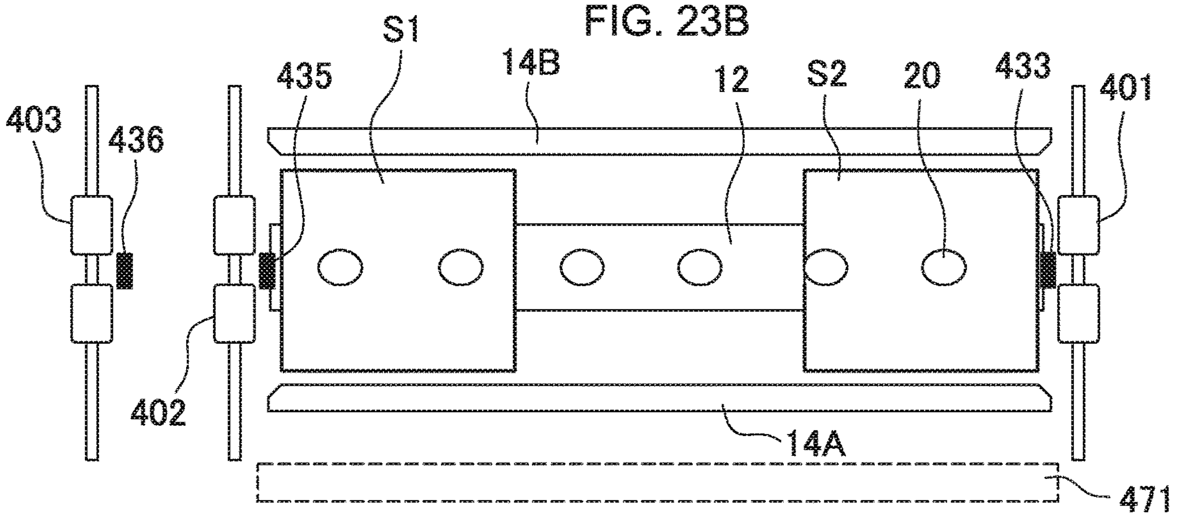
Figure 23C:
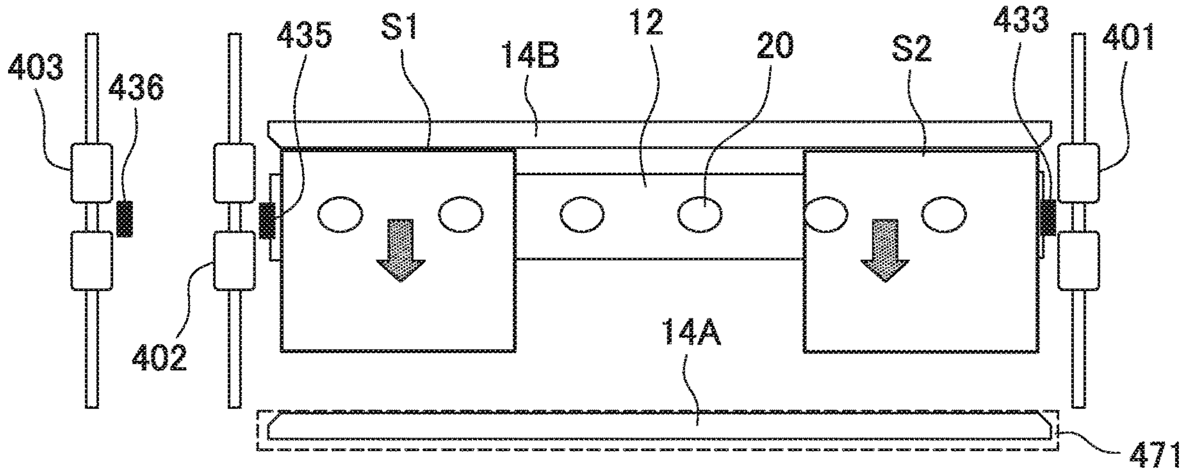

On the other hand, when the front end of the sheet S1 is located downstream relative to the conveying roller pair 402 (FIGS. 23A to 23C), the control part 203 controls the conveying roller pair 402 so as to reversely rotate in a state where the drive of the conveying belt 12 is stopped to convey the sheet S1 upstream until the front end (left-side end portion in the drawing) of the sheet S1 passes the sensor 435 (FIGS. 23A and 23B). At this time, when the rear end (right-side end portion in the drawing) of the sheet S2 is located downstream relative to the sensor 433, the control part 203 stops the drive of the conveying roller pair 401; on the other hand, when the rear end of the sheet S2 is located upstream relative to the sensor 433, the control part 203 controls the conveying roller pair 401 so as to normally rotate to convey the sheet S2 downstream until the sheet rear end passes the sensor 433. If necessary, in a state where the sheets S1 and S2 fall between the conveying roller pairs 410 and 402, the regulating guide 14B is moved to push the sheets S1 and S2 toward the take-out port 471 (FIG. 23C).

Figure 24A:
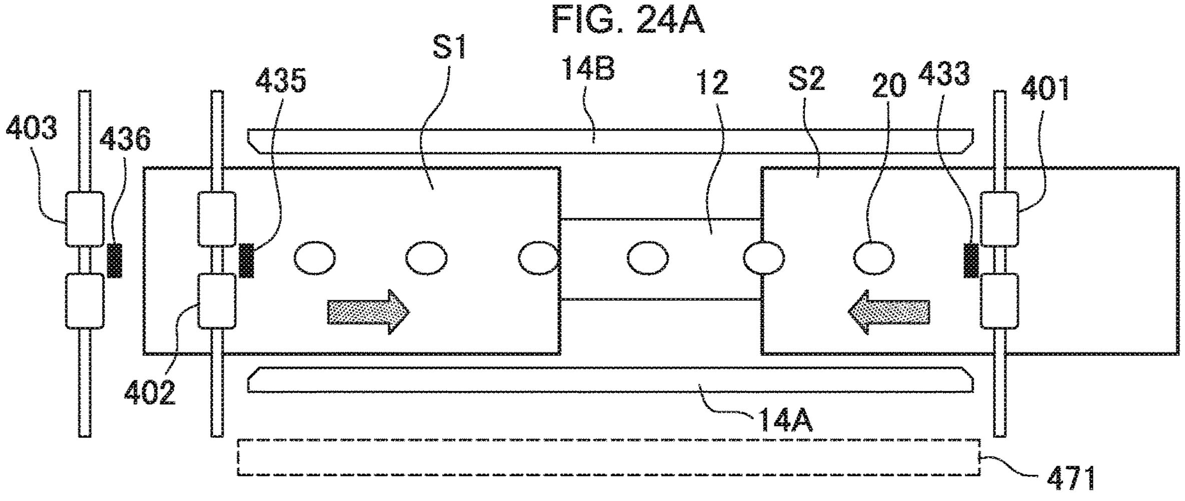
FIGS. 24A to 24C are views for explaining the operations of the conveying roller pairs and regulating guides when sheets stopped on the conveying belt are taken out through the take-out port.
Figure 24B:
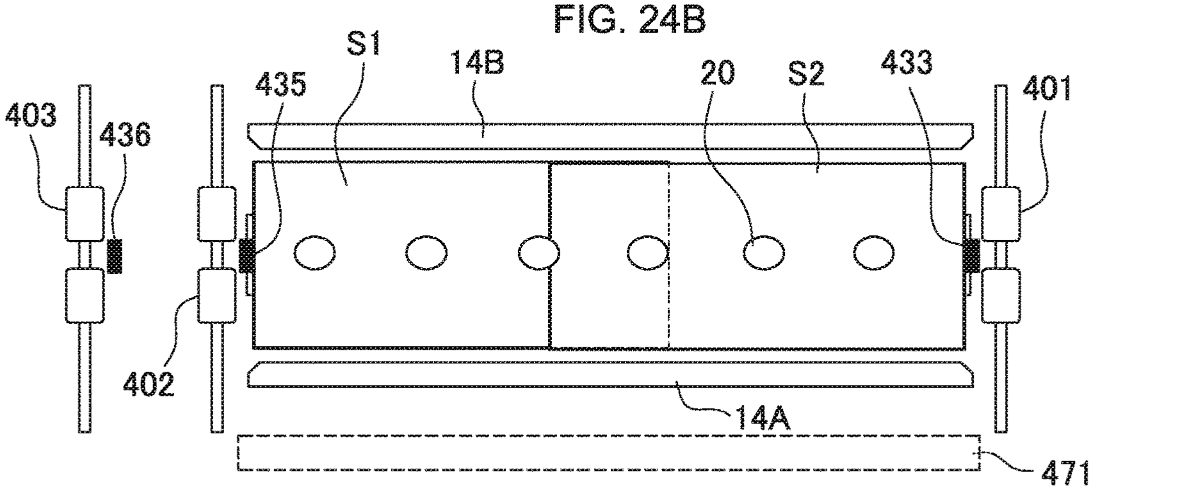
Figure 24C:
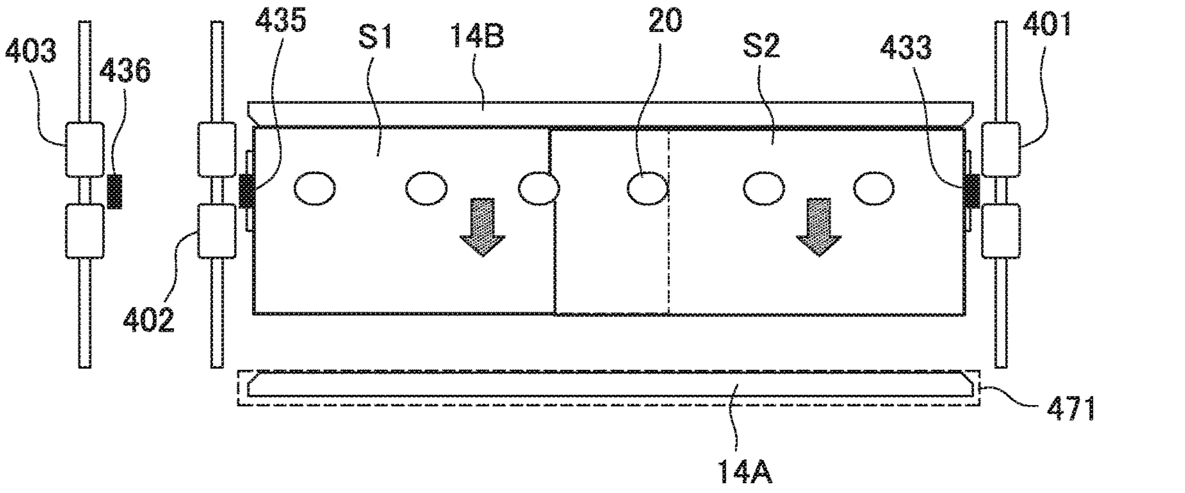

The following describes the operation in the case of FIGS. 21B and 21C. In the case of FIGS. 21B and 21C, the length of one sheet (sheet S1 or S2) is shorter than the length of the take-out port 471 in the conveying direction, but the sum of the lengths of the sheets S1 and S2 is larger than the length of the take-out port 471 in the conveying direction and smaller than the distance between the conveying roller pairs 401 and 403. Thus, the control part 203 drives the conveying roller pairs 402 and 401 such that the front end of the sheet S1 is located upstream relative to the sensor 435 and that the rear end of the sheet S2 is located downstream relative to the sensor 433. In this case, the sheets S1 and S2 overlap each other (FIGS. 24A and 24B). If necessary, in this state, the regulating guide 14B is moved to push the sheets S1 and S2 toward the take-out port 471 for take-out of the sheets S1 and S2 (FIG. 24C).

However, when, for example, cardboards are conveyed as the sheets S1 and S2 in the manner as described above, they may collide with each other at their front and rear ends and fail to overlap each other. Thus, when a sheet is thicker than a predetermined thickness, the control part 203 causes the conveying roller pair 402 to be separated at the nip release position. In this state, the control part 203 conveys the sheets S1 and S2 such that the front end of the sheet S1 is located upstream relative to the sensor 436 and that the rear end of the sheet S2 is located downstream relative to the sensor 433.

Figure 25A:
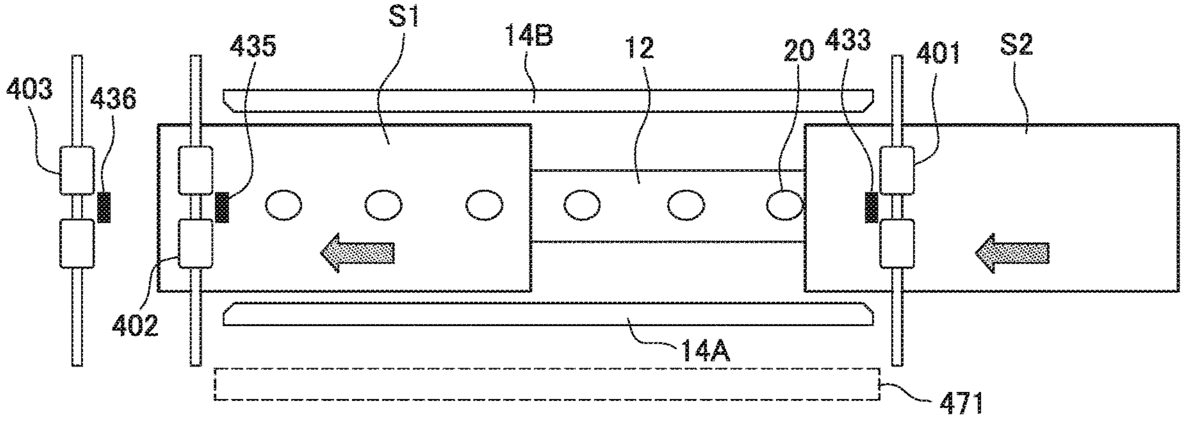
FIGS. 25A to 25C are views for explaining the operations of the conveying roller pairs and regulating guides when sheets stopped on the conveying belt are taken out through the take-out port.
Figure 25B:
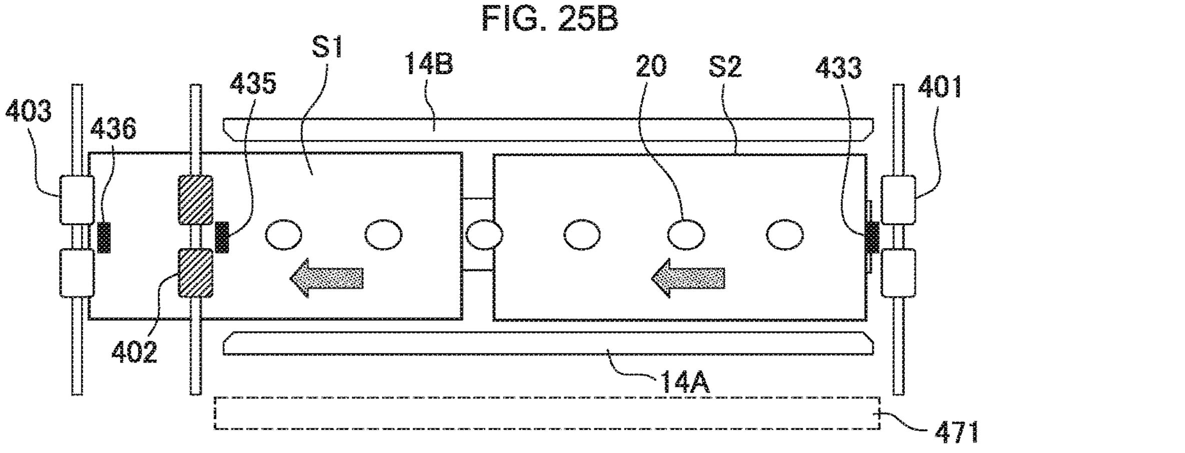
Figure 25C:
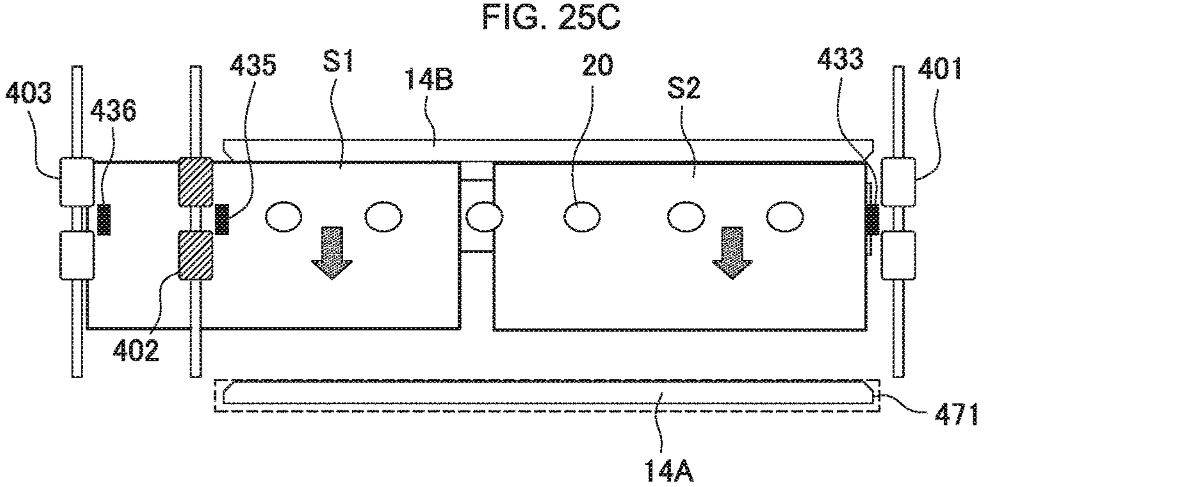

Specifically, as illustrated in FIGS. 25A to 25C, when the front end of the sheet S1 is located upstream of the sensor 436, the control part 203 causes the drive of the conveying roller pair 403 to stop and the conveying roller pair 402 move to the nip release position. In this state, the control part 203 controls the conveying roller pair 401 and conveying belt 12 so as to normally rotate to convey the sheet S2 downstream until the rear end of the sheet S2 is completely passed through the sensor 433 (sheet S1 abuts, at its front end, against the conveying roller pair 403 and stops due to stoppage of the conveying roller pair 403) (FIGS. 25A to 25C). This allows the sheets S1 and S2 to be located between the conveying roller pairs 401 and 403 without overlapping each other. At this time, since the conveying roller pair 402 is set at the nip release position, the sheets S1 and S2 are nipped only by the conveying belt 12 and balls 20 and can thus be pushed toward the take-out port 471 by the regulating guide 14B if necessary (FIG. 25C).

Figure 26A:
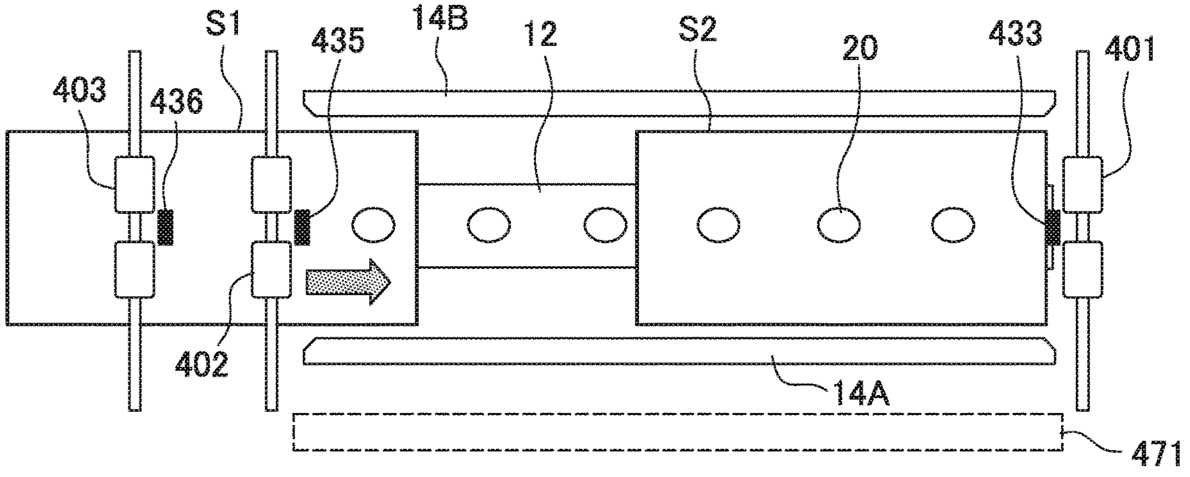
FIGS. 26A to 26C are views for explaining the operations of the conveying roller pairs and regulating guides when sheets stopped on the conveying belt are taken out through the take-out port.
Figure 26B:
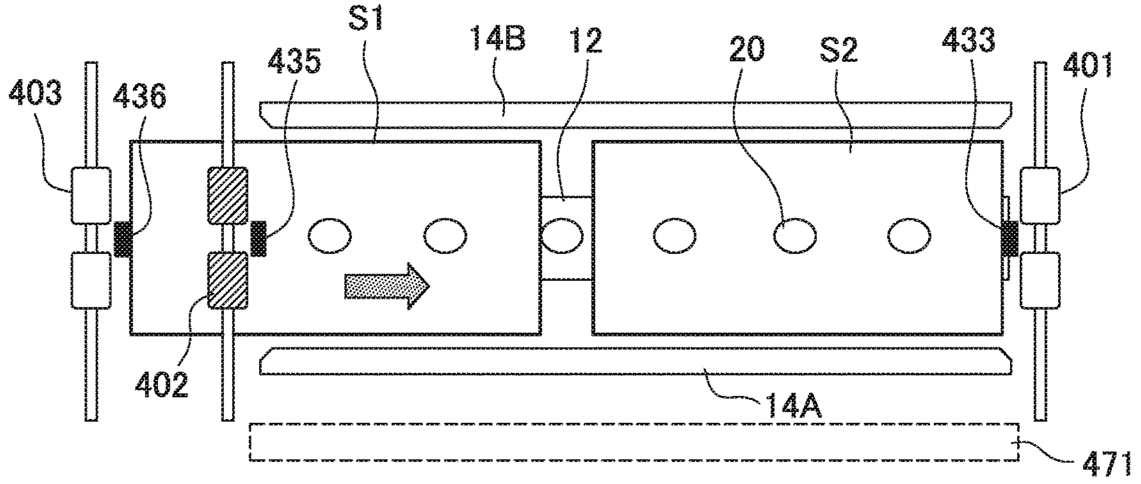
Figure 26C:
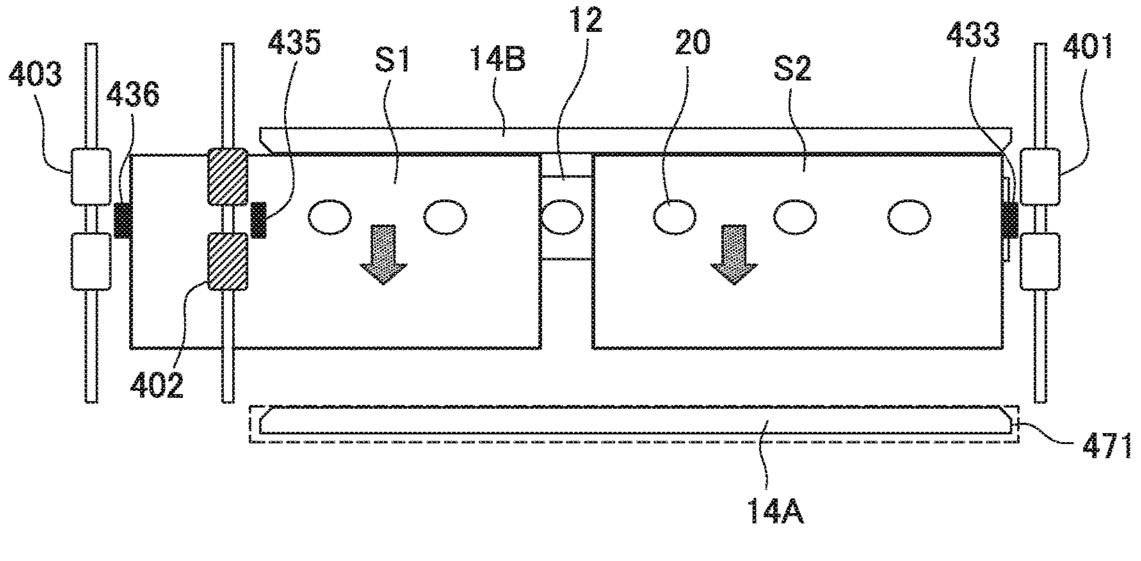

Further, as illustrated in FIGS. 26A to 26C, when the front end of the sheet S1 is located downstream relative to the sensor 436, the control part 203 controls the conveying roller pair 403 so as to normally rotate in a state where the conveying roller pair 402 is set at the nip release position to convey the sheet S1 until the front end of the sheet S1 is located upstream from the sensor 436 (FIGS. 26A and 26B). When the front end of the sheet S1 is located downstream relative to the sensor 436, and the rear end of the sheet S2 is located upstream relative to the sensor 433, the control part 203 controls the conveying roller pair 403 so as to normally rotate in a state where the conveying roller pair 402 is set at the nip release position and controls the conveying roller pair 401 so as to normally rotate (not illustrated).

For the sheets having the length of the case illustrated in FIGS. 21B and 21C, the conveying roller pair 402 may be set at the nip release position irrespective of the sheet thickness so as to locate the two sheets between the conveying roller pairs 410 and 403.

When the sheets S1 and S2 are to be taken out in the state illustrated in FIG. 21B, the control part 203 causes the conveying roller pair 402 to be set at the nip release position and controls the conveying belt 12 and conveying roller pair 401 so as to normally rotate in a state where the drive of the conveying roller pair 403 is stopped to convey the sheets S1 and S2 downstream, as described above. Thus, the front end of the sheet S1 abuts, at its front end, against the conveying roller pair 403 to stop, and the drive of the conveying belt 12 and conveying roller pair 401 is stopped at the point of time when the rear end of the sheet S2 passes the sensor 433.

It follows that the sheets S1 and S2 are taken out through the take-out port 471 in the state illustrated in FIGS. 25B and 25C or the state illustrated in FIGS. 26B and 26C, depending on the sheet length. Although the sheets S1 and S2 can be taken out in this procedure, the sheet S1 is conveyed downstream from the opening of the take-out port 471 and may thus be somewhat difficult to take out. Thus, by conveying collectively the sheets S1 and S2 after reducing the distance between the rear end of the sheet S1 and the front end of the sheet S2, the sheet S1 can be located at a position from which it can be taken out more easily.

Figure 27A:
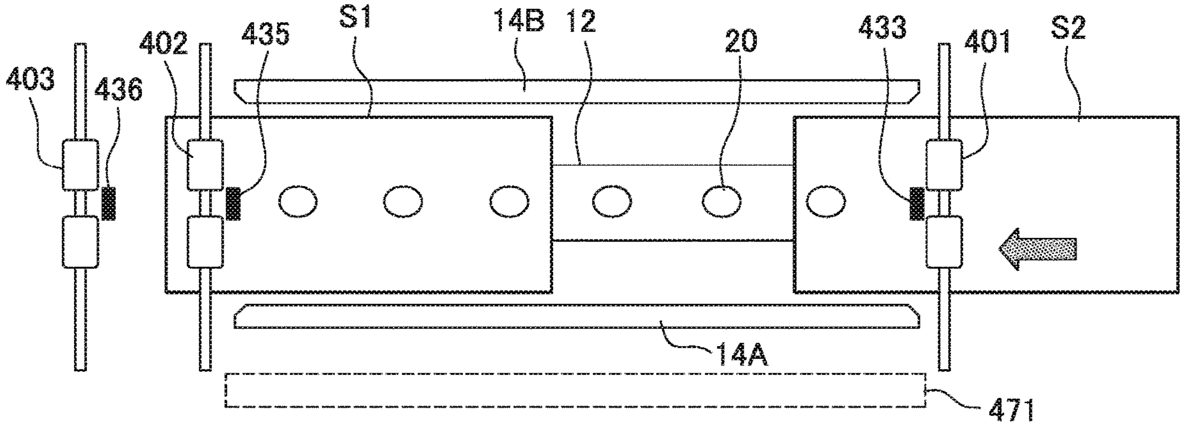
FIGS. 27A to 27C are views for explaining the operations of the conveying roller pairs and regulating guides when sheets stopped on the conveying belt are taken out through the take-out port.
Figure 27B:
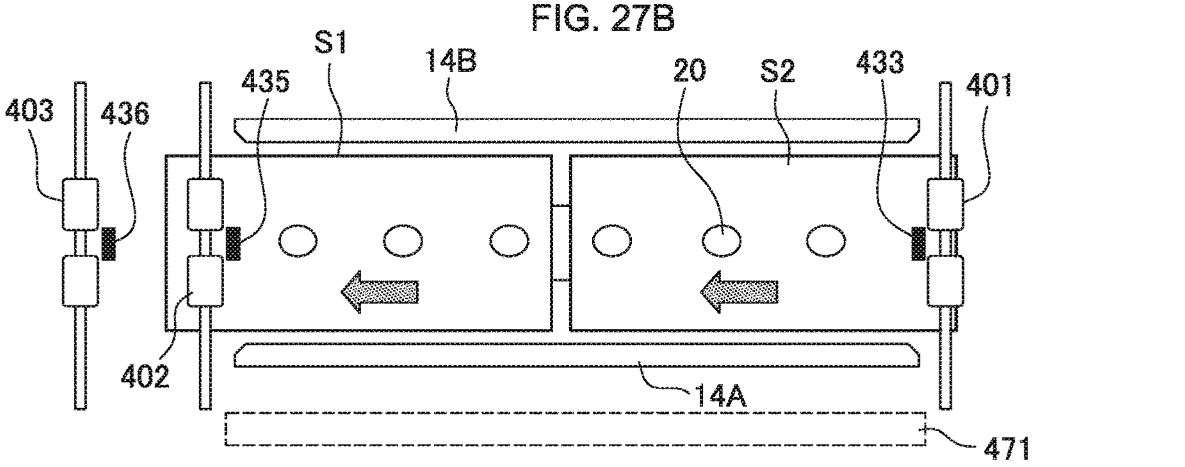
Figure 27C:
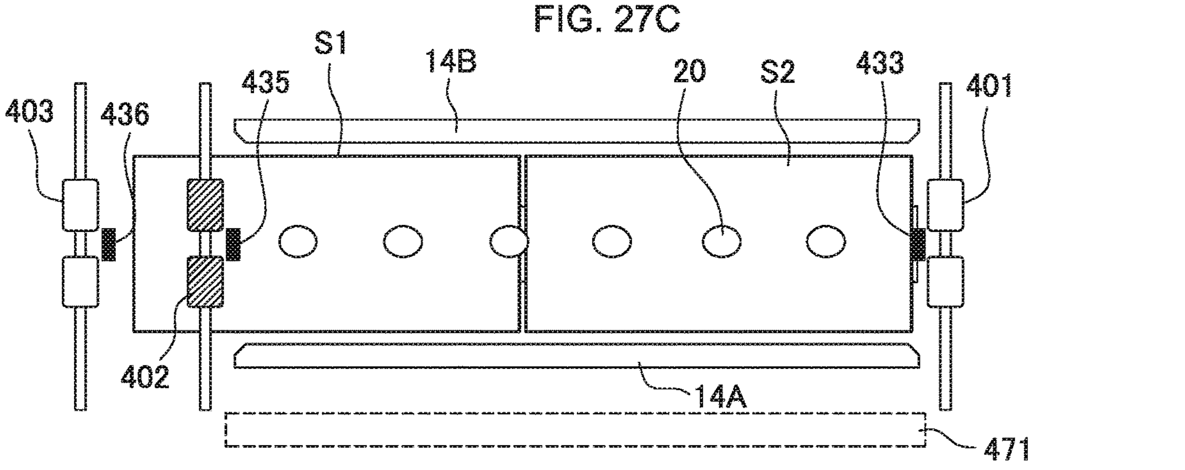

Specifically, the following two methods are conceivable. The first method is as follows. The sheet S1 is nipped by the conveying roller pair 402 in the state illustrated in FIG. 21B, so that the control part 203 drives the conveying roller pair 401 and conveying belt 12 in a state where the drive of the conveying roller pair 402 is stopped at the nip position to convey the sheet S2 downstream. Then, when the front end of the sheet S2 comes closer to the rear end of the sheet S1, the conveying roller pair 402 is set at the nip release position (or conveying roller pair 402 is normally rotated to convey the sheet S1 downstream). In this state, when the rear end of the sheet S2 passes the sensor 433, the conveyance of the sheets S1 and S2 is stopped (FIGS. 27A to 27C).

Figure 28A:
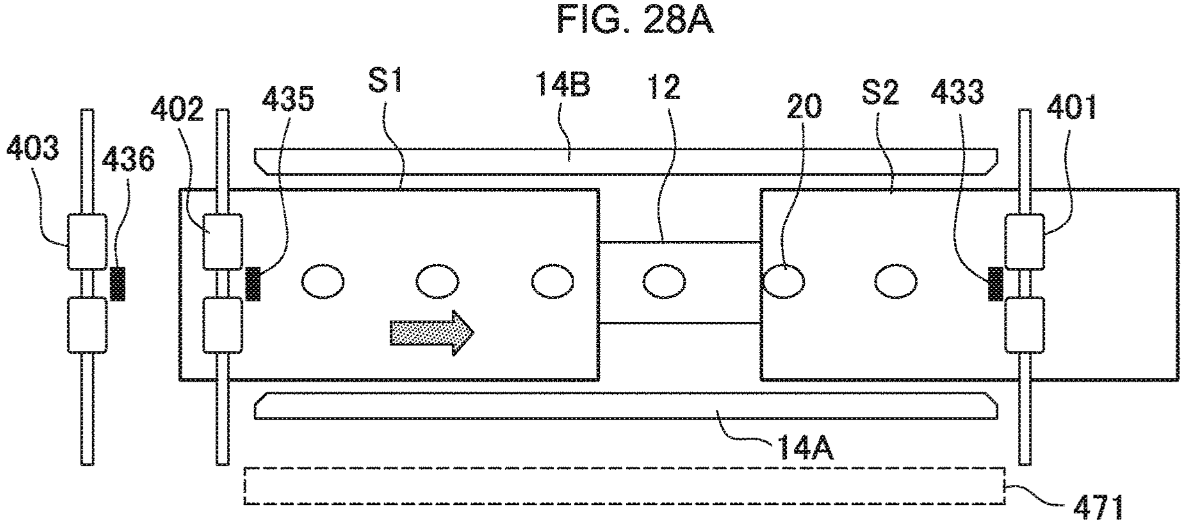
FIGS. 28A to 28C are views for explaining the operations of the conveying roller pairs and regulating guides when sheets stopped on the conveying belt are taken out through the take-out port.
Figure 28B:
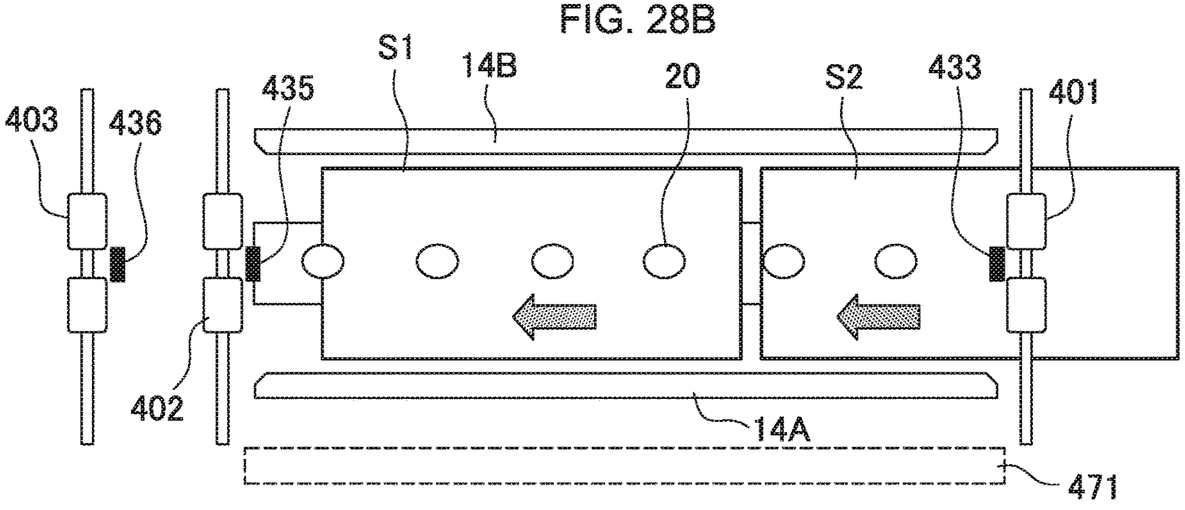
Figure 28C:
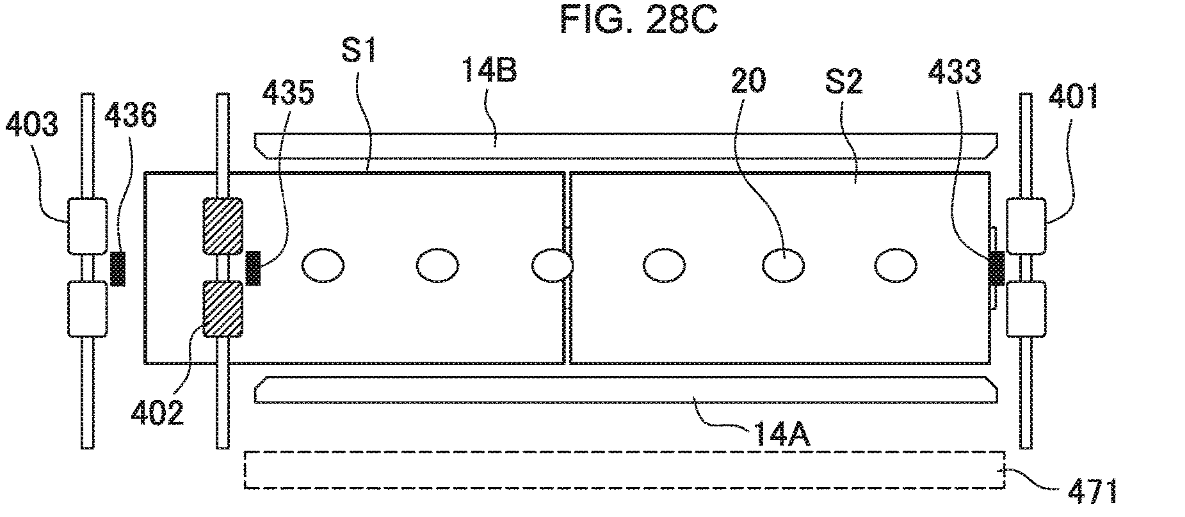

The second method is as follows. In the state illustrated in FIG. 21B, the sheet S2 is nipped by the conveying roller pair 401, so that the control part 203 controls the conveying belt 12 and conveying roller pair 402 so as to reversely rotate in a state where the drive of the conveying roller pair 401 is stopped to convey the sheet S1 upstream (at this point of time, the conveying roller pair 402 may be set at the nip release position). When the rear end of the sheet S1 comes closer to the front end of the sheet S2, the conveying belt 12 and conveying roller pairs 401 and 402 are normally rotated to convey the sheets S1 and S2 downstream. Then, when the rear end of the sheet S2 passes the sensor 433, the conveyance of the sheets S1 and S2 is stopped, and the conveying roller pair 402 is set at the nip release position (FIGS. 28A to 28C).

With the above two operation methods, the front end of the sheet S1 does not reach the conveying roller pair 403, which facilitates the take-out of the sheet S1.

Figure 29:
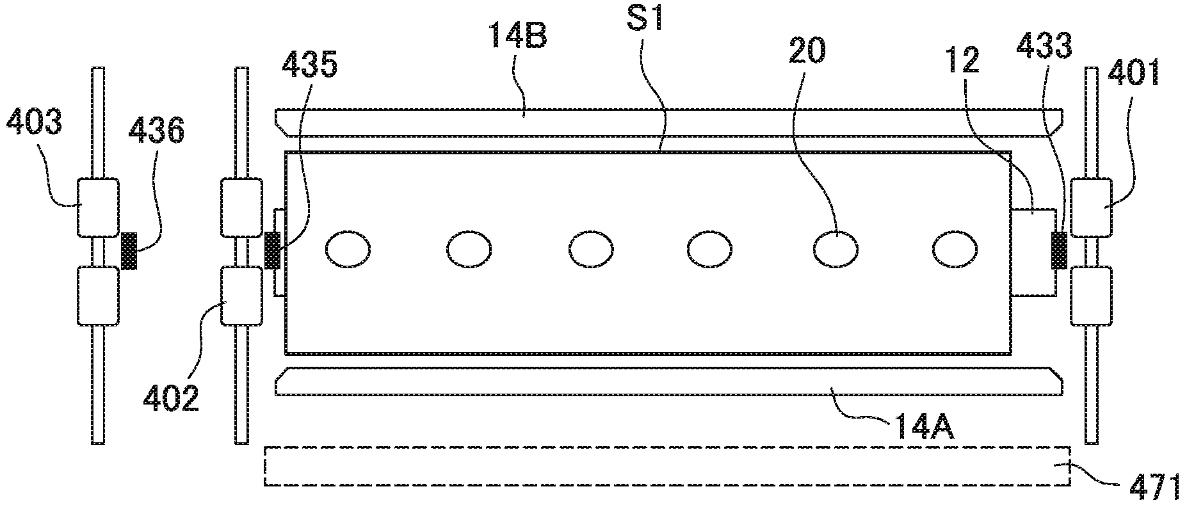
FIG. 29 is a view for explaining the operations of the conveying roller pairs and regulating guides when sheets stopped on the conveying belt are taken out through the take-out port.

The following describes the operation in the case of FIGS. 21D and 21E. In the case of FIGS. 21D and 21E, the length of the sheet S1 is shorter than the length of the take-out port 471 in the conveying direction. Thus, the control part 203 causes the sheet S1 to be located in the area between the conveying roller pairs 401 and 403 (a state where the front end of the sheet S1 is upstream relative to the sensor 435, and the rear end thereof is located downstream relative to the sensor 433) in a state where the conveying roller pair 402 is set at the nip position. That is, when the front end of the stopped sheet S1 is located downstream relative to the sensor 435, the conveying roller pair 402 is reversely rotated to convey the sheet S1 upstream until the front end of the sheet S1 is located upstream relative to the sensor 435. Conversely, when the rear end of the stopped sheet S1 is located upstream relative to the sensor 433, the conveying roller pair 401 is normally rotated in a state where the conveying roller pair 402 is set at the nip position to convey the sheet S1 until the rear end of the sheet S1 is completely passed through the sensor 433. Thus, the sheet S1 is brought into a state of being nipped only by the conveying belt 12 and balls 20 (FIG. 29).

The operations of the constituent members when the sheets S1 and S2 stopped in the sheet stop area are taken out through the take-out port 471 have thus been described. When the conveying roller pairs 402, 403, and 204 and conveying belt 12 are not configured to be reversely rotatable (cannot be driven in a direction conveying the sheet to the conveying roller pair 401 side and can be driven only in a direction conveying the sheet in the sheet conveying direction), the control part 203 does not cause the sheet S1 to be conveyed and causes only the sheet S2 to be conveyed until the rear end of the sheet S2 passes the sensor 433.

In the case of the sheet length of FIG. 21A, when the front end of the sheet S1 is located between the sensors 435 and 436, the control part 203 stops drive of the conveying roller pair 402 at its nip position, controlling the conveying roller pair 401 and conveying roller 12 so as to normally rotate to convey the sheet S2 downstream until the rear end of the sheet S2 passes the sensor 433. Thereafter, the conveying roller pair 402 is set at the nip release position. In this state, the sheets S1 and S2 are nipped only by the conveying belt 12 and balls 20. When the front end of the sheet S1 is located downstream relative to the sensor 436, only the sheet S2 is conveyed downstream and stopped in a state where the conveying roller pair 402 is set at the nip release position, and thereafter, the user rotates a jam dial (not illustrated) to manually reversely rotate the conveying roller pair 403 to thereby move the sheet S1 upstream and takes out the sheets S1 and S2 through the take-out port 471.

Similarly, in the case of the sheet length of FIGS. 21B and 21C, the control part 203 does not cause the sheet S1 to be conveyed and causes only the sheet S2 to be conveyed downstream until the rear end of the sheet S2 passes the sensor 433 and then causes the conveying roller pair 402 to be set at the nip release position. In this state, the user rotates a jam dial to manually reversely rotate the conveying roller pair 403 to thereby move the sheet S1 upstream. As a result, the sheets S1 and S2 are brought into a state of being nipped only by the conveying belt 12 and balls 20, allowing the sheets S1 and S2 to be taken out through the take-out port 471. In a state where the sheets S1 and S2 are nipped only by the conveying belt 12 and balls 20, the user may operate, e.g., an operation panel to issue an instruction to move the regulating guide 14B toward the take-out port 471 so as to push the sheets S1 and S2.

In the case of the sheet length of FIG. 21E, the sheet S2 does not exist, so that the control part 203 stops the drive of the conveying belt 12 and conveying roller pairs and causes the conveying roller pair 402 to be set at the nip release position and stops the operation thereof. In this state, the user rotates a jam dial to move the sheet S1 upstream and takes out the sheet S1 through the take-out port 471 (the sheet pushing operation by the regulating guide 14B is performed in the same manner as described above).

As described above, the operations of the constituent members when the sheet stopped in the sheet stop area is taken out differ depending on the sheet length and sheet stop position. The point is that the sheet S1 and sheet S2, if any, are finally brought into a state being nipped only by the conveying belt 12 and balls 20. Further, when the length of the take-out port 471 in the conveying direction is longer than that in the present embodiment, the operations of the constituent members may be changed accordingly as needed. Further, although the conveying roller pair 402 is set at the nip release position in the present embodiment, the conveying roller pair 401 may be configured to be movable to the nip position and nip release position. In this case, when the sum of the lengths of the sheets S1 and S2 is larger than the distance between the conveying roller pairs 401 and 402 and smaller than the distance between the conveying roller pairs 503 and 402, the sheets S1 and S2 are located such that the front end of the sheet S1 is upstream relative to the sensor 435 and that the rear end of the sheet S2 is downstream relative to the sensor 504 and, in this state, the conveying roller pair 401 is set at the nip release position.

Further, both the conveying roller pairs 401 and 402 may be configured to be movable to the nip release position. In this case, the sheets S1 and S2 are located such that the front end of the sheet S1 is upstream relative to the sensor 436 and that the rear end of the sheet S2 is downstream relative to the sensor 504 and, in this state, the conveying roller pairs 401 and 402 are set at the nip release position. This allows the sheets to be easily taken out through the take-out port 471.

Further, although two sheets of sheet S1 and sheet S2 can be taken out through the take-out port 471 in the present embodiment, the number of sheets that can be taken out through the take-out port 471 may not necessarily be two; more sheets can be taken out through the take-out port 471 when the take-out port 471 in the conveying direction is longer. In this case, it is of course within the scope of the invention to appropriately convey sheets based on the sum of the lengths of the sheets that can be taken out through the take-out port 471 and the distance between the conveying roller pairs and to set the conveying roller pair (or pairs) at the nip release position.

Other Embodiments

In the above embodiment, the control part 203 for controlling the relay conveying apparatus 400 is provided in the multi-stage feeder 200; however, the above control may be realized by the control part 140 of the image forming apparatus 100. Further, a control part for controlling components of the relay conveying apparatus 400 may be provided in the relay conveying apparatus 400. Furthermore, the sheet conveying apparatus is not limited to the above relay conveying apparatus, but may be of any other configuration, as long as it can correct displacement of a sheet.

This application claims priority from Japanese Patent Application No. 2020-144616 incorporated herein by reference.

The invention claimed is:

1. A sheet conveying apparatus that receives and conveys a sheet conveyed by a conveying member for conveying a sheet in a conveying direction, comprising:

an endless conveying belt that is provided downstream relative to the conveying member in the conveying direction, the belt having a conveying surface extending in the conveying direction and conveying the sheet passed to the conveying surface in the conveying direction;

a plurality of balls that is disposed in the conveying direction so as to face the conveying surface and configured to be rotatable in any direction while nipping the sheet with the conveying surface;

a first regulating guide disposed on a first side relative to the conveying belt in a sheet width direction crossing the conveying direction, having a first support surface for supporting a first sheet end edge on the first side of the sheet conveyed while being nipped by the conveying belt and the balls, and configured to move in the sheet width direction with the first sheet end edge supported by the first support surface to regulate the first sheet end edge;

a second regulating guide disposed on a second side relative to the conveying belt in the sheet width direction, having a second support surface for supporting a second sheet end edge on the second side of the sheet conveyed while being nipped by the conveying belt and the balls, and configured to move in the sheet width direction with the second sheet end edge supported by the second support surface to regulate the second sheet end edge;

a guide moving unit configured to move the first and second regulating guides in the sheet width direction; and a take-out port provided on the first side relative to the conveying belt in the sheet width direction, through which a sheet stopped on the conveying belt can be taken out in a state where the first sheet end edge falls within a predetermined area, wherein when a sheet is stopped on the conveying belt, the guide moving unit moves the first and second regulating guides such that the first support surface is located at a position at which it does not support the first sheet end edge in a state where the first sheet end edge falls within the predetermined area.

2. The sheet conveying apparatus according to claim 1, wherein when the first sheet end edge of the sheet stopped on the conveying belt is out of the predetermined area, the guide moving unit moves the first and second regulating guides so as to locate the first sheet end edge falls within the predetermined area.

3. The sheet conveying apparatus according to claim 1, wherein when the first sheet end edge of the sheet stopped on the conveying belt is located away from the predetermined area toward the first side, the guide moving unit moves the first and second regulating guides toward the second side and then moves the first regulating guide toward the first side such that the first support surface is located at a position at which it does not support the first sheet end edge.

4. The sheet conveying apparatus according to claim 1, wherein when the first sheet end edge of the sheet stopped on the conveying belt is away from the predetermined area toward the second side, the guide moving unit moves the first and second regulating guides toward the first side.

5. An image forming system comprising:

a sheet conveying apparatus; and an image forming apparatus including an image forming section capable of forming an image on a sheet conveyed by the sheet conveying apparatus, wherein the sheet conveying apparatus is the sheet conveying apparatus according to claim 1.

* * * * *